United States Patent
Inoue et al.

(10) Patent No.: US 9,369,501 B2
(45) Date of Patent: Jun. 14, 2016

(54) TRANSMISSION SYSTEM, METHOD AND PROGRAM

(71) Applicants: Takeru Inoue, Kanagawa (JP); Yoshinaga Kato, Kanagawa (JP)

(72) Inventors: Takeru Inoue, Kanagawa (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/625,976

(22) Filed: Feb. 19, 2015

(65) Prior Publication Data
US 2015/0237075 A1   Aug. 20, 2015

(30) Foreign Application Priority Data

Feb. 19, 2014   (JP) ................. 2014-029579
Jan. 19, 2015   (JP) ................. 2015-007451

(51) Int. Cl.
| | | |
|---|---|---|
| H04L 29/06 | (2006.01) | |
| H04N 7/14 | (2006.01) | |
| H04M 3/56 | (2006.01) | |
| H04N 7/15 | (2006.01) | |

(52) U.S. Cl.
CPC ............. *H04L 65/1069* (2013.01); *H04M 3/56* (2013.01); *H04N 7/152* (2013.01)

(58) Field of Classification Search
CPC ........................... H04N 7/141; H04L 65/1069
USPC ........ 348/14.01, 14.08, 14.12, 143; 358/1.15, 358/1.16; 463/33; 705/39; 707/758, 827, 707/736, 822; 709/203, 204, 206, 217, 223, 709/224, 246, 219; 713/168; 714/30; 725/110; 726/3, 5, 26; 370/261; 379/218.01; 715/758
See application file for complete search history.

(56) References Cited

U.S. PATENT DOCUMENTS

| | | | | |
|---|---|---|---|---|
| 7,589,857 B2 * | 9/2009 | Oe | ....... | G06F 12/1458 358/1.13 |
| 7,966,326 B2 * | 6/2011 | Hagiuda | ....... | G06F 3/12 707/736 |
| 8,224,878 B2 * | 7/2012 | Moon | ....... | G06F 17/30943 707/822 |
| 8,266,705 B2 * | 9/2012 | Hikichi | ....... | H04L 51/28 705/74 |
| 8,310,694 B2 * | 11/2012 | Maki | ....... | G06F 21/608 358/1.1 |
| 8,639,790 B2 * | 1/2014 | Kim | ....... | H04N 1/00204 709/217 |
| 8,708,819 B2 * | 4/2014 | Kando | ....... | A63F 13/12 463/33 |
| 8,854,460 B2 * | 10/2014 | Kim | ....... | H04N 7/17318 348/143 |
| 8,885,008 B2 * | 11/2014 | Okita | ....... | H04L 12/1827 348/14.01 |
| 8,977,717 B2 * | 3/2015 | Aarni | ....... | G06F 9/54 709/214 |
| 9,015,347 B2 * | 4/2015 | Kang | ....... | H04L 12/5835 709/206 |

(Continued)

FOREIGN PATENT DOCUMENTS

| | | |
|---|---|---|
| JP | 2003-134239 | 5/2003 |
| JP | 2014-200063 | 10/2014 |

*Primary Examiner* — Gerald Gauthier
(74) *Attorney, Agent, or Firm* — Oblon, McClelland, Maier & Neustadt, L.L.P.

(57) ABSTRACT

A transmission system for managing communication between a first terminal and a second terminal includes a reception unit configured to receive request information from the first terminal, the request information indicating a category of a request of a first user of the first terminal; and a transmission unit configured to transmit an output request to the second terminal. The second terminal outputs image data to be displayed on the first terminal according to the category of the request of the first user of the first terminal upon receiving the output request.

8 Claims, 42 Drawing Sheets

(56) References Cited

U.S. PATENT DOCUMENTS

| | | | |
|---|---|---|---|
| 2002/0178116 A1* | 11/2002 | Yamasaki | G06Q 20/10 705/39 |
| 2003/0187952 A1* | 10/2003 | Young | H04L 63/02 709/219 |
| 2007/0100944 A1* | 5/2007 | Ford | H04L 12/581 709/206 |
| 2008/0134265 A1* | 6/2008 | Tsubota | H04N 7/15 725/110 |
| 2008/0201576 A1* | 8/2008 | Kitagawa | H04L 63/08 713/168 |
| 2008/0212765 A1* | 9/2008 | Wolmuth | H04M 3/4931 379/218.01 |
| 2010/0071039 A1* | 3/2010 | Kashima | H04N 1/00244 726/5 |
| 2012/0102094 A1* | 4/2012 | Park | H04L 65/4084 709/203 |
| 2013/0151903 A1* | 6/2013 | Kinoshita | G06F 11/2221 714/30 |
| 2014/0022333 A1* | 1/2014 | Okita | H04L 47/12 348/14.08 |
| 2014/0049597 A1* | 2/2014 | Inoue | H04N 7/15 348/14.08 |
| 2014/0059169 A1* | 2/2014 | Ko | H04W 8/24 709/217 |
| 2014/0089408 A1* | 3/2014 | Zhang | G06F 17/30884 709/204 |
| 2014/0092433 A1* | 4/2014 | Kasamatsu | H04N 1/00225 358/1.15 |
| 2014/0137193 A1* | 5/2014 | Inoue | H04L 63/104 726/3 |
| 2014/0164451 A1* | 6/2014 | Koyama | H04L 12/1831 707/827 |
| 2014/0214924 A1* | 7/2014 | Cha | H04N 21/41407 709/203 |
| 2014/0267565 A1 | 9/2014 | Nakafuji et al. | |
| 2015/0046581 A1* | 2/2015 | Inoue | H04L 65/1093 709/224 |
| 2015/0134687 A1* | 5/2015 | Sohn | H04L 65/403 707/758 |
| 2015/0222670 A1* | 8/2015 | Inoue | H04L 65/1069 370/261 |
| 2015/0237075 A1* | 8/2015 | Inoue | H04L 65/1069 348/14.12 |
| 2015/0281145 A1* | 10/2015 | Ji | G06Q 10/10 705/758 |

* cited by examiner

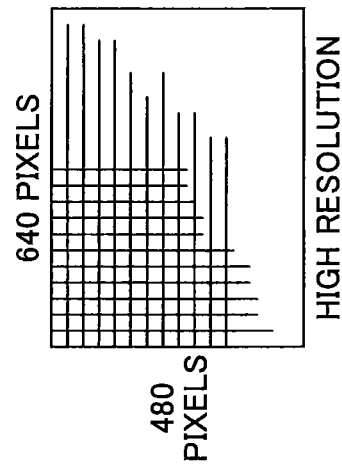
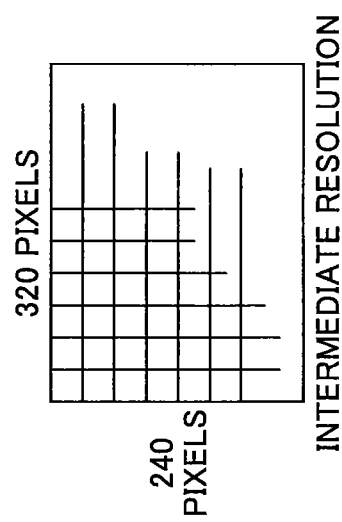
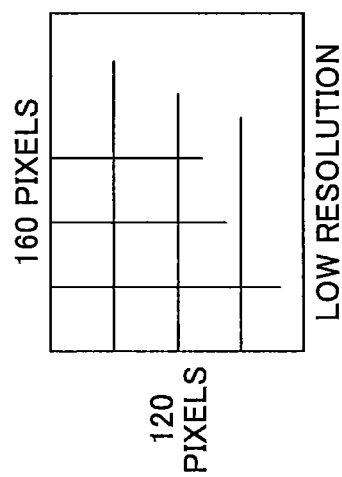

FIG.7

| IP ADDRESS OF DESTINATION TERMINAL | IMAGE QUALITY OF IMAGE DATA TO BE RELAYED (QUALITY OF IMAGE) |
|---|---|
| 1.3.2.4 | HIGH IMAGE QUALITY |
| 1.3.1.3 | LOW IMAGE QUALITY |
| 1.3.4.3 | INTERMEDIATE IMAGE QUALITY |
| ... | ... |

FIG.8

| RELAY APPARATUS ID | OPERATIONAL STATUS | RECEPTION TIME | IP ADDRESS OF RELAY APPARATUS | MAXIMUM DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.9

| TERMINAL ID | PASSWORD |
|---|---|
| 01aa | aaaa |
| 01ab | abab |
| 01ba | baba |
| ... | ... |

FIG.10

| TERMINAL ID | OPERATIONAL STATUS | RECEPTION TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.11

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.12

| SESSION ID FOR SELECTION | RELAY APPARATUS ID | REQUEST SOURCE TERMINAL ID | DESTINATION TERMINAL ID | DELAY TIME (ms) | DELAY INFORMATION RECEPTION TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.13

| SAME OR NOT SAME FOR DOT ADDRESS PART | ADDRESS PRIORITY |
|---|---|
| SAME . SAME . SAME . NOT SAME | 5 |
| SAME . SAME . NOT SAME . – | 3 |
| SAME . NOT SAME . – . – | 1 |
| NOT SAME . – . – . – | 0 |

FIG.14

| MAXIMUM DATA TRANSMISSION RATE IN RELAY APPARATUS (Mbps) | TRANSMISSION RATE PRIORITY |
|---|---|
| 1000~ | 5 |
| 100~1000 | 3 |
| 10~100 | 1 |
| ~10 | 0 |

FIG.15

| DELAY TIME (ms) | IMAGE QUALITY OF IMAGE DATA (QUALITY OF IMAGE) |
|---|---|
| 0~100 | HIGH IMAGE QUALITY |
| 100~300 | INTERMEDIATE IMAGE QUALITY |
| 300~500 | LOW IMAGE QUALITY |
| 500~ | (INTERRUPTION) |

FIG.20

| RELAY APPARATUS ID | ADDRESS PRIORITY | | POINT OF TRANSMISSION RATE PRIORITY | INTEGRATED POINT |
| --- | --- | --- | --- | --- |
| | POINT FOR TERMINAL 10aa | POINT FOR TERMINAL 10bd | | |
| 111a | 5 | 1 | 3 | 8 |
| 111b | 3 | 1 | 5 | 8 |
| 111c | – | – | – | – |
| 111d | 1 | 5 | 1 | 6 |

FIG.30
| STATUS | TERMINAL ID | TERMINAL NAME |
|---|---|---|
|  | 10ab | HELP DESK AB TERMINAL |
|  | 10ac | HELP DESK AC TERMINAL |
|  | 10ad | HELP DESK AD TERMINAL |
|  | 10ae | HELP DESK AE TERMINAL |

FIG.32

| NUMBER | INQUIRY CONTENT | OPERATIONAL MODE |
|---|---|---|
| 1 | ABOUT CONFERENCE SCHEDULE | 2 |
| 2 | ABOUT METHOD FOR ACCESSING CONFERENCE | 2 |
| 3 | ABOUT USAGE OF FACILITY | 2 |
| 4 | ABOUT NEIGHBORHOOD FACILITY | 2 |
| 5 | WANT CONTACT INFORMATION | 1 |
| 6 | OTHERS | 1 |

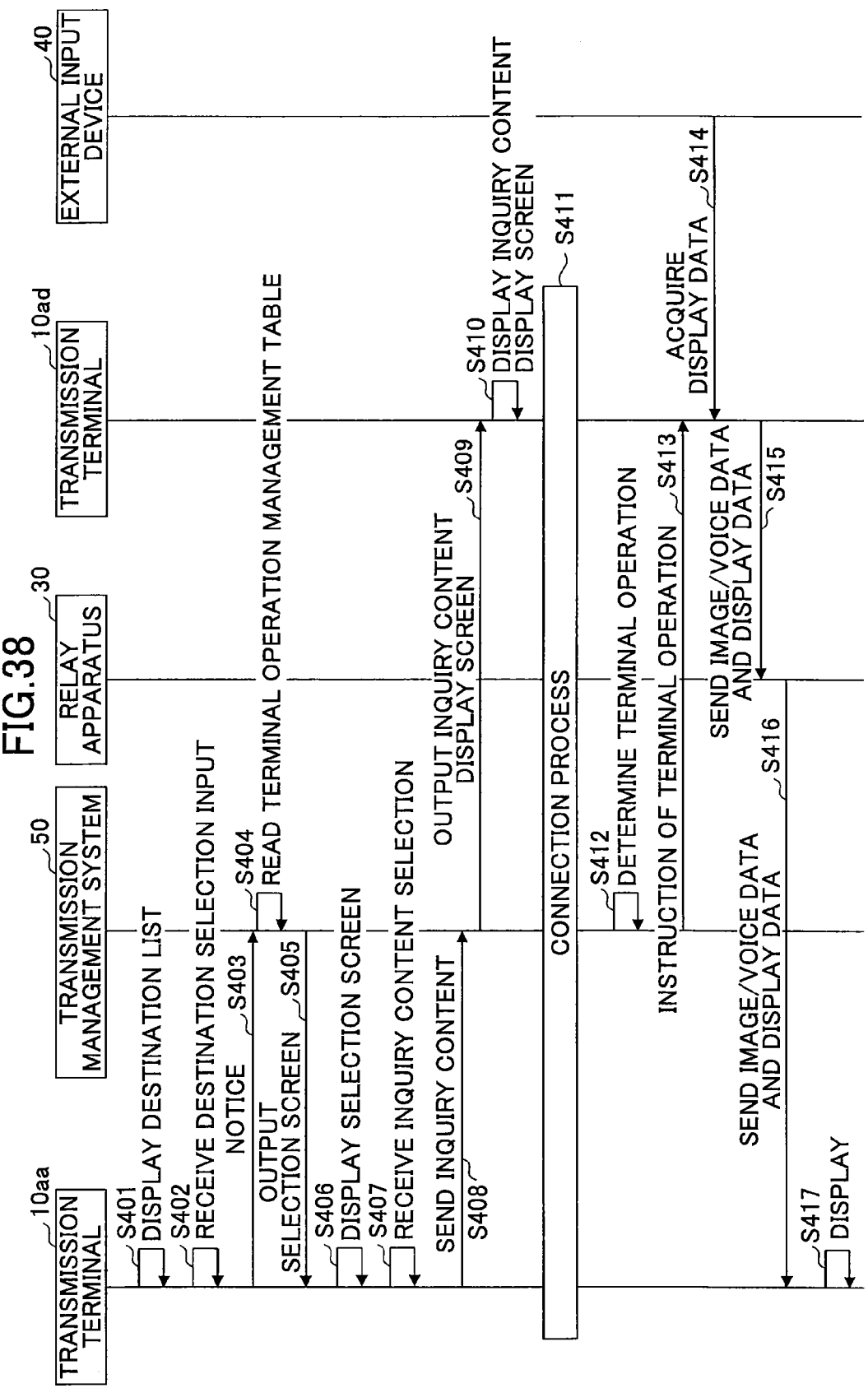

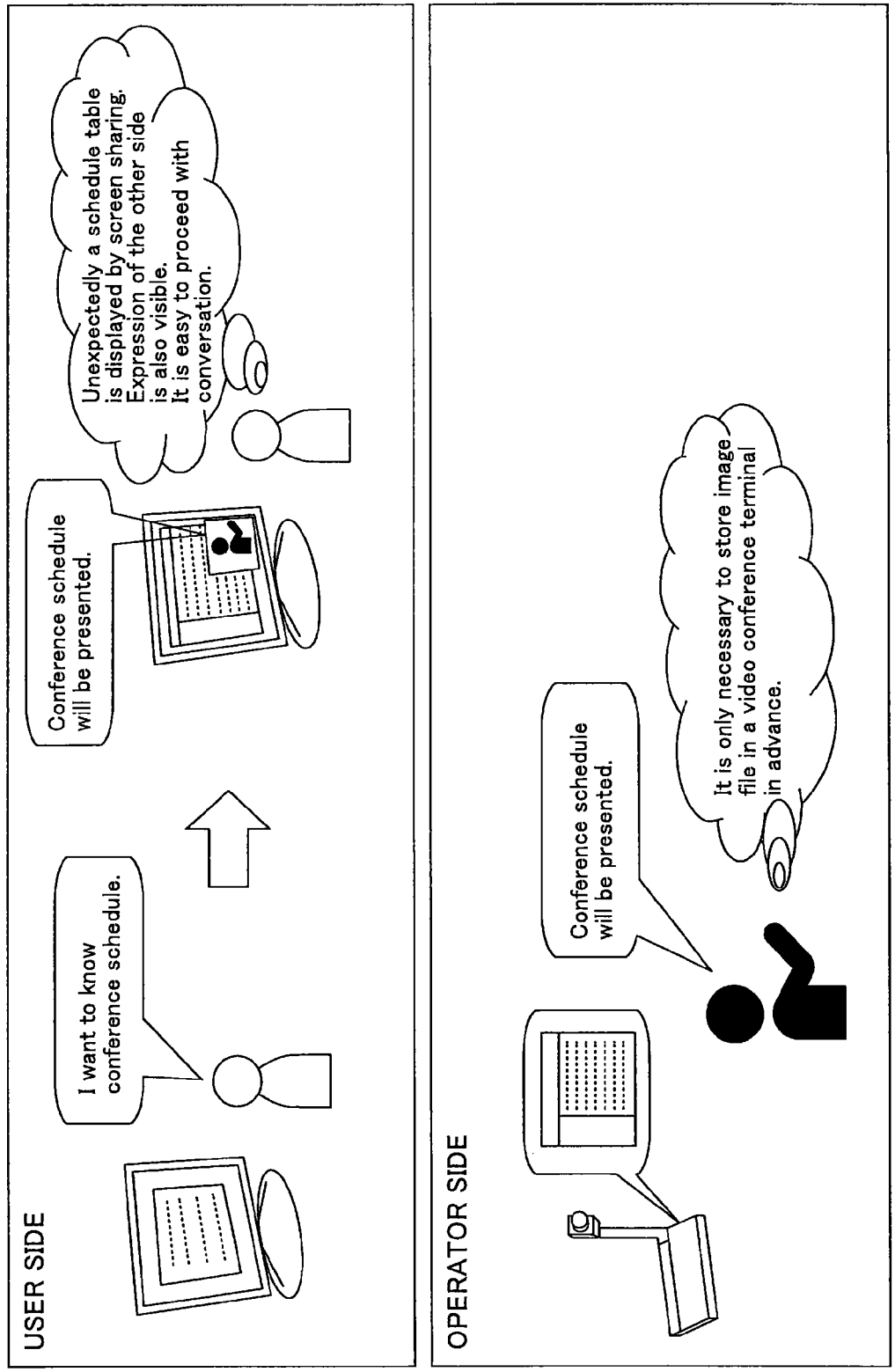

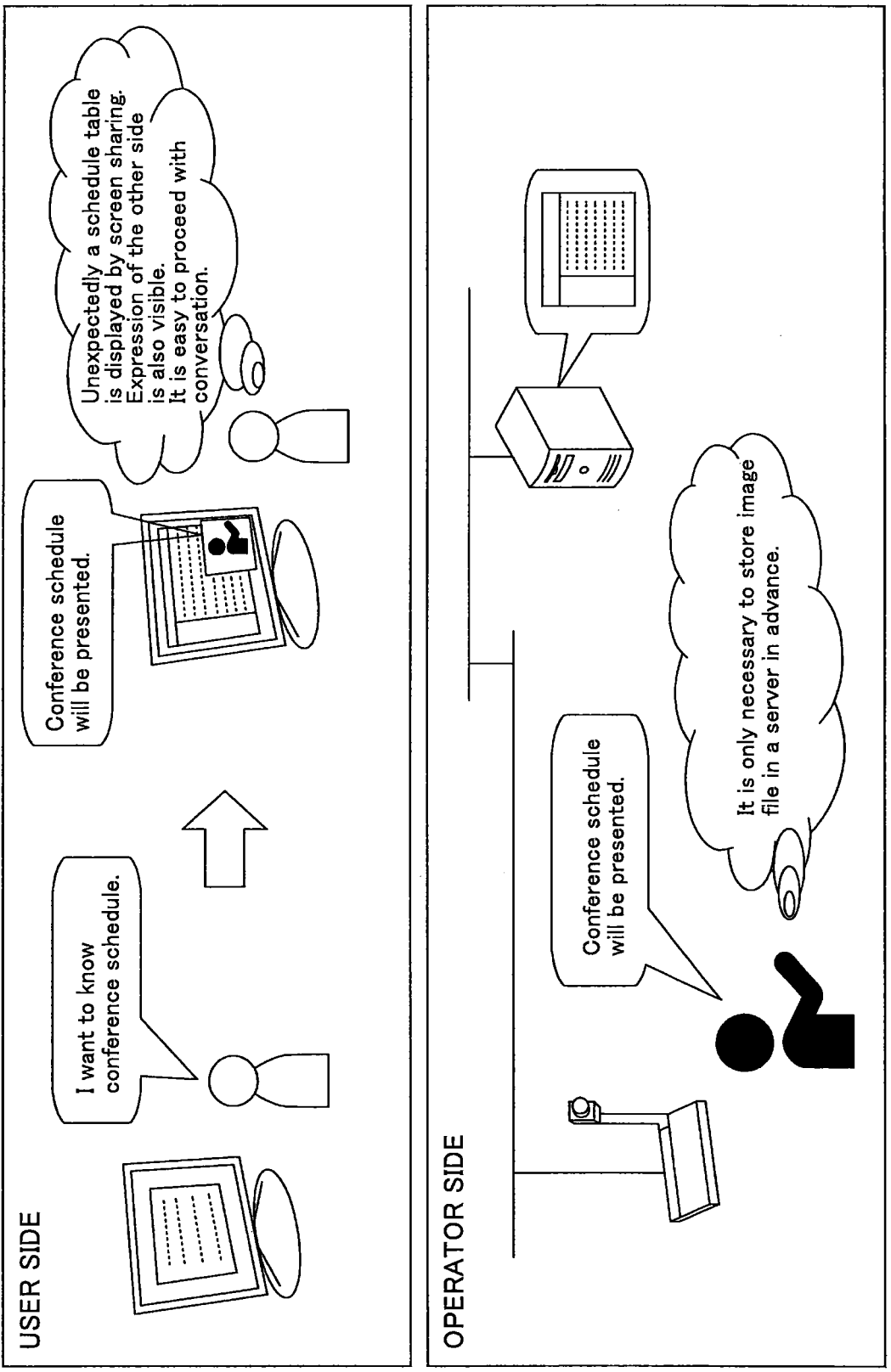

FIG.41

| NUMBER | INQUIRY CONTENT | DISPLAY DATA |
|---|---|---|
| 1 | ABOUT CONFERENCE SCHEDULE | schedule.pdf |
| 2 | ABOUT METHOD FOR ACCESSING CONFERENCE | access.pdf |
| 3 | ABOUT USAGE OF FACILITY | usage.png |
| 4 | ABOUT NEIGHBORHOOD FACILITY | facility.png |
| 5 | WANT CONTACT INFORMATION | - |
| 6 | OTHERS | - |

FIG.44

| NUMBER | INQUIRY CONTENT | OPERATION MODE | DISPLAY DATA | STORAGE DESTINATION |
|---|---|---|---|---|
| 1 | ABOUT CONFERENCE SCHEDULE | 3 | schedule.pdf | C:¥aa/bb/cc |
| 2 | ABOUT METHOD FOR ACCESSING CONFERENCE | 2 | - | - |
| 3 | ABOUT USAGE OF FACILITY | 3 | usage.png | ggg.hh.net |
| 4 | ABOUT NEIGHBORHOOD FACILITY | 2 | - | - |
| 5 | WANT CONTACT INFORMATION | 1 | - | - |
| 6 | OTHERS | 1 | - | - |

TRANSMISSION SYSTEM, METHOD AND PROGRAM

BACKGROUND OF THE INVENTION

1. Field of the Invention

The disclosures herein generally relate to a transmission system, a method and a program.

2. Description of the Related Art

Recently, with increase in capacity of internet connections, occasions of employing video conferences using video conference terminals or Web conference applications for communicating while viewing the expressions of an other party, as one of communication tools for business, have been increasing. Such video conferences are not limited to a specific application, but can be applied to various use scenes, such as a call center or a help desk.

Japanese Published Patent Application No. 2003-134239 discloses a technique for the purpose of rapidly handling a trouble ticket or a support question at a help desk. That is, Japanese Published Patent Application No. 2003-134239 discloses a database for unitarily managing information on customers, contract information for each customer, questions from customers and/or information on content of customer service, and performing customer service for a telephone or an electric mail from a customer, based on information in the database, and according to the content of the service contract with the customer.

In the case of applications in which an other party is not specifically limited though, an outline of the other party is limited from a sending user according to the purpose, such as to a call center or a help desk, a problem may occur compared to the case of a face-to-face meeting.

For example, at a reception desk of a hotel, in the case of face-to-face, a person in charge can view a figure of a customer before the customer comes to the reception desk. The person in charge can suppose a trouble to some extent from an expression, a gesture or the like of the customer, and can handle the trouble rapidly.

However, in the case of a video conference, the person in charge cannot acquire connection information of the other party until receiving an incoming call and starting the video conference in response to the incoming call.

SUMMARY OF THE INVENTION

It is a general object of at least one embodiment of the present invention to provide a transmission system, a method and a program that substantially obviate one or more problems caused by the limitations and disadvantages of the related art.

In one embodiment, a transmission system for managing communication between a first terminal and a second terminal, includes a reception unit configured to receive request information from the first terminal, the request information indicating a category of a request of a first user of the first terminal; and a transmission unit configured to transmit an output request to the second terminal. The second terminal outputs image data to be displayed on the first terminal according to the category of the request of the first user of the first terminal upon receiving the output request.

In another embodiment, a method for managing communication between a first terminal and a second terminal, includes receiving request information from the first terminal, the request information indicating a category of a request of a first user of the first terminal; and transmitting an output request to the second terminal. The second terminal outputs image data to be displayed on the first terminal according to the category of the request of the first user of the first terminal upon receiving the output request.

In yet another embodiment, a non-transitory computer-readable storage medium stores a program for causing a transmission system, to which a first terminal and a second terminal are connected, to execute a process of managing communication between the first terminal and the second terminal. The process includes receiving request information from the first terminal, the request information indicating a category of a request of a first user of the first terminal; and transmitting an output request to the second terminal. The second terminal outputs image data to be displayed on the first terminal according to the category of the request of the first user of the first terminal upon receiving the output request.

According to the present embodiment, it becomes possible to rapidly handle content of an inquiry from a sender in a video conference.

BRIEF DESCRIPTION OF THE DRAWINGS

Other objects and further features of embodiments will be apparent from the following detailed description when read in conjunction with the accompanying drawings, in which:

FIGS. 6A to 6C are schematic diagrams for explaining an example of image quality of image data according to the present embodiment;

FIG. 7 is a schematic diagram illustrating an example of a table for managing change in quality of image data according to the present embodiment;

FIG. 8 is a schematic diagram illustrating an example of a table for managing the relay apparatus according to the present embodiment;

FIG. 9 is a schematic diagram illustrating an example of a table for managing authentication for the terminal according to the present embodiment;

FIG. 10 is a schematic diagram illustrating an example of a table for managing the terminal according to the present embodiment;

FIG. 11 is a schematic diagram illustrating an example of a table for managing a destination list according to the present embodiment;

FIG. 12 is a schematic diagram illustrating an example of a table for managing a session according to the present embodiment;

FIG. 13 is a schematic diagram illustrating an example of a table for managing an address priority according to the present embodiment;

FIG. 14 is a schematic diagram illustrating an example of a table for managing a transmission rate priority according to the present embodiment;

FIG. 15 is a schematic diagram illustrating an example of a table for managing the image quality according to the present embodiment;

FIG. 20 is a diagram illustrating an example of a calculation status of a point of a priority in narrowing a relay apparatus according to the present embodiment;

FIG. 30 is a diagram illustrating an example of a screen displaying a destination list according to the present embodiment;

FIG. 32 is a schematic diagram illustrating an example of a table for managing an operation according to the present embodiment;

FIG. 38 is a sequence diagram illustrating an example of a process of communicating between transmission terminals according to the present embodiment;

FIGS. 39A and 39B are diagrams for explaining an example of an outline of the transmission system 1 according to the present embodiment;

FIG. 41 is a schematic diagram illustrating an example of a table for managing an operation according to the present embodiment;

FIG. 44 is a schematic diagram illustrating an example of a table for managing an operation according to the present embodiment.

DESCRIPTION OF THE PREFERRED EMBODIMENTS

In the following, embodiments of the present invention will be described with reference to the accompanying drawings. First, a basic configuration of a transmission system used in the present embodiment will be explained with reference to FIGS. 1 to 28. Then, a schematic configuration of the transmission system will be explained with reference to FIGS. 29 to 45.

<<Basic Configuration of Transmission System>>

Figure 1:
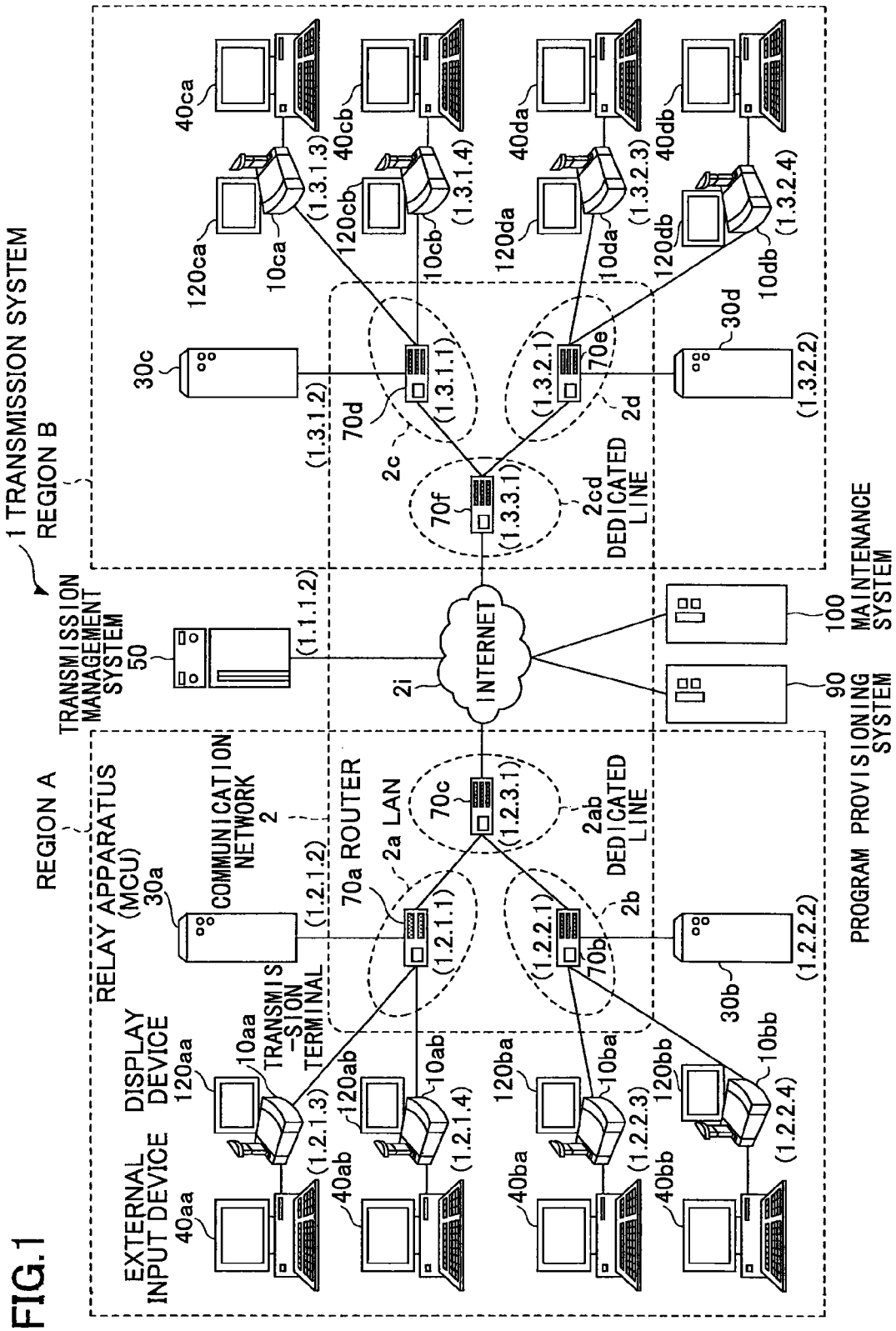
FIG. 1 is a diagram schematically illustrating an example of a transmission system according to a present embodiment.

FIG. 1 is a schematic diagram illustrating an example of a transmission system 1 used in the present embodiment. A transmission system includes a data provisioning system, in which content data are transmitted unidirectionally via a transmission management system (management apparatus) from one transmission terminal to another transmission terminal, and a communication system, in which information, emotion or the like is communicated bidirectionally via the transmission management system among plural transmission terminals. The communication system communicates via the communication management system (corresponding to the "transmission management system") among plural communication terminals (corresponding to the "transmission terminals") information, emotion or the like bidirectionally. A video conference system, a visual telephony system, a voice conference system, a voice telephony system, a PC (Personal Computer) screen sharing system and the like belong to the communication system.

Here, the video conference system is assumed to be an example of the communication system. The video conference management system is assumed to be an example of the communication management system. The video conference terminal is assumed to be an example of the communication terminal. With the above assumptions, the transmission system, the transmission management system and the transmission terminal will be explained. That is, the transmission terminal and the transmission management system can be applied not only to the video conference system, but also to the communication system or to the transmission system.

A transmission system 1 according the present embodiment, shown in FIG. 1, includes plural transmission terminals (10aa, 10ab, . . . , 10db), plural display units (120aa, 120ab, . . . , 120db) for the respective transmission terminals (10aa, 10ab, . . . , 10db), plural relay apparatuses (30a, 30b, 30c, and 30d), a transmission management system 50, a program provisioning system 90 and a maintenance system 100.

Meanwhile, in the following, in the case of indicating an arbitrary transmission terminal of the plural transmission terminals (10aa, 10ab, . . . , 10db), "transmission terminal 10" is used. In the case of indicating an arbitrary display unit of the plural display units (120aa, 120ab, . . . , 120db), "display unit 120" is used. In the case of indicating an arbitrary relay apparatus of the plural relay apparatuses (30a, 30b, 30c, 30d), "relay apparatus 30" is used.

The transmission terminal 10 sends/receives image data, voice data, or the like to/from other transmission terminals 10. In the following, the case where the image data are video data will be explained. The image data may be still image data. Moreover, images of the image data may include both video and still images. The relay apparatus 30 relays image data and voice data between the transmission terminals 10. The transmission management system 50 manages the plural transmission terminals 10 and the plural relay apparatuses 30 in an integrated fashion.

An external input device 40 is connected to the transmission terminal 10, and sends display data for displaying presentation document data to the transmission terminal 10. The presentation document data, here, include data utilized by using, for example, document preparation software, a spreadsheet software, presentation software of the like.

Moreover, plural routers (70a, 70b, . . . , 70f, as shown in FIG. 1, select optimum paths of the image data and voice data. In the following, in the case of indicating an arbitrary router of the plural routers (70a, 70b, . . . , 70f), "router 70" is used. The program provisioning system 90 includes a hard disk (HD), which is not shown. The HD stores a program for the transmission terminal to realize various functions or various means in the transmission terminal 10. The program provisioning system 90 can send the program for the transmission terminal to the transmission terminal 10. Moreover, the HD also stores a program for the relay apparatus to realize various functions or various means in the relay apparatus 30, and the program provisioning system 90 can send the program for the relay apparatus to the relay apparatus 30. Furthermore, the HD also stores a program for the transmission management to realize various functions or various means in the transmission management system 50, and the program provisioning system 90 can send the program for the transmission management to the transmission management system 50.

Moreover, the transmission terminals 10aa and 10ab, the relay apparatus 30a, and the router 70a are connected with each other for a communications connection via a LAN (Local Area Network) 2a, and the transmission terminals 10ba and 10bb, the relay apparatus 30b, and the router 70b are connected with each other for a communications connection via a LAN 2b. The LAN 2a and the LAN 2b are connected with each other for a communications connection via a dedicated line tab including a router 70c, and configured in a predetermined region A. For example, region A is Japan, the LAN 2a is configured in an office in Tokyo, and the LAN 2b is configured in an office in Osaka.

On the other hand, the transmission terminals 10ca and 10cb, the relay apparatus 30c, and the router 70d connected with each other for a communications connection via a LAN 2c, and the transmission terminals 10da and 10db, the relay apparatus 30d, and the router 70e are connected with each other for a communications connection via a LAN 2d. The LAN 2c and the LAN 2d are connected with each other for a communications connection via a dedicated line 2cd including a router 70f, and configured in a predetermined region B. For example, region B is the United States of America, the LAN 2c is configured in an office in New York, and the LAN 2d is configured in an office in Washington D.C. Region A and region B are connected for a communications connection via an Internet 2i by routers (70c and 70f), respectively.

Moreover, the transmission management system 50 and the program provisioning system 90 are connected for a communications connection with the transmission terminal 10 and the relay apparatus 30 via the Internet 2i. The transmission management system 50 and the program provisioning system 90 may be installed in region A, in region B, or in another region.

In the present embodiment, the communication network 2 is configured by the LAN 2a, the LAN 2b, the dedicated line 2ab, the Internet 2i, the dedicated line 2cd, the LAN 2c and the LAN 2d.

Moreover, combinations of four integers with parenthesis, indicated below for the transmission terminals 10, the relay apparatuses 30, the transmission management system 50, the routers 70, and the program provisioning system 90, in FIG. 1, simply represent IP (Internet Protocol) addresses in a form of IPv4. For example, the IP address of the transmission terminal 10aa is "1.2.1.3". Moreover, IPv6 may be adopted instead of IPv4, but IPv4 is employed for simplicity in the present embodiment.

<<Hardware Configuration>>

Figure 2:
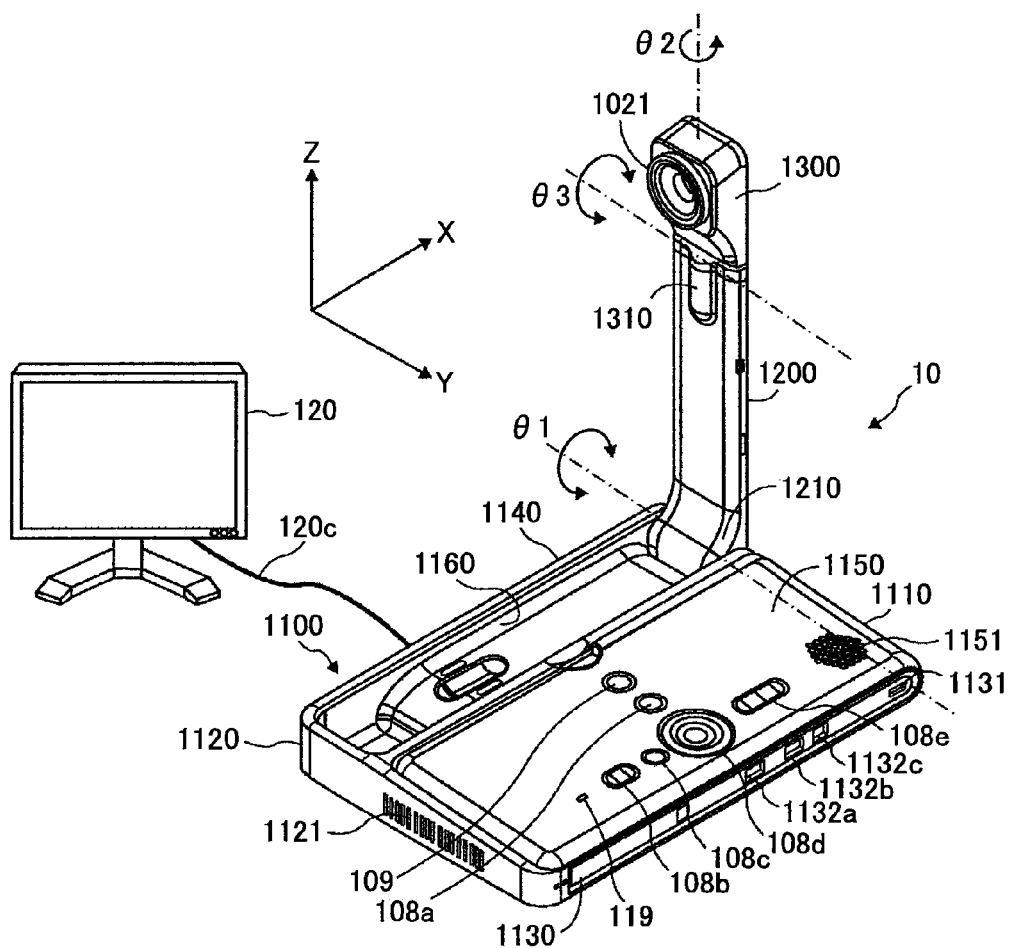
FIG. 2 is an external view illustrating an example of a transmission terminal according to the present embodiment.

FIG. 2 is an external view illustrating the transmission terminal 10 according to the present embodiment. In the following, the transmission terminal 10 will be explained denoting a longitudinal direction of the transmission terminal 10 as an X-axis direction, a direction orthogonal to the X-direction in a horizontal plane as a Y-axis direction and a direction orthogonal to the X-direction and the Y-direction (vertical direction) as a Z-axis direction.

As shown in FIG. 2, the transmission terminal 10 includes a chassis 1100, an arm 1200 and a camera housing 1300. On a front side wall surface 1110 of the chassis 1100, an intake surface (not shown) in which plural intake holes are formed is provided, and on a rear side wall surface 1120 of the chassis 1100, an exhaust surface 1121 in which plural exhaust holes are formed is provided. According to the above configuration, by driving a cooling fan embedded in the chassis 1100, outside air behind the transmission terminal 10 can be taken in via the intake surface (not shown) and exhausted backward via the exhaust surface 1121. On a right side wall surface 1130 of the chassis 1100, a sound pickup hole 1131 is formed, and sound such as voice sound, noise or the like can be picked up by a built-in microphone 114, which will be described later.

On the side of the right side wall surface 1130 of the chassis 1100, an operation panel 1150 is formed. The operation panel 1150 is provided with plural operation buttons (108a to 108e), which will be described later, a power switch 109, which will be described later, and an alarm lamp 119, which will be described later. Furthermore, on the operation panel 1150, a sound output surface 1151, in which plural sound output holes are formed for passing output sound from a built-in speaker 115, which will be described later, is formed.

Moreover, on the side of the left side wall surface 1140 of the chassis 1100, a storage part 1160, which is a recessed part, for storing the arm 1200 and the camera housing 1300. On the right side wall surface of the chassis 1100, plural connection ports (1132a to 1132c) for connecting electrically a cable to an external device connection I/F 118, which will be described later, are provided. On the other hand, on a left side wall surface 1140 of the chassis 1100, a connection port (not shown) for connecting electrically a cable 120c for the display 120 to the external device connection I/F 118 is provided.

Meanwhile, in the following, in the case of indicating an arbitrary operation button of the plural operation buttons (108a to 108e), "operation button 108" is used, and in the case of indicating an arbitrary connection port of the plural connection ports (1132a to 1132c), "connection port 1132" is used for explanation.

Next, the arm 1200 is mounted on the chassis 1100 via a torque hinge 1210. The arm 1200 is configured so that the arm 1200 is rotatable vertically where a tilt angle θ1 with respect to the chassis 1100 is within a range of 135 degrees. FIG. 2 illustrates the state where the tilt angle θ1 is 90 degrees.

The camera housing 1300 is provided with a built-in camera 1021, which images a user, a paper document, a room or the like. Moreover, a torque hinge 1310 is formed on the camera housing 1300. The camera housing 1300 is mounted on the arm 1200 via the torque hinge 1310. The camera housing 1300 is configured so that the camera housing 1300 is rotatable vertically and horizontally where a pan angle θ2 with respect to the arm 1200 is within a range of ±180 degrees (FIG. 2 shows the state of 0 degrees), and a tilt angle θ3 is within a range of ±45 degrees.

Meanwhile, since the relay apparatus 30, the transmission management system 50 and the program provisioning system 90 have the same external views as a general server computer, an explanation of the external views will be omitted.

Figure 3:
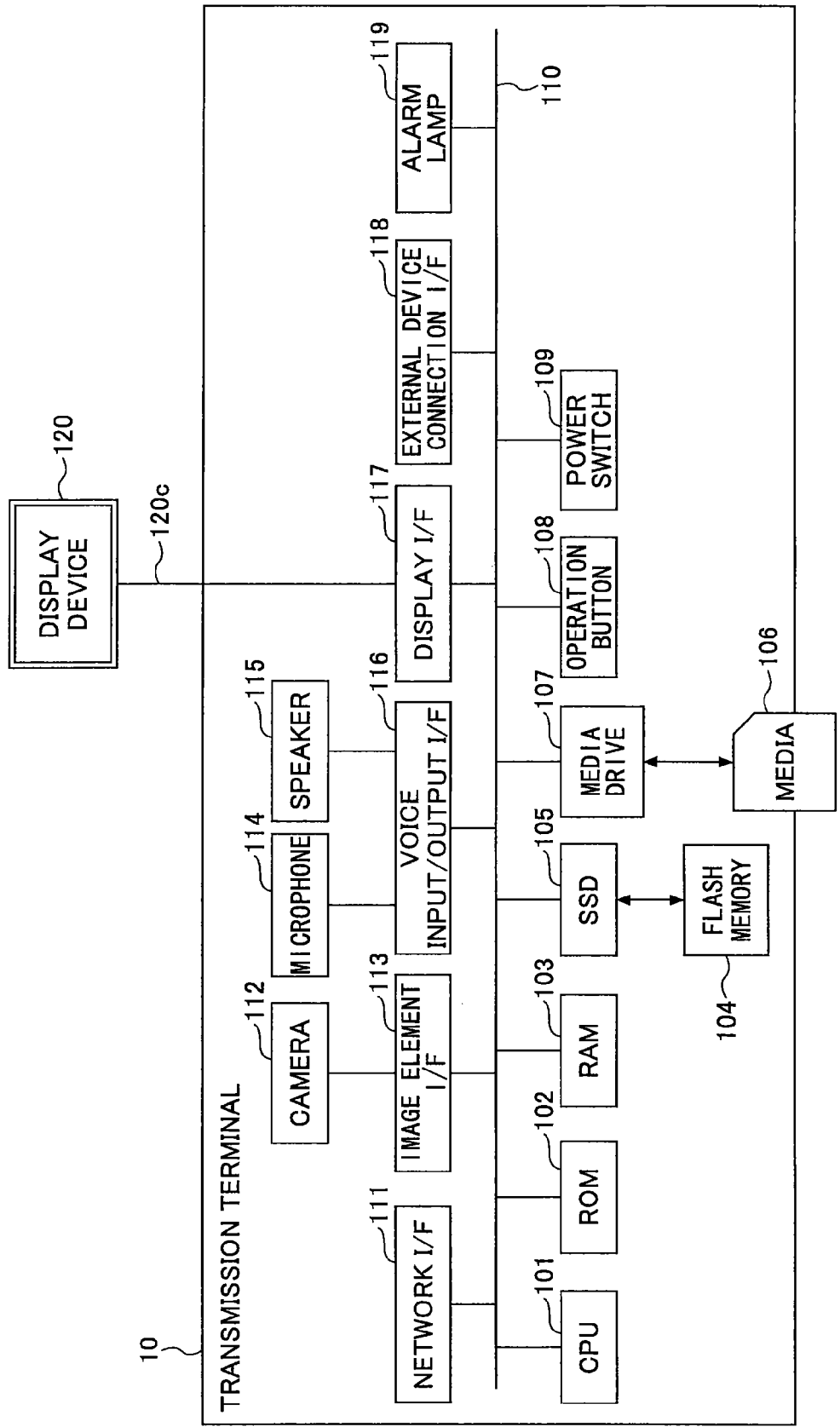
FIG. 3 is a hardware configuration diagram illustrating an example of the transmission terminal according to the present embodiment.

FIG. 3 is a diagram illustrating a hardware configuration of the transmission terminal 10. As shown in FIG. 3, the transmission terminal 10 includes a CPU (central processing unit) 101, which controls operations of the whole terminal 10; a ROM (read-only memory) 102, which stores the program for the transmission terminal; a RAM (random access memory) 103, used as a work area for the CPU 101; a flash memory 104, storing various data, such as image data and voice data; an SSD (solid state drive) 105, which controls reading from and writing to the flash memory 104 the various data according to the control by the CPU 101; a media drive 107, which controls reading data from and writing (storing) data to a recording medium 106, such as a flash memory; an operation button 108, which is operated when switching a destination of the transmission terminal 10, or the like; a power switch 109, used for turning on or off the transmission terminal 10; and a network I/F (interface) 111 for transmitting data using the communication network 2, which will be described later. Moreover, the transmission terminal 10 further includes a camera 112, for acquiring image data by taking a picture of an object according to control by the CPU 101; an image element I/F 113, which controls the driving of the camera 112; a microphone 114 for inputting voice (sound); a speaker 115 for outputting voice; a voice input/output I/F 116, which performs inputting/outputting processing for a voice signal between the microphone 114 and the speaker 115 according to the control by the CPU 101; a display I/F 117, which transmits image data to an external display unit 120 according to the control by the CPU 101; an external device connection I/F 118, for sending/receiving various data to/from external devices; an alarm lamp 119 for giving notice of a problem in the functions of the transmission terminal 10; and a bus line 110, such as an address bus or a data bus, which electrically connects the above components, as shown in FIG. 3.

The display unit 120 includes a display unit, formed of liquid crystal or organic EL (electro luminescence), which displays an image of the object or an icon image for operation. Moreover, the display 120 is connected to the display I/F 117 via a cable 120c. The cable 120c may be a cable for an analogue RGB (VGA) signal, a component video cable, or a cable for HDMI (High-Definition Multimedia Interface) (trademark registered) or for a DVI (Digital Video Interactive) signal.

The camera 112 includes a lens and a solid-state image element, which converts light into an electric signal to obtain digital data for an image (video) of an object. For the solid-state image element, for example, CMOS (complementary metal oxide semiconductor), CCD (charge coupled device), or the like is used.

To the external device connection I/F 118, by a USB (Universal Serial Bus) cable inserted into the connection port 1132 of the chassis 1100, shown in FIG. 2, or the like, external devices such as an external camera, an external microphone or an external speaker can be connected, respectively. In the case where the external camera is connected, prior to the built-in camera 112, the external camera is activated according to the control by the CPU 101. In the same way, in the case of the external microphone is connected or the external speaker is connected, prior to the built-in microphone 114 or the built-in speaker, respectively, the external microphone or the external speaker is activated according to the control by the CPU 101.

The recording medium 106 is detachable from the terminal 10. Moreover, if the recording medium 106 is a non-volatile memory, from which data are read, or into which data are written according to the control by the CPU 101, not only the flash memory 104, but also EEPROM (electrically erasable and programmable ROM) or the like may be used. Moreover, if the camera 112 includes a solid-state image element, which converts light into an electric signal to obtain digital data for an image (picture) of an object, to image the object, not only the CCD, but also the CCD (charge coupled device), or the like may be used. Moreover, the display unit 120 is formed of liquid crystal or organic EL (electro luminescence), which displays an image of the object or an icon image for operation.

Furthermore, the program for the transmission terminal 10 may be distributed as a file in an installable form or in an executable form stored in a recording medium readable by a computer, such as the recording medium 106.

Figure 4:
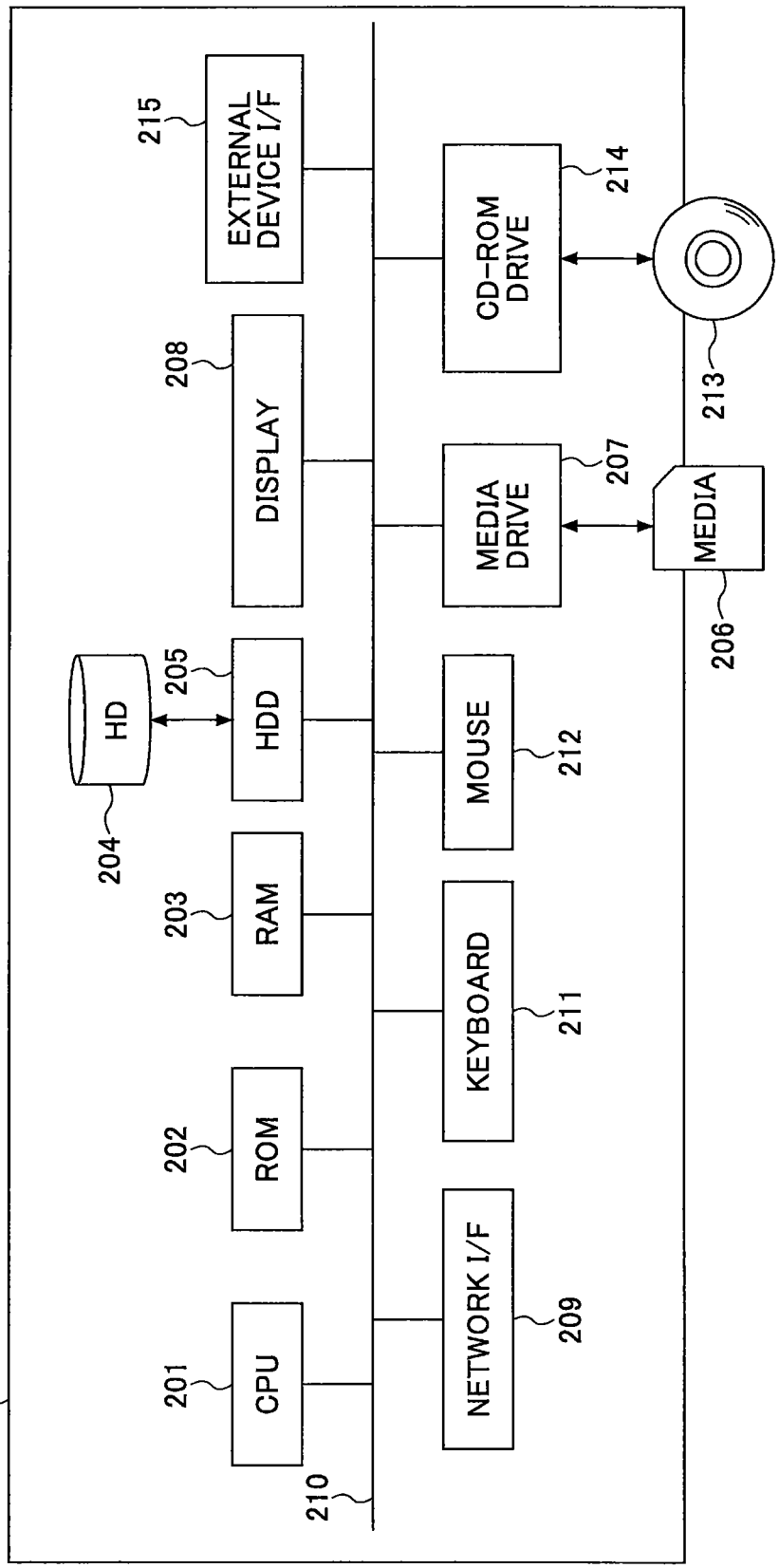
FIG. 4 is a hardware configuration diagram illustrating an example of a transmission management system, a relay apparatus, a program provisioning server or an external input apparatus according to the present embodiment.

FIG. 4 is a diagram illustrating a hardware configuration of the transmission management system 50. The transmission management system 50 includes a CPU 201, which controls operations of the whole transmission management system 50; a ROM 202, which stores a program for transmission management; a RAM 203, used as a work area for the CPU 201; a HD (hard disk) 204, which stores various data; a HDD (hard disk drive) 205, which controls reading data from and writing data to the HD 204 according to control by the CPU 201; a media drive 207, which controls reading data from and writing (storing) data to a recording medium 206, such as a flash memory; a display 208 for displaying various information items, such as a cursor, a menu, a window, a character or an image; a network I/F 209 for transmitting data using the communication network 2, which will be explained later; a keyboard 211 equipped with plural keys for inputting characters, numerical values, various instructions or the like; a mouse 212 for performing selection and execution of various instructions, selection of a processing object, a cursor movement, or the like; a CD-ROM drive 214, which controls reading various data from and writing various data to a CD-ROM (compact disc read only memory) 213, as an example of a detachable recording medium; an external device I/F 215, which sends/receives information items to/from an external device; and a bus line 210, such as an address bus or a data bus, which electrically connects the above components, as shown in FIG. 4.

Moreover, the program for the transmission management may be distributed as a file in an installable form or in an executable form stored in a recording medium readable by a computer, such as the recording medium 206, the CD-ROM 213 or the like.

Furthermore, since the external input device 40 has the same hardware configuration as the transmission management system 50, an explanation thereof will be omitted. However, a program for an external input device for controlling the external input device 40 is stored in the ROM 202. Also in this case, the program for an external input device may be distributed as a file in an installable form or in an executable form stored in a recording medium readable by a computer, such as the recording medium 206, the CD-ROM 213 or the like.

Moreover, since the relay apparatus 30 has the same hardware configuration as the transmission management system 50, an explanation thereof will be omitted. However, a program for a relay apparatus for controlling the relay apparatus 30 is stored in the ROM 202. Also in this case, the program for a relay apparatus may be distributed as a file in an installable form or in an executable form stored in a recording medium readable by a computer, such as the recording medium 206, the CD-ROM 213 or the like.

Moreover, since the program provisioning system 90 has the same hardware configuration as the transmission management system 50, an explanation thereof will be omitted. However, a program for provisioning program for controlling the program provisioning system 90 is stored in the ROM 202. Also in this case, the program for provisioning program may be distributed as a file in an installable form or in an executable form stored in a recording medium readable by a computer, such as the recording medium 206, the CD-ROM 213 or the like.

The maintenance system 100 is a computer which maintains or manages at least one of the transmission terminal 10, the relay apparatus 30, the transmission management system 50 or the program provisioning system 90. For example, in the case that the maintenance system 100 is installed in one country and the transmission terminal 10, the relay apparatus 30, the transmission management system 50 or the program provisioning system 90 is installed in another country, the maintenance apparatus 100 performs the maintenance process of keeping, managing, maintaining, or the like, for at least one of the transmission terminal 10, the relay apparatus 30, the transmission management system 50, an authentication system 80 and the program provisioning system 90, remotely via the communication network 2.

Moreover, the maintenance system 100 performs a maintenance process of managing a model number, a production number, a sales destination, maintenance and inspection, a failure history or the like, for at least one of the transmission terminal 10, the relay apparatus 30, the transmission management system 50, and the program provisioning system 90, without using the communication network 2.

Moreover, the program provisioning system 90 and the maintenance apparatus 100 have the same hardware configuration as the transmission management system 50, an explanation thereof will be omitted. However, the HD 204 stores the provisioning program for controlling the program provisioning system 90. Also in this case, the provisioning program may be distributed as a file in an installable form or in an executable form stored in a recording medium readable by a computer, such as the recording medium 206, the CD-ROM 213 or the like. Moreover, the provisioning program may be stored in the ROM 202 instead of the HD 204.

As another example of the detachable recording medium, the program may be distributed as a file stored in a recording medium readable by a computer, such as a CD-R (compact disc recordable), a DVD (digital versatile disk), a Blu-ray disc, or the like.

<<Basic Functional Configuration>>

Figure 5:
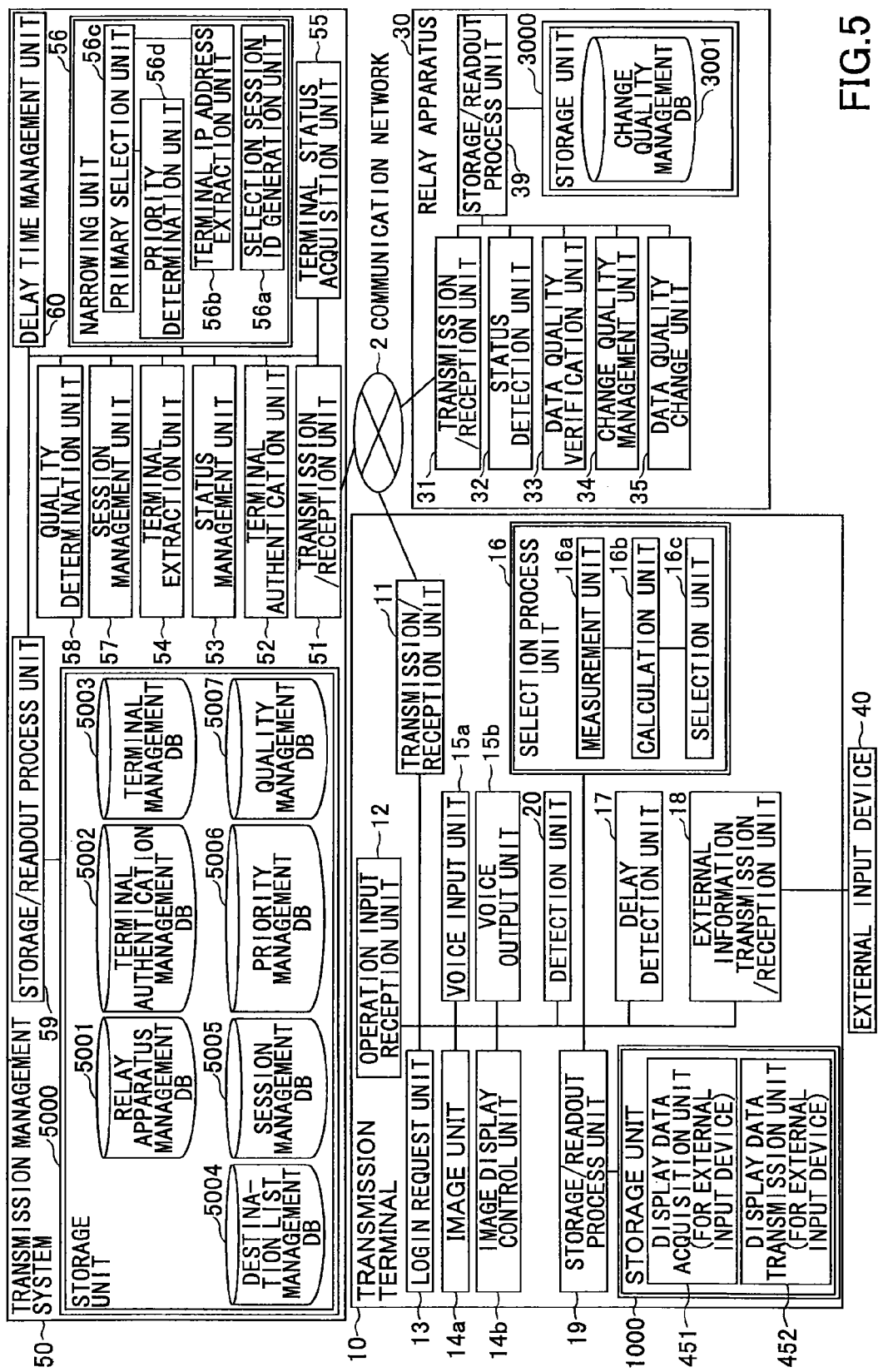
FIG. 5 is a functional block diagram illustrating an example of a terminal, an apparatus and a system in the transmission system according to the present embodiment.
Figure 24:
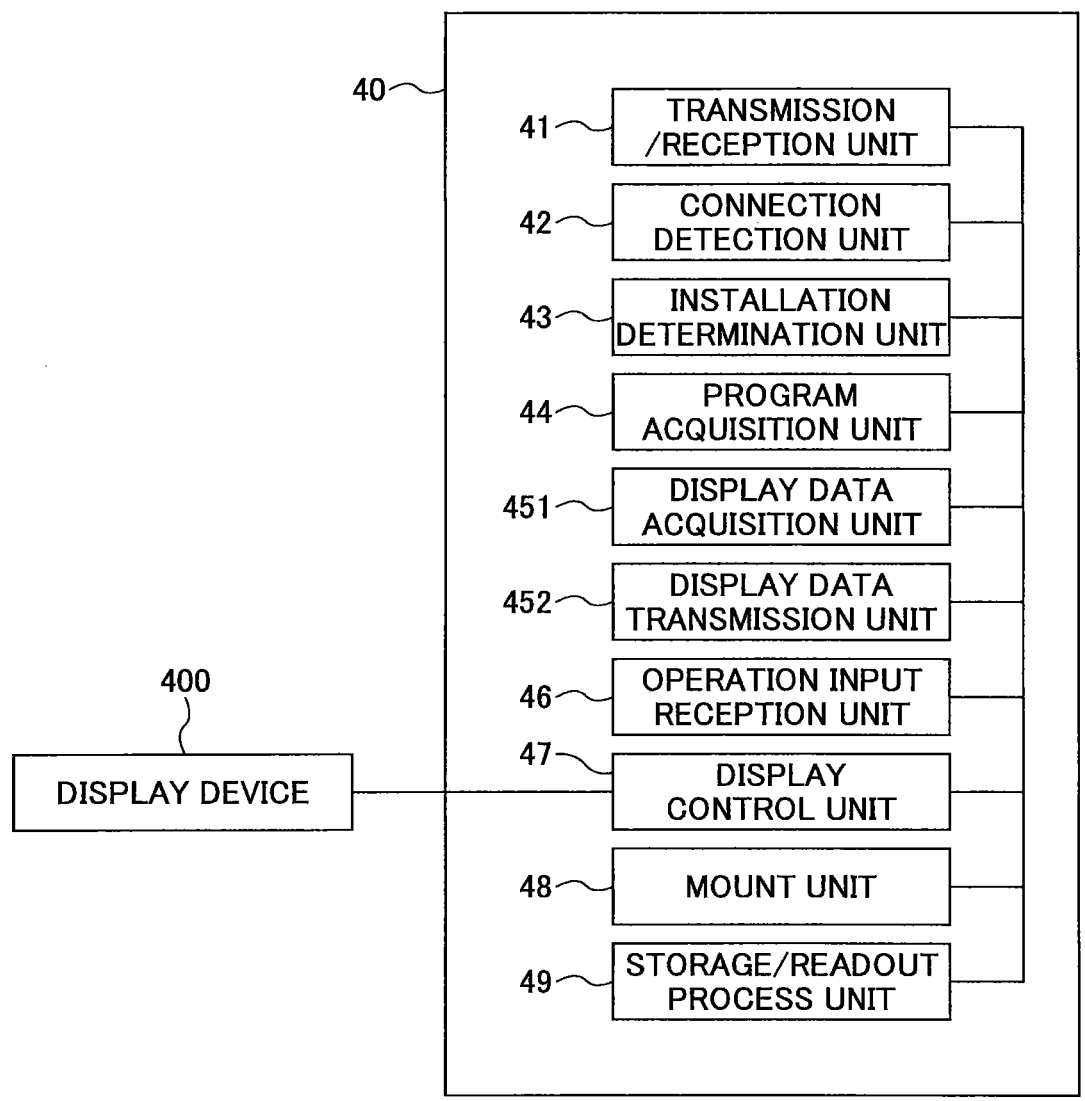
FIG. 24 is a functional block diagram illustrating an example of an external input device according to the present embodiment.

Next, a basic functional configuration of each of the systems and terminals will be explained. FIG. 5 is a functional block diagram illustrating each of the terminals, apparatuses and systems included in the transmission system 1. FIG. 5 shows that the transmission terminal 10, the relay apparatus 30 and the transmission management system 50 are connected so as to perform data communications via the communication network 2. The external input device 40 is connected so as to send/receive data to/from the transmission terminal 10. Moreover, FIG. 24 is a functional block diagram illustrating the external input device 40 included in the transmission system 1. Moreover, the program provisioning system 90, shown in FIG. 1, is not relevant to the communication for the video conference directly, and is omitted in FIG. 5.

<Functional Configuration of Transmission Terminal>

The transmission terminal 10 includes a transmission/reception unit 11; an operation input reception unit 12; a login request unit 13, an image unit 14a, an image display control unit 14b, a voice input unit 15a, a voice output unit 15b, a selection process unit 16, a delay detection unit 17, an external information transmission/reception unit 18, a storage/readout process unit 19. Each of the above units is a function or a functioning means realized by one of the components, shown in FIG. 2, operating according to an instruction from the CPU 201 following the program stored in the ROM 202. Moreover, the terminal 10 includes a storage unit 1000, including the SSD 105, shown in FIG. 3.

(Each Functional Element of Transmission Terminal)

Next, each of the functional elements of the transmission terminal 10 will be explained in detail. The transmission/reception unit 11 of the transmission terminal 10 is realized by the network I/F 111, shown in FIG. 3, and sends various data (information) to and receives various data (information) from other transmission terminal, apparatus or system via the communication network 2. The operation input reception unit 12 is realized by the operation button 108 and the power switch 109, shown in FIG. 3, and receives various inputs from a user. For example, when the user turns the power switch 109 to ON, the operation input reception unit 12 receives a signal of the user's operation, and turns on the power. The login request unit 13 is realized by the instruction from the CPU 101, show in FIG. 3, and when receiving the operation for turning on the power, automatically sends login request information for requiring a login and an IP address of the transmission terminal 10 at the time of sending, from the transmission/reception unit 11 to the transmission management system 50 via the communication network 2.

The image unit 14a is realized by the camera 112 and the image element I/F 113, shown in FIG. 3, takes a pictured of an object and image data obtained by taking the picture. The image display control unit 14b is realized by the display I/F 117, shown in FIG. 3, and performs control for sending the image data to the external display 120. The voice input unit 15a is realized by the microphone 114 and the voice input/output I/F 116, shown in FIG. 3. The voice input unit 15a inputs the user's voice, converts the voice into a voice signal, and outputs voice data regarding the voice signal. The voice output unit 15b is realized by the speaker 115 and the voice input/output I/F 116. The voice output unit 15b converts the voice signal regarding the voice data into a sound, and outputs the sound.

The selection process unit 16 realizes a measurement unit 16a, a calculation unit 16b and a selection unit 16c by the instruction from the CPU 101, shown in FIG. 3, in order to perform a final narrowing process for finally narrowing plural relay apparatuses 30 to a relay apparatus 30. Among them, the measurement unit 16a measures a time and date upon receiving preliminary transmission information, which will be described later, by the transmission/reception unit 11, for each piece of the preliminary transmission information received by the transmission/reception unit 11. The calculation unit 16b calculates required time from transmission to the reception of the preliminary transmission information, based on a difference between the measured reception time and date and a transmission time and date included in the preliminary transmission information, for each piece of preliminary transmission information, for which the reception time and date are measured by the measurement unit 16a. The selection unit 16c finally selects a relay apparatus, by selecting a relay apparatus 30 that relays the preliminary transmission information requiring the shortest required time among the required times calculated by the calculation unit 16b.

The delay detection unit 17 is realized by the instruction from the CPU 101, shown in FIG. 3, and detects a delay time (ms) of the image data or the voice data sent from the other transmission terminal 10 via the relay apparatus 30. Moreover, the external information transmission/reception unit 18 sends/receives data to/from an external device via the external device I/F 215. Moreover, a storage/readout process unit 19 is executed by the SSD 105, shown in FIG. 3, which stores various data into the storage unit 1000, and reads out various data stored in the storage unit 1000. The storage unit 1000 stores a terminal ID (Identification) for identifying the transmission terminal 10, including a password, a relay apparatus ID for identifying the relay apparatus 30 (which sends image data, voice data and various data), an IP address of a destination terminal, and the like. Moreover, the storage unit 1000 stores a display data acquisition unit 451, which is sent to the external input device 40 and operates on the external input device 40 and a display data transmission unit 452. The display data acquisition unit 451 acquires display data displayed by the external input device 40, and the display data transmission unit 452 sends the display data acquired by the display data acquisition unit 41 to the transmission terminal 10. The display data represents image data in a format of JPEG (Joint Photographic Experts Group), Bitmap or the like, or a drawing command in a format of GDI (Graphics Device Interface) or the like transformed from an image displayed on a screen of a display device.

Meanwhile, the terminal ID and the relay apparatus ID, which will be explained later are identification information, such as a language, a character, a symbol, various kinds of signs or the like, used for uniquely identifying the transmission terminal 10 and the relay apparatus 30, respectively. Moreover, the terminal ID and the relay apparatus ID may be a combination of at least two of the language, the character, the symbol, or the numerical signs. In the following explanation, the transmission terminal 10 which is a request source requesting the start of the video conference is denoted "request source terminal 10A", and the transmission terminal 10 which is a destination of the request is denoted "destination terminal 10B".

<Functional Configuration of External Input Device>

The external input device 40, as shown in FIG. 24, includes a transmission/reception unit 41, a connection detection unit 42, an installation determination unit 43, a program acquisition unit 44, an operation input reception unit 46, a display control unit 47, a mount unit 48, and a storage/readout process unit 49. Each of the above units is a function or a means realized by one of the components, shown in FIG. 4, operating according to an instruction from the CPU 201 following the program stored in the ROM 202. Furthermore, the external input device 40 includes a storage unit 4000 configured by the HDD 205, shown in FIG. 4. Moreover, on the external input device 40, an OS (operating system), such as "Windows" (registered trademark), "Mac (registered trademark) OS", "Mac (registered trademark) OS X Lion", "Mac (registered trademark) OS X", "OS X", or the like, though not especially shown, is mounted. Accordingly, the external input device is equipped with a function of executing a program when it is connected to the other apparatus.

<Each Functional Unit of External Input Device>

Next, each unit of the external input device 40 will be explained in detail. The transmission/reception unit 41 of the external input device 40 is realized by the network I/F 209, shown in FIG. 4, and sends/receives various data (information) to/from the transmission terminal 10. The connection detection unit 42 detects that sending/receiving various data to/from an external device becomes possible by the external device I/F 215. The installation determination unit 43 determines whether the display data acquisition unit 451 and the display data transmission unit 452 are installed on the external input device 40. The program acquisition unit 44 acquires the display data acquisition unit 451 and the display data transmission unit 452 from the storage unit 1000 of the transmission terminal 10 connected via the transmission/reception unit 41, and installs them. The operation input reception unit 46 receives information input by a user's operation. The display control unit 47 displays an image read out by the storage/readout process unit 49, which will be described later, on the display unit 400. The mount unit 48 mounts storage units of various kinds of apparatuses connected to the external input device 40 mounted thereon. The storage/readout process unit 49 is executed by the HDD 205, shown in FIG. 4, and performs a process of storing various data into the storage unit 4000 and a process of reading out the various data stored in the storage unit 4000. The storage unit 4000 stores document data or the like.

<Functional Configuration of Relay Apparatus>

Next, the function or means of the relay apparatus 30 will be explained. The relay apparatus 30 includes a transmission/reception unit 31, a status detection unit 32, a data quality verification unit 33, a change quality management unit 34, a data quality change unit 35, and a storage/readout process unit 39. Each of the above units is a function or a means realized by one of the components, shown in FIG. 4, operating according to an instruction from the CPU 201 following the program stored in the ROM 202. Moreover, the relay apparatus 30 includes a storage unit 3000 configured by the HD 204, shown in FIG. 4.

(Change Quality Management Table)

The storage unit 3000 includes a change quality management DB 3001, configured by a change quality management table, as shown in FIG. 7. The change quality management table manages an IP address of a transmission terminal 10, to which image data are relayed, and a quality of the image data, to be relayed to the transmission terminal 10 by the relay apparatus 30, which are associated with each other.

Here, a resolution of an image represented by image data will be explained in the following. FIG. 6A illustrates an example of an image with a low resolution, as a base image, having 160 pixels in the horizontal direction and 120 pixels in the vertical direction. FIG. 6B illustrates an example of an image with an intermediate resolution, having 320 pixels in the horizontal direction and 240 pixels in the vertical direction. FIG. 6C illustrates an example of an image with a high resolution, having 640 pixels in the horizontal direction and 480 pixels in the vertical direction. In the case of communication through a narrow bandwidth path, image data of low image quality including only image data of low resolution as a base image are relayed. In the case where the bandwidth is relatively broad, image data of intermediate quality including image data of the low resolution as a base image and image data of the intermediate resolution are relayed. In the case where the bandwidth is quite broad, image data of high image quality including image data of the low resolution as a base image, image data of the intermediate resolution and image data of the high resolution are relayed. For example, FIG. 7 shows that according to the change quality management table, the relay apparatus 30 relays to the destination terminal 10*db* with the IP address (1.3.2.4) image data of "high image quality".

<Each Functional Element of the Relay Apparatus>

Next, each functional element of the relay apparatus 30 will be explained in detail. In the following, in the explanation of the functional element of the relay apparatus 30, a relationship between the functional element and the component, shown in FIG. 3, which realizes the functional element of the relay apparatus 30, will be described.

The transmission/reception unit 31 of the relay apparatus 30, shown in FIG. 5, is realized by the network I/F 209, shown in FIG. 4, and sends various data (information) to and receives various data (information) from other transmission terminal, other relay apparatus or other system, via the communication network 2. The status detection unit 32 is realized by an instruction from the CPU 201, shown in FIG. 4, and detects an operational status of the relay apparatus 30, which includes the status detection unit 32. The operational status is, for example, "online", or "offline".

The data quality verification unit 33 is realized by an instruction from the CPU 201, show in FIG. 4, and searches the change quality management table (see FIG. 7) utilizing an IP address of the destination terminal 10B as a search key, extracts image quality of image data relayed to the destination terminal with the IP address, and verifies the image quality of the image data to be relayed. The change quality management unit 34 is realized by an instruction from the CPU 201, shown in FIG. 4, and changes content in the change quality management DB 3001, based on quality information, which will be described later, transmitted from the transmission management system 50. For example, in the case where the request source terminal 10*aa* with the terminal ID "01aa" communicates with the destination terminal 10*db* with the terminal ID "01db" in the video conference by sending/receiving image data of high image quality, the request source terminal 10*bb* and the destination terminal 10*ca* start another video conference, and when a delay occurs in receiving image data at the destination terminal 10*db*, the relay apparatus 30 is required to lower the image quality of the image data, which has been relayed, to the intermediate image quality. In such a case, the content in the change quality management DB 3001 is updated so as to lower the image quality of image data relayed by the relay apparatus 30 from the high image quality to the low image quality, based on the quality information for the intermediate image quality.

The data quality change unit 35 is realized by an instruction from the CPU 201, shown in FIG. 4, and changes the image quality of the image data sent from the request source terminal 10 based on the content in the updated change quality management DB 3001. The storage/readout process unit 39 is realized by the HDD 205, shown in FIG. 4, stores various data into the storage unit 3000, and reads out various data stored in the storage unit 3000.

<Functional Configuration of Transmission Management System>

Next, the function or means of the transmission management system 50 will be explained in the following. The transmission management system 50 includes a transmission/reception unit 51, a terminal authentication unit 52, a status management unit 53, a terminal extraction unit 54, a terminal status acquisition unit 55, a narrowing unit 56, a session management unit 57, a quality determination unit 58, a storage/readout process unit 59, and a delay time management unit 60. Each of the above units is a function or means realized by one of the components shown in FIG. 4, operating according to an instruction from the CPU 201 following the program stored in the ROM 202. Moreover, the transmission management system 50 includes a storage unit 5000, configured by the HD 204, shown in FIG. 4.

(Relay Apparatus Management Table)

The storage unit 5000 includes a relay apparatus management DB 5001, including a relay apparatus management table, as shown in FIG. 8. The relay apparatus management table manages an operational status of the relay apparatus 30, a reception time when the transmission management system 50 receives status information indicating the operational status, an IP address of the relay apparatus 30, and the maximum data transmission rate (Mbps) at the relay apparatus 30, which are associated with each other, for each relay apparatus ID of the relay apparatus 30. For example, the relay apparatus management table, shown in FIG. 8, indicates that the relay apparatus 30*a* with the relay apparatus ID "111a", is in the operational status "online", the status information is received by the management system 50 on "Nov. 10, 2009, 13:00", the IP address of the relay apparatus 30*a* is "1.2.1.2", and the maximum data transmission rate of the relay apparatus 30*a* is 100 Mbps.

(Terminal Authentication Management Table)

Furthermore, the storage unit 5000 includes a terminal authentication management DB 5002, including a terminal authentication managing table, as shown in FIG. 9. In the terminal authentication management table, each terminal ID of all the transmission terminals 10 managed by the transmission management system 50 is associated with a password. For example, the terminal authentication management table, as shown in FIG. 9, indicates that a terminal ID of the transmission terminal 10*aa* (see FIG. 1) is "01aa" and a password is "aaaa".

(Terminal Management Table)

Moreover, the storage unit 5000 includes a terminal management database (DB) 5003, including a terminal management table, as shown in FIG. 10. The terminal management table manages, for each terminal ID of the transmission terminals 10, an operational status of the transmission terminal 10, a reception time when the transmission management system 50 receives login request information, which will be explained later, and an IP address of the transmission terminal 10, which are associated with each other. For example, the terminal management table, as shown in FIG. 10, indicates that the transmission terminal 10*aa* with the terminal ID "01aa" (see FIG. 1), is in the operational status "online", the transmission management system 50 receives the login request information at "Nov. 10, 2009, 13:40" and the IP address of the transmission terminal 10aa is "1.2.1.3".

(Destination List Management Table)

Furthermore, the storage unit 5000 includes a destination list management DB 5004, including a destination list management table, as shown in FIG. 11. The destination list management table manages request source terminals 10A, which require starting communicating in the video conference, so that all terminal IDs of destination terminals 10B registered as candidates of a destination terminal 10B are associated with each of the terminal IDs of the request source terminals 10A. For example, the destination list management table, shown in FIG. 11, indicates that candidates of a destination terminal 10B, with which the request source terminal 10aa with the terminal ID "01aa" (see FIG. 1) requires to start communication in the video conference, are three transmission terminals, i.e. the transmission terminal 10ab with the terminal ID "01ab", the transmission terminal 10ba with the terminal ID "01ba" and the transmission terminal 10db with the terminal ID "10db". The candidate of the destination terminal 10B may be updated by appending or deleting an item in the destination list management table according to a request from the request source terminal 10 to the transmission management system 50.

(Session Management Table)

Moreover, the storage unit 5000 includes a session management DB 5005, including a session management table, as shown in FIG. 12. The session management table manages, for each of the session IDs for selection used for executing a session to select a relay apparatus 30, a relay apparatus ID of the relay apparatus 30 used for relaying image data and voice data, a terminal ID of the request source terminal 10A, a terminal ID of the destination terminal 10B, a delay time (ms) for reception upon receiving image data at the destination terminal 10B, and a reception time, which are associated with each other. The reception time is a time when the transmission management system 50 receives delay information from the destination terminal 10B which indicates the delay time. For example, the session management table, shown in FIG. 12, indicates that the relay apparatus 30a (with the relay device ID "111a"), selected in a session executed using the session ID for selection "se1", relays image data and voice data between the request source terminal 10aa (with the terminal ID "01aa") and the destination terminal 10db (with the terminal ID "01db"). The session management table further indicates that the delay time of the image data at the destination terminal 10db at the time of "Nov. 10, 2009, 14:00" is 200 ms. Meanwhile, in the case of conducting a video conference between two transmission terminals 10, the reception time of the delay information may be managed based on the delay information sent from the request source terminal 10A, not the destination terminal 10B. However, in the video conference among three or more transmission terminals 10, the reception time of the delay information is managed based on the delay information sent from the transmission terminal 10, which receives image data and voice data.

(Address Priority Management Table)

Furthermore, the storage unit 5000 includes a priority management DB 5006, including an address priority management table, as shown in FIG. 13. The address priority management table manages IP addresses associated with each other so that a point of address priority becomes greater, according to differences between the IP addresses of the general IPv4 for four dot address parts in the respective IP addresses. For example, the address priority management table, shown in FIG. 13, shows that for an IP address where values of three dot addresses from upper bits to lower bits are the same, a point of the address priority is "5". For an IP address where values of two dot addresses from upper bits to lower bits are the same, the point of the address priority is "3". In this case, whether values of dot addresses of the lowest bits are the same is irrelevant to the priority. For an IP address where values of dot addresses of the highest bits are the same but values of the second dot addresses are not the same, the point of the address priority is "1". In this case, whether values of third dot addresses are the same and whether values of dot addresses of the lowest bits are the same are irrelevant to the priority. For an IP address where values of dot addresses of the highest bits are not the same, the point of the address priority is "0". In this case whether values of second, third and lowest bits dot addresses are the same are irrelevant to the priority.

(Transmission Rate Priority Management Table)

Moreover, the priority management DB included in the storage unit 5000 further includes a transmission rate priority management table, as shown in FIG. 14. The transmission rate priority management table manages a data transmission associated with a transmission rate so that a point of transmission rate priority becomes greater according to a value of the maximum data transmission rate (Mbps) at the relay apparatus 30. For example, the transmission rate priority management table, shown in FIG. 14, shows that in the case of the maximum data transmission rate at the relay apparatus 30 greater than or equal to 1000 Mbps, the point of the transmission rate priority is "5". In the case of the maximum data transmission rate at the relay apparatus 30 greater than or equal to 100 Mbps and less than 1000 Mbps, the point of the transmission rate priority is "3". In the case of the maximum data transmission rate at the relay apparatus 30 greater than or equal to 10 Mbps and less than 100 Mbps, the point of the transmission rate priority is "1". In the case of the maximum data transmission rate at the relay apparatus 30 less than 10 Mbps, the point of the transmission rate priority is "0".

(Quality Management Table)

Furthermore, the storage unit 5000 includes a quality management DB 5007, including a quality management table, as shown in FIG. 15. The quality management table manages the delay time (ms) of image data at the request source terminal 10A or the destination terminal 10B, and image quality of the image data to be relayed at the relay apparatus 30, which are associated with each other.

(Each Functional Element in Transmission Management System)

Next, each functional element in the transmission management system 50 will be explained in detail. In the following, in the explanation of the functional element of the transmission management system 50, a relationship between the functional element and the component, shown in FIG. 4, which realizes the functional element of the transmission management system 50, will be described.

The transmission/reception unit 51 is executed by the network I/F 209, shown in FIG. 4, and sends various data (information) to and receives various data (information) from an other terminal, other apparatus or other system via the communication network 2. The terminal authentication unit 52 searches the terminal authentication management DB 5002 in the storage unit 5000 with a terminal ID and a password used as a search key which is included in the login request information received via the transmission/reception unit 51, and determines whether the same terminal ID and the same password are managed in the terminal authentication management DB 5002, in order to perform the terminal authentication. The status management unit 53, in order to manage the operational status of the request source terminal 10A, which requires a login, manages the terminal ID of the request source terminal 10A, the operational status of the request source terminal 10A, the reception time when the transmission management system 50 receives the login request information, and the IP address of the request source terminal 10A, by associating them with each other and then storing them in the terminal management table (see FIG. 11).

The terminal extraction unit 54 extracts a terminal ID by searching the destination list management table (see FIG. 11) with the terminal ID of the request source terminal 10A as a search key which requires a login, and reads out terminal IDs of candidates of a destination terminal 10B which can communicate with the request source terminal 10A. Moreover, the terminal extraction unit 54 searches the destination list management table (see FIG. 11) with the terminal ID of the request source terminal 10A as a search key which requires a login, and searches for terminal IDs of other request source terminals 10A, for each of which the terminal ID of the above request source terminal 10A is registered as a candidate of a destination terminal 10B.

The terminal status acquisition unit 55 searches the terminal management table (see FIG. 10), with the terminal ID of the candidate of the destination terminal 10B as a search key extracted by the above terminal extraction unit 54, and reads out the operating status for each of the terminal IDs extracted by the terminal extraction unit 54. Accordingly, the terminal status acquisition unit 55 can acquire operating status of candidates of the destination terminal 10B, which are allowed to communicate with the request source terminal 10A, which has required the login. Moreover, the terminal status acquisition unit 55, with the terminal ID as a search key extracted by the terminal extraction unit 54, searches the terminal management table (see FIG. 10), and also acquires the operational status of the request source terminal 10A, which has required the login.

In order to support a final narrowing process for finally narrowing plural relay apparatuses 30 to a relay apparatus 30, the narrowing unit 56 includes a selection session ID generation unit 56a, a terminal ID address extraction unit 56b, a primary selection unit 56c and a priority determination unit 56d, for performing primary narrowing process before the final narrowing process. Among them, the selection session ID generation unit 56a generates a selection session ID used for an execution of a session for selecting the relay apparatus 30. The terminal IP address extraction unit 56b, by searching the terminal management table (See FIG. 10) based on a terminal ID of the request source terminal 10A and a terminal ID of the destination terminal 10B, included in start request information sent from the request source terminal 10A, extracts corresponding IP addresses of the respective transmission terminals 10. The primary selection unit 56c selects the relay apparatus 30 by selecting a relay apparatus ID of a relay apparatus 30 with an operational status "ON line" from the relay apparatuses 30 managed by the relay apparatus management table (See FIG. 8).

Moreover, the primary selection unit 56c, by searching the relay apparatus management table (See FIG. 8) based on the IP address of the request source terminal 10A and the IP address of the destination terminal 10B, extracted by the above-described terminal IP address extraction unit 56b, investigates whether each of the dot addresses of the IP address of the relay apparatus 30, selected as above, is the same as the dot address in the respective IP addresses of the above-described request source terminal 10A and the destination terminal 10B. Furthermore, the primary selection unit 56c further selects the relay apparatus 30 by selecting two relay apparatuses 30 having the greatest two of integrated points, each of which integrates a greater of points of the address priorities for the transmission terminals 10 and a point of the transmission rate priority for each of the relay apparatuses 30.

Meanwhile, in the above-described example, the two relay apparatuses 30 having the greatest two of the points are selected. However, the present embodiment is not limited to this. As long as relay apparatuses 30 can be narrowed even by one, three or more relay apparatuses 30 having greater points may be selected.

The priority determination unit 56d determines a point of the address priority for each of the relay apparatuses 30 investigated by the above-described primary selection unit 56c, referring to the priority management table (See FIG. 13). Moreover, the priority determination unit 56d, based on the maximum data transmission rate of the respective relay apparatuses 30 managed by the relay apparatus management table (See FIG. 8), by searching the priority management table (See FIG. 14), determines a point of the transmission rate priority for each of the relay apparatuses 30 narrowed by the above-described primary selection unit 56c.

The session management unit 57 manages selection session ID generated by the selection session ID generation unit 56a, terminal ID of the request source terminal 10A and terminal ID of the destination terminal 10B, by associating them with each other, and stores them in the session management DB 5005 of the storage unit 5000 (See FIG. 12). Moreover, the session management unit 57 manages the relay apparatus ID of the relay apparatus 30, which is finally narrowed to one by the selection unit 16c of the transmission terminal 10, by storing them in the session management table (see FIG. 12) for each of the selection session IDs.

The quality determination unit 58 determines image quality of image data to be relayed by the relay apparatus 30, by searching the quality management table (see FIG. 15) with the above-described delay time as a search key, and extracting image quality corresponding to the image data. The storage/readout process unit 59 is executed by the HDD 205, shown in FIG. 4, and performs a process of storing various data into the storage unit 5000 and a process of reading out various data stored in the storage unit 5000. The delay time management unit 60 searches the terminal management table (see FIG. 10) with the IP address of the above-described destination terminal 10B, and extracts a corresponding terminal ID. The delay time management unit 60, by searching the terminal management table (See FIG. 10) with the IP address of the above-described destination terminal 10B as a search key, extracts corresponding terminal ID, and further, manages the delay time by storing the delay time indicated by the above-described delay information into a field of delay time in the record, including the terminal ID, extracted as above, in the session management table (see FIG. 12).

<<Basic Process/Operation>>

Figure 16:
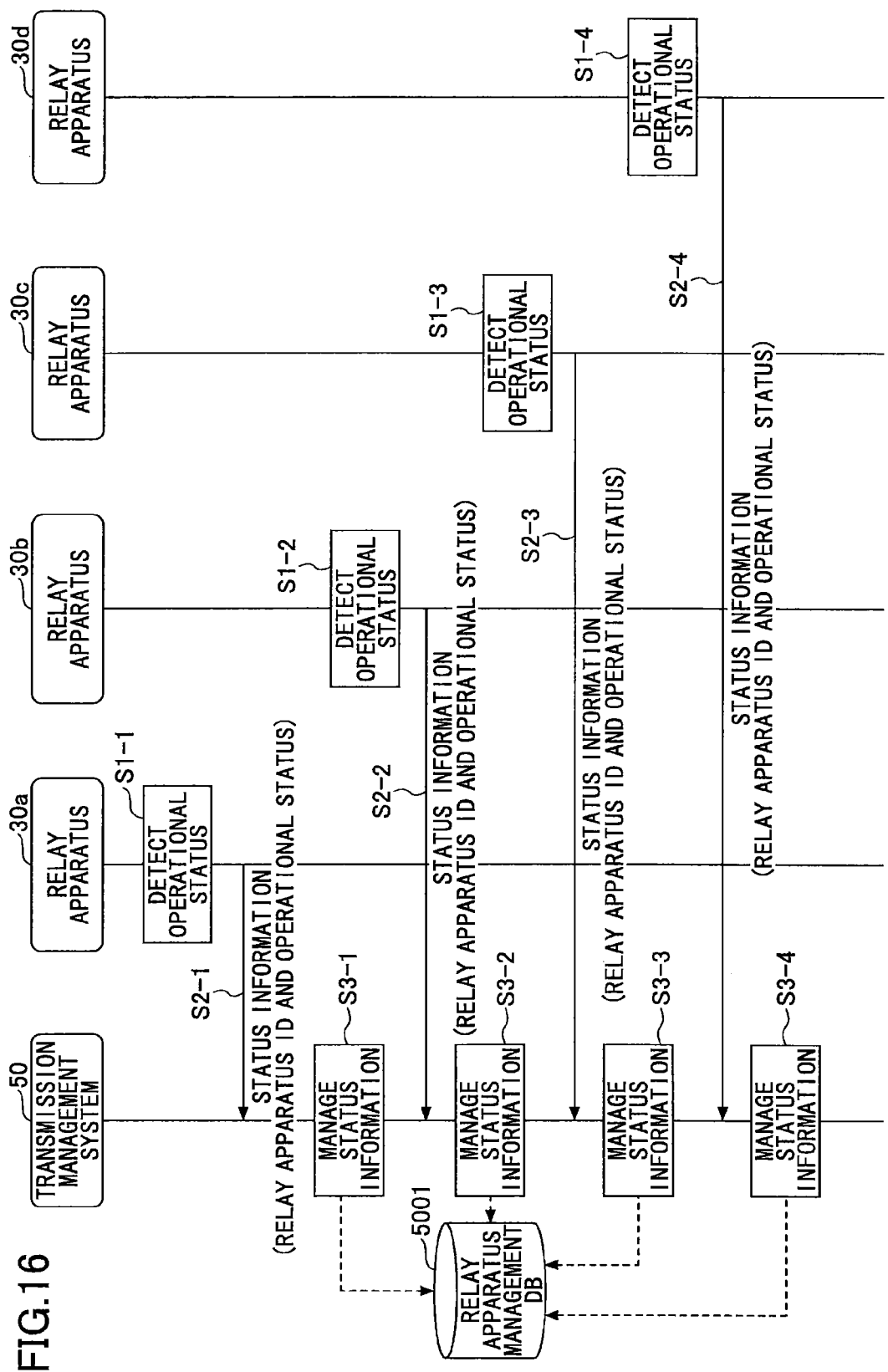
FIG. 16 is a sequence diagram illustrating an example of a process for managing status information representing an operational status of each relay apparatus according to the present embodiment.
Figure 17:
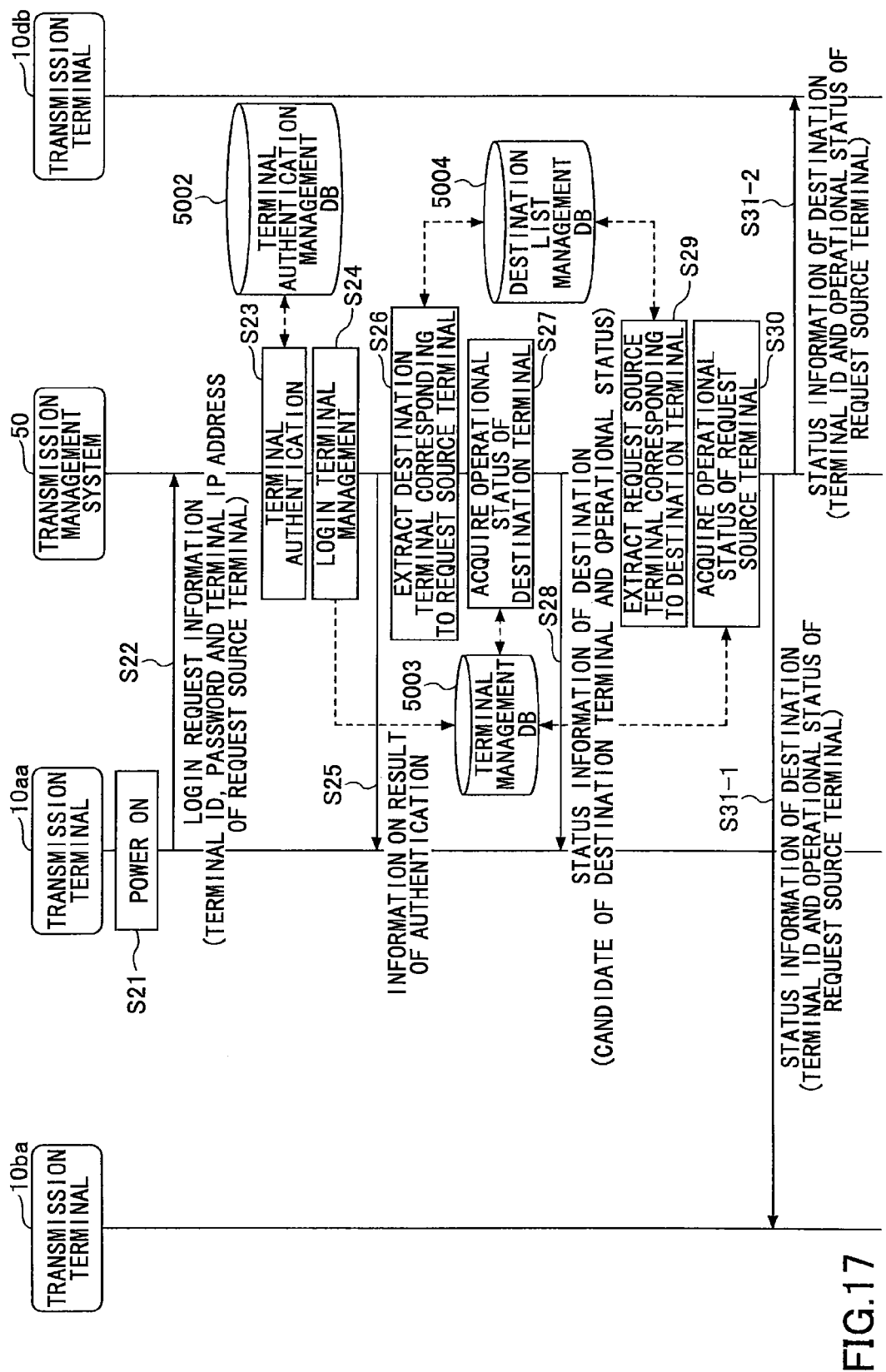
FIG. 17 is a sequence diagram illustrating an example of a process in a stage of preparation for starting the communication between the transmission terminals according to the present embodiment.
Figure 18:
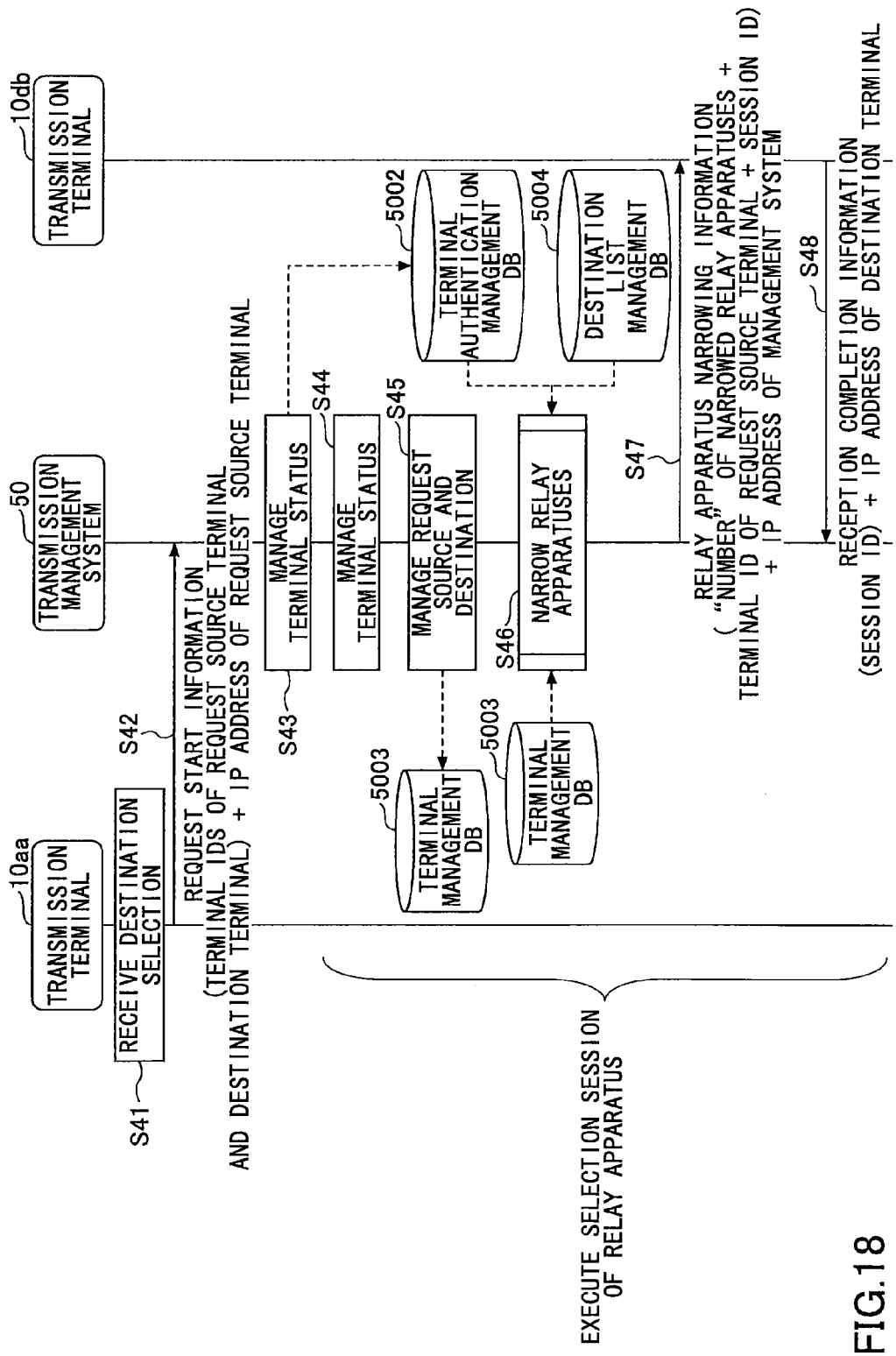
FIG. 18 is a sequence diagram illustrating an example of a process for narrowing a relay apparatus according to the present embodiment.
Figure 19:
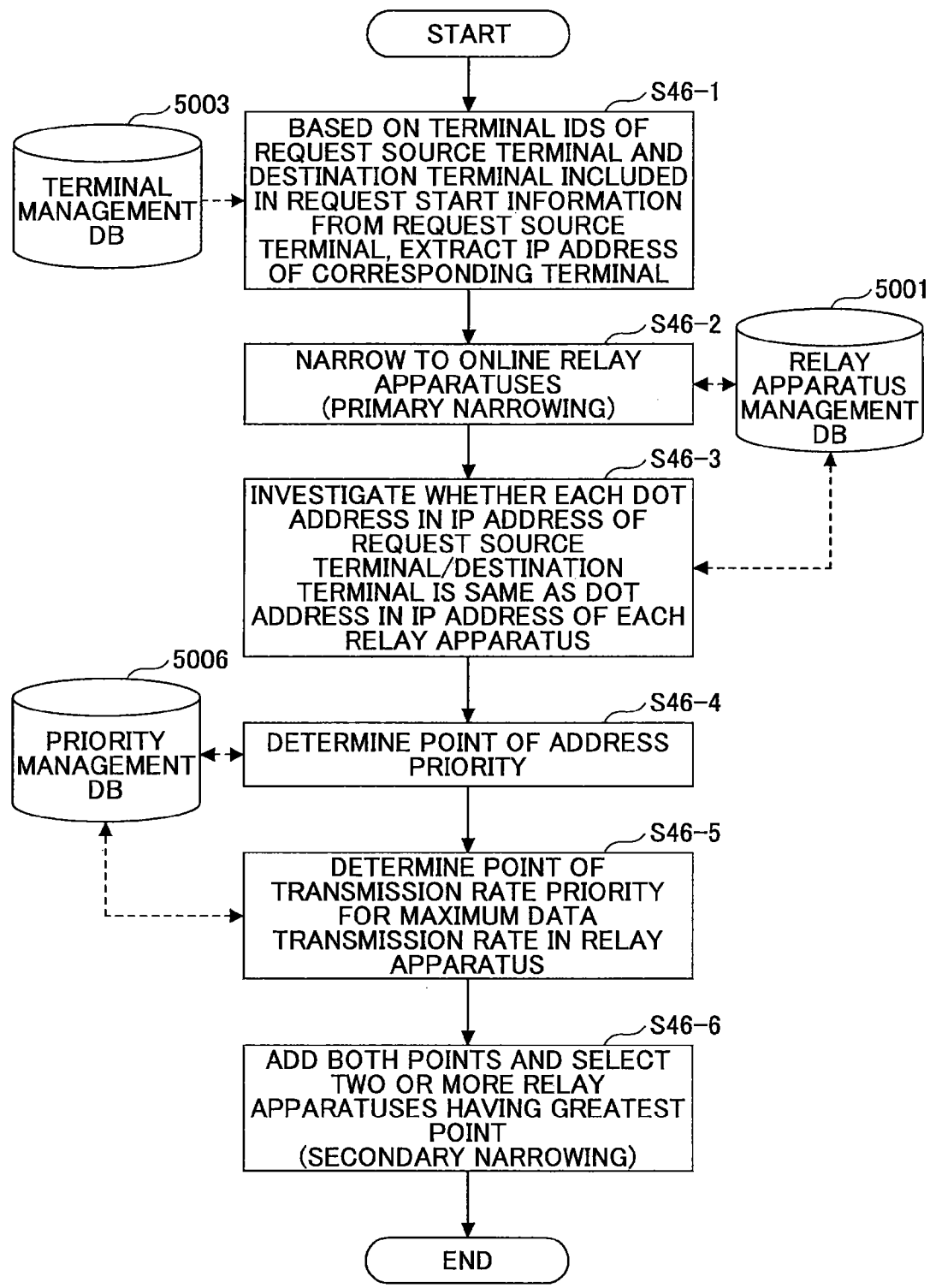
FIG. 19 is a processing flowchart illustrating an example of the process for narrowing a relay apparatus according to the present embodiment.
Figure 21:
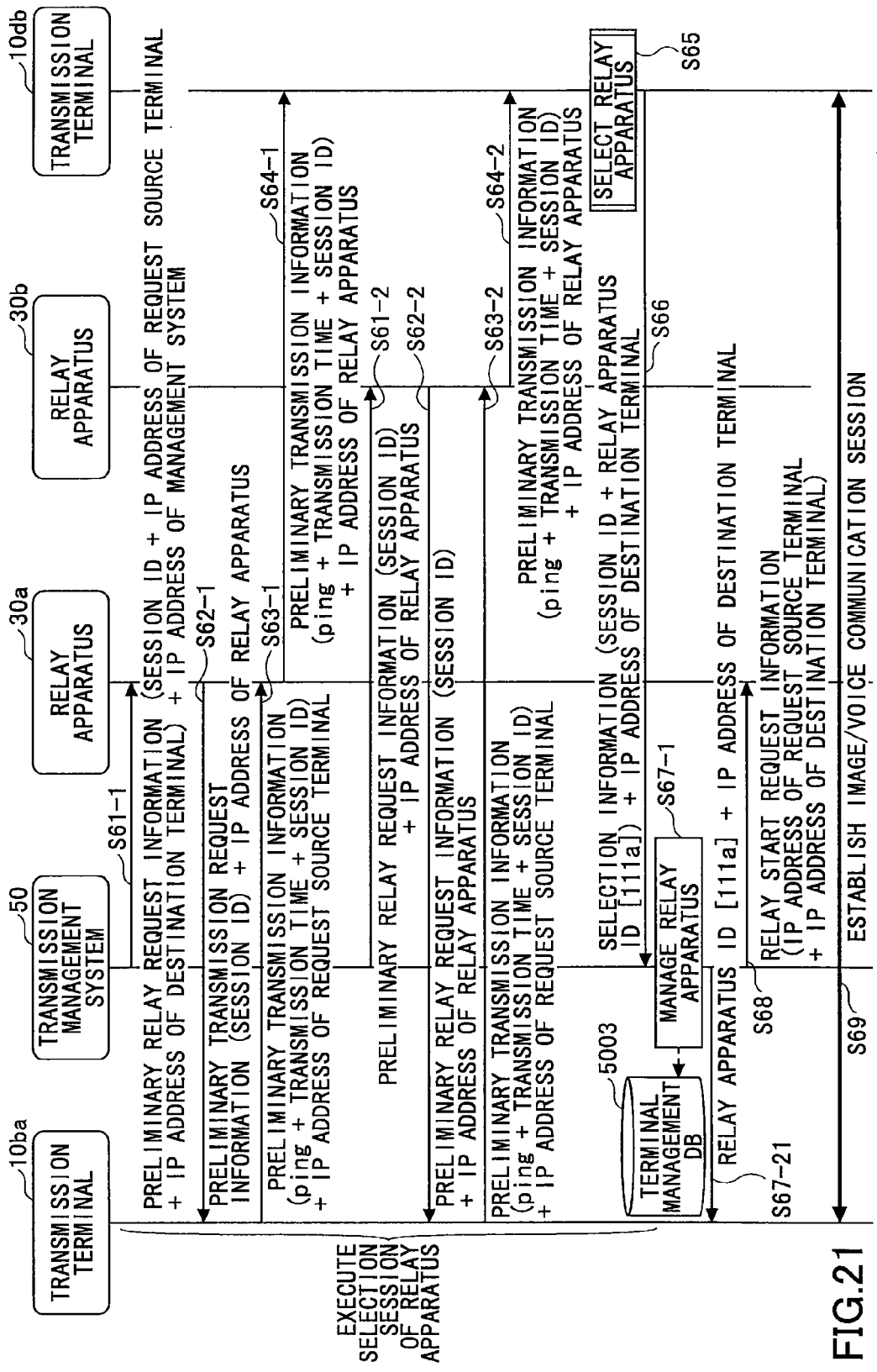
FIG. 21 is a sequence diagram illustrating an example of a process of a transmission terminal selecting a relay apparatus according to the present embodiment.
Figure 22:
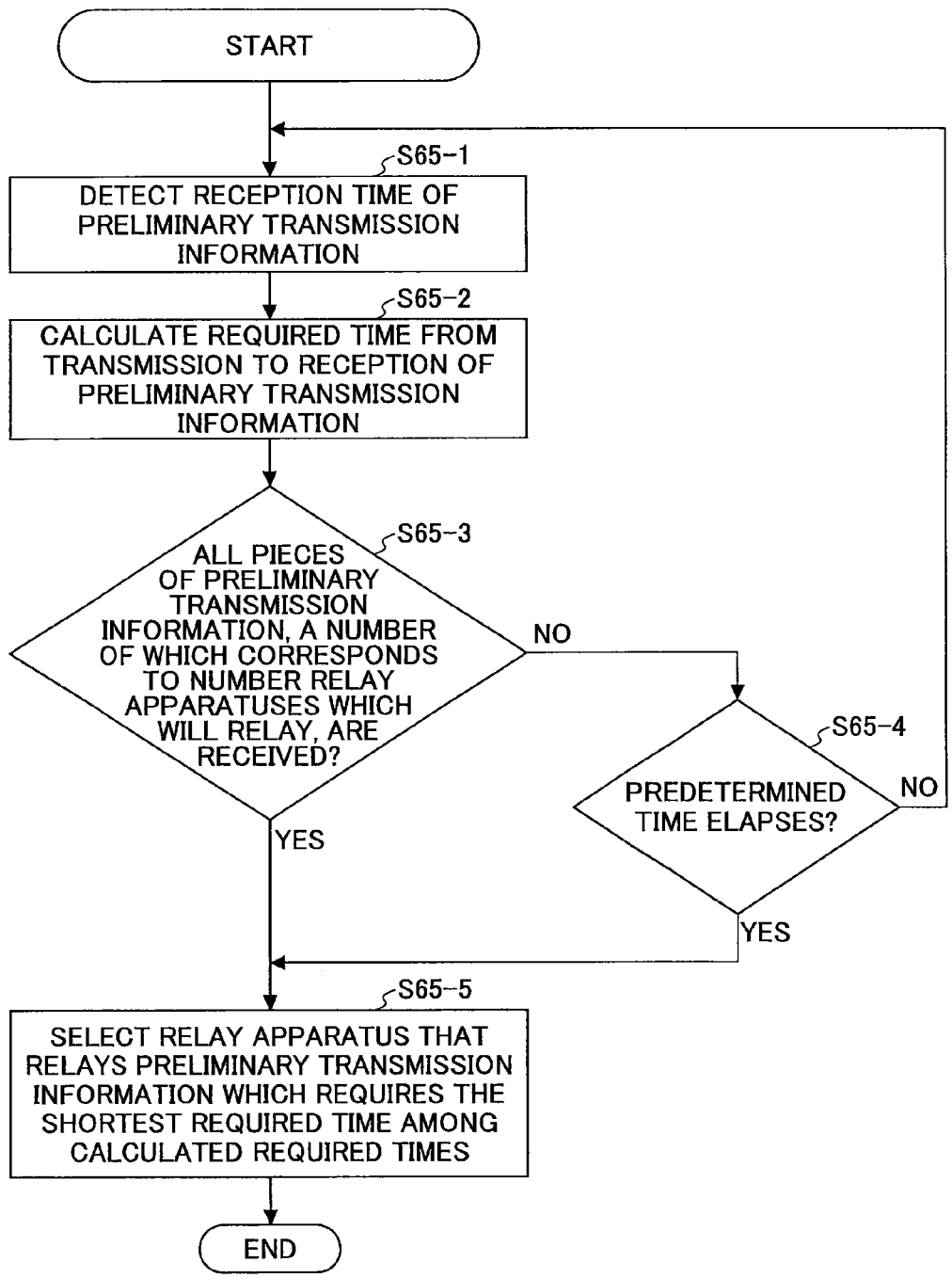
FIG. 22 is a processing flowchart illustrating an example of the process of selecting the relay apparatus in the transmission terminal according to the present embodiment.
Figure 23:
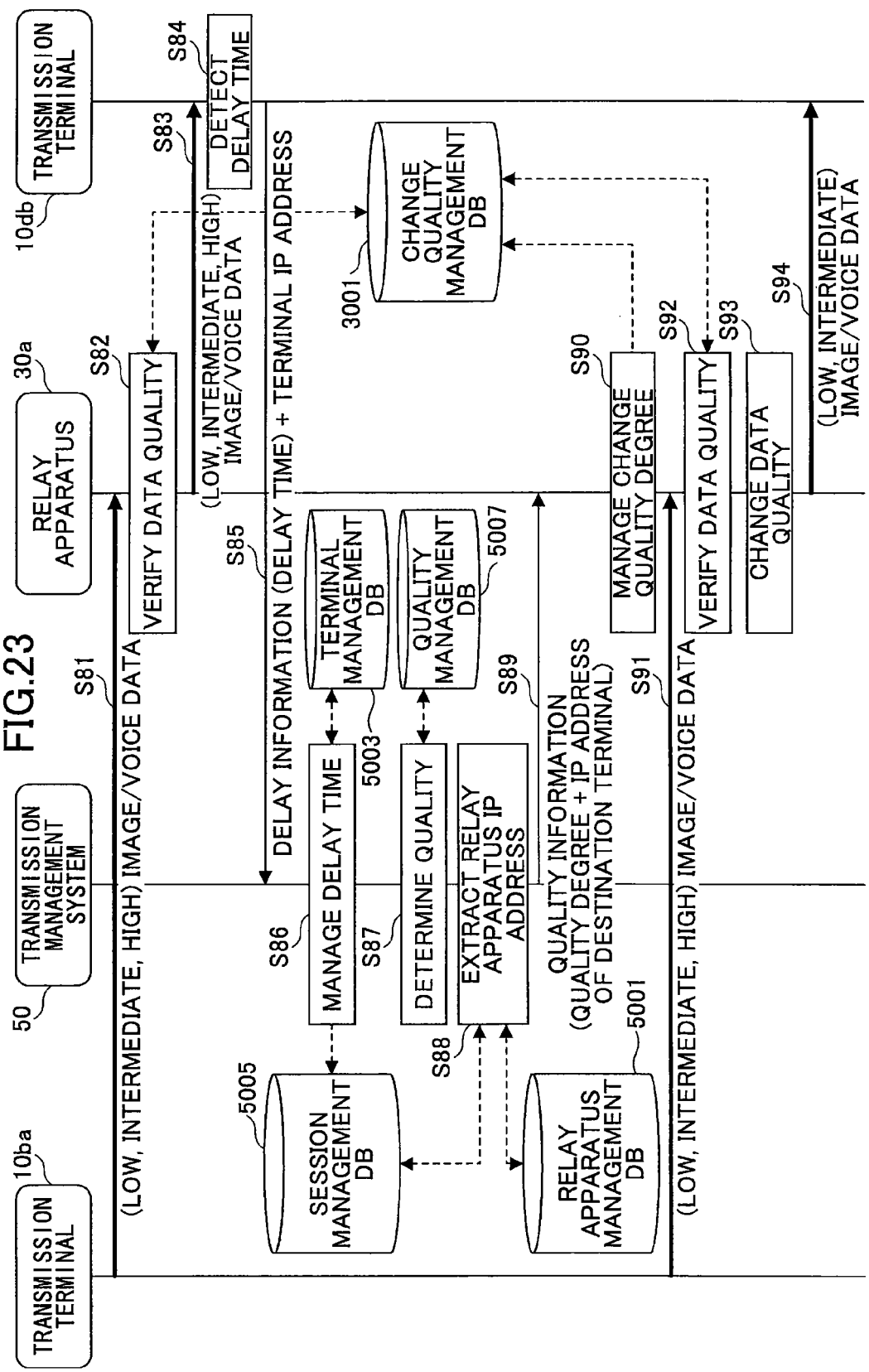
FIG. 23 is a sequence diagram illustrating an example of a process of sending or receiving image data and voice data between the transmission terminals according to the present embodiment.
Figure 25:
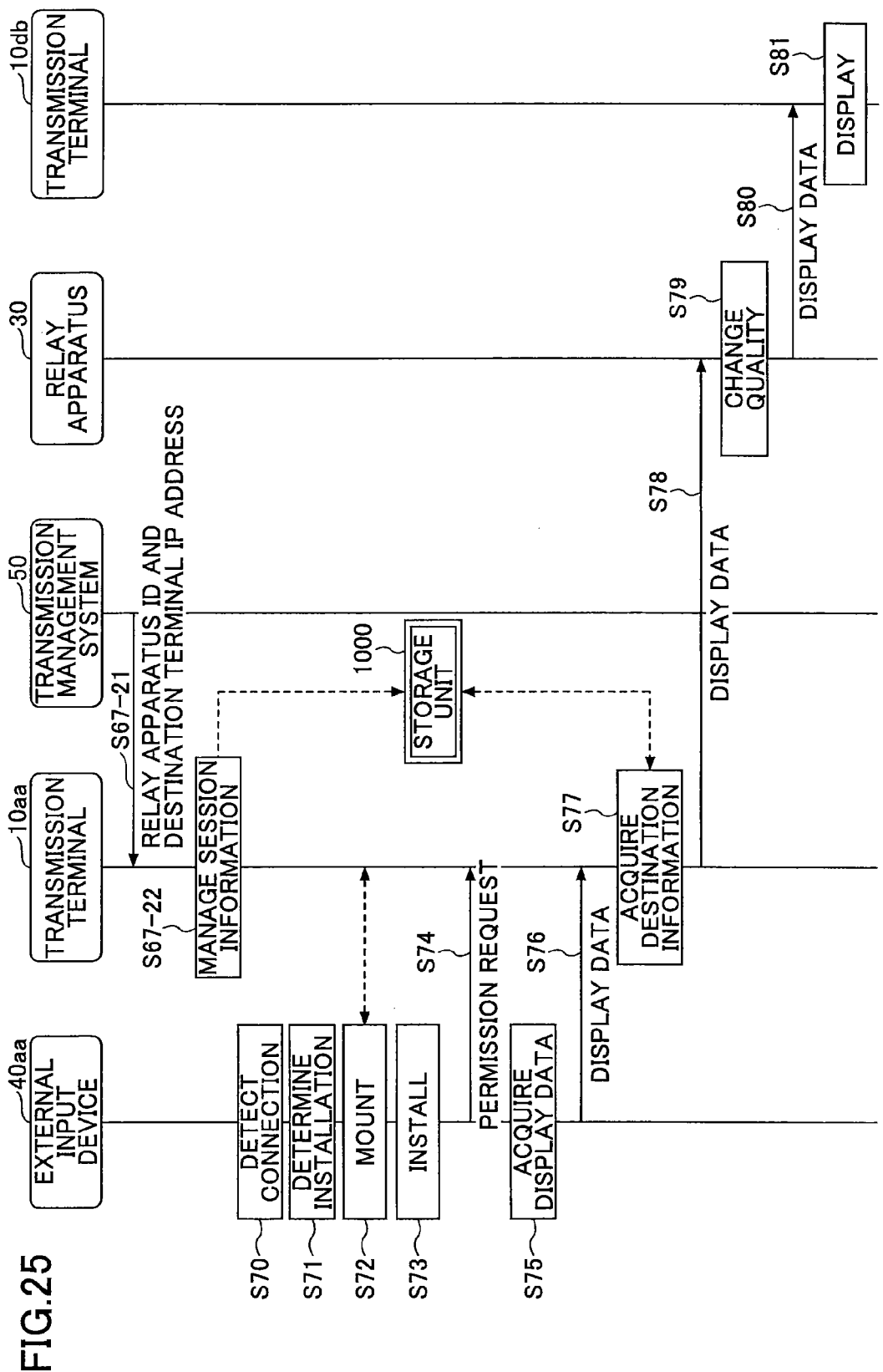
FIG. 25 is a sequence diagram illustrating an example of a process of displaying display data displayed by the external input device on a transmission terminal of the other party of the conference according to the present embodiment.
Figure 26:
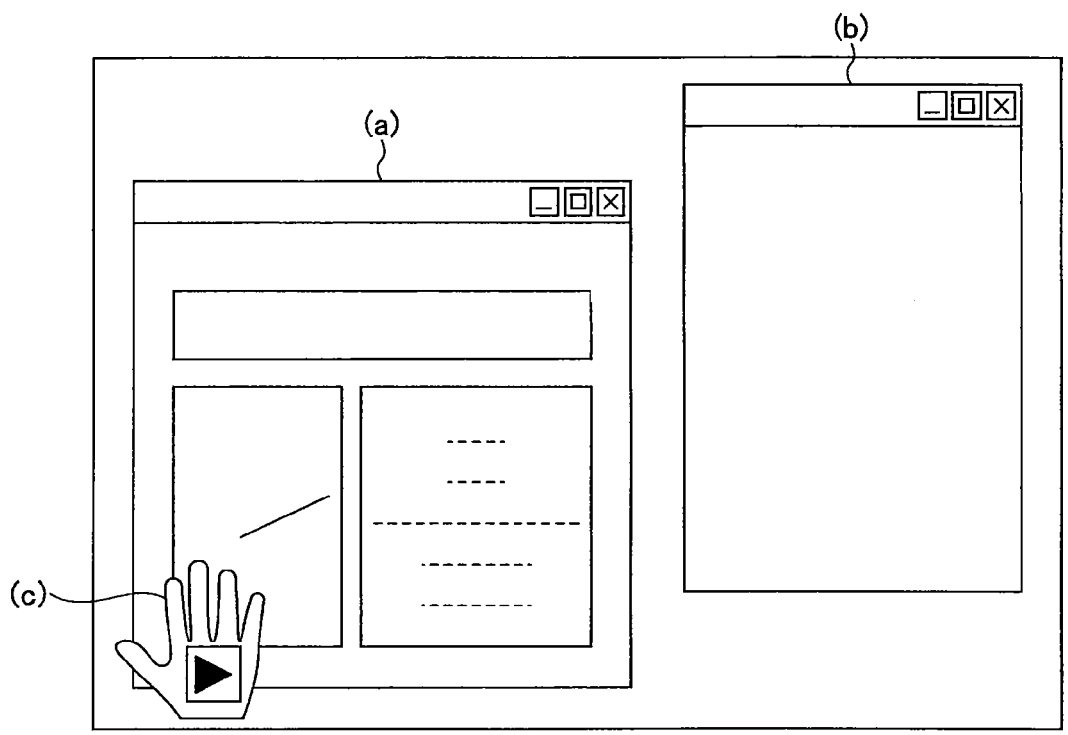
FIG. 26 is a diagram illustrating an example of a screen that the external input device displays according to the present embodiment.
Figure 27:
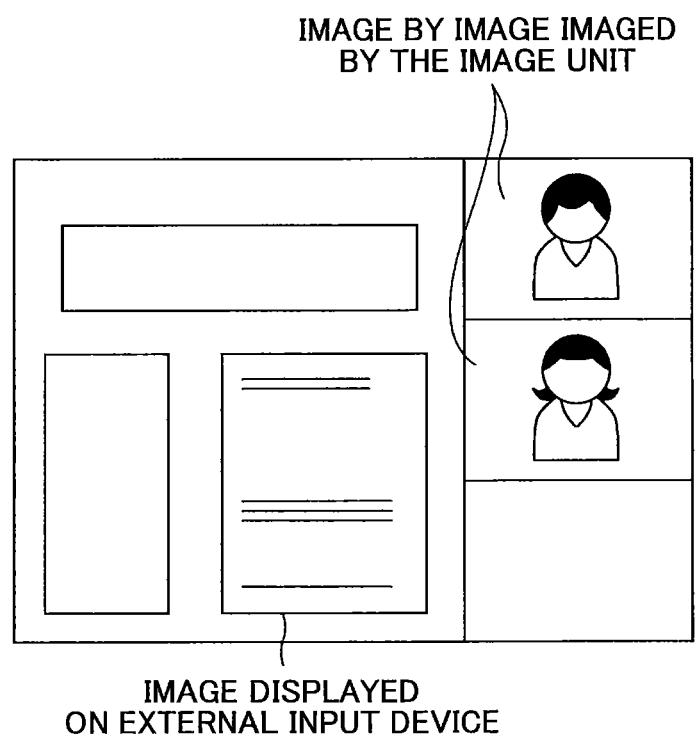
FIG. 27 is a diagram illustrating an example of a screen in which the transmission terminal displays image data and display data according to the present embodiment.
Figure 28:
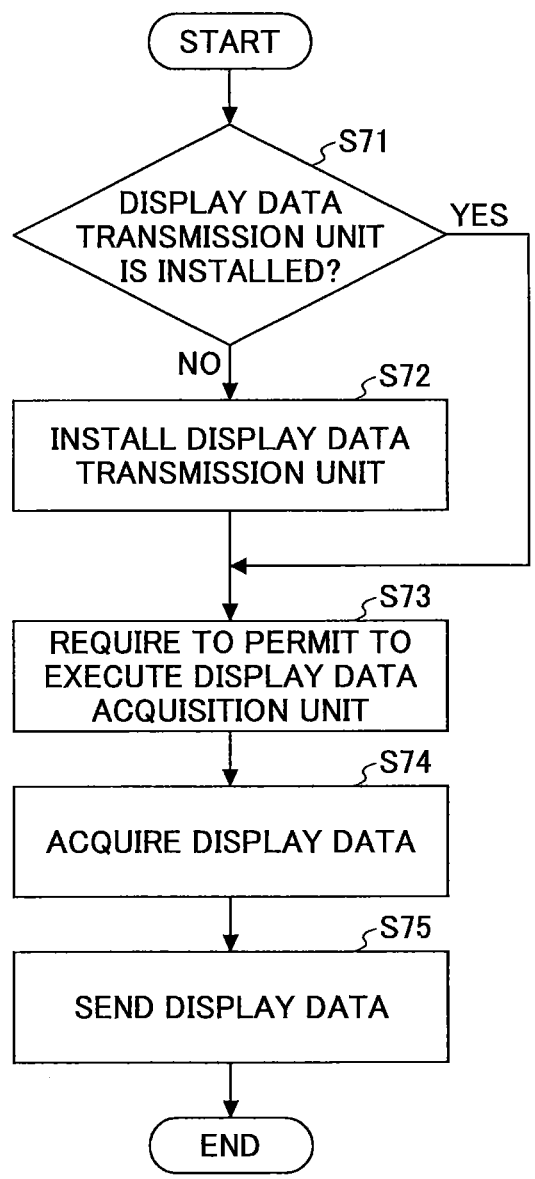
FIG. 28 is a flowchart illustrating an example of a process of the external input device installing a display data acquisition unit according to the present embodiment.

Basic hardware and functions (or means) of the transmission system 1 according to the present embodiment are explained as above. A process method in the transmission system 1 will be explained with reference to FIGS. 16 to 23 and FIGS. 25 to 28. Meanwhile, FIG. 16 is a sequence diagram illustrating an example of a process of managing status information indicating a status of each relay apparatus 30, sent from each of the relay apparatuses 30 to the transmission management system 1. FIG. 17 is a sequence diagram illustrating an example of the process in the preliminary stage for starting the communication between the transmission terminals 10. FIG. 18 is a sequence diagram illustrating an example of a process of narrowing the relay apparatuses 30. FIG. 19 is a processing flowchart illustrating an example of the process of narrowing the relay apparatuses 30. FIG. 20 is a diagram illustrating an example of a status of calculation of points upon the transmission terminal 10 performing the narrowing process. FIG. 21 is a sequence diagram illustrating an example of the process of the transmission terminal 10 selecting a relay apparatus 30. FIG. 22 is a processing flowchart illustrating an example of a process of the transmission terminal 10 selecting a relay apparatus 30. FIG. 23 is a sequence diagram illustrating an example of a process of sending/receiving image data and sound data between the transmission terminals 10. FIG. 25 is a sequence diagram illustrating an example of a process of displaying display data displayed by the external input device 40 on the transmission terminal 10 of the other party of the conference. FIG. 26 is a diagram illustrating an example of a screen that the external input device 40 displays. FIG. 27 is a diagram illustrating an example of a screen on which the transmission terminal 10 displays image data and display data. FIG. 28 is a flowchart illustrating an example of a process of the external input device 40 installing the display data acquisition unit.

First, with reference to FIG. 16, the process of managing status information indicating a status of each relay apparatus 30, sent from each of the relay apparatuses 30 to the transmission management system 50 will be explained. At first, at each of the relay apparatuses 30, the status detection unit 32, shown in FIG. 5, detects regularly an operational status of the relay apparatus 30, which is the own apparatus (steps S1-1 to S1-4). Then, the transmission/reception unit 31 of each of the relay apparatuses 30 regularly sends status information to the transmission management system 50 via the communication network 2 so that operational statuses of the respective relay apparatuses 30 are managed in real-time on the side of the transmission management system 50 (step S2-1 to S2-4). Each piece of the status information includes the relay device ID of each of the relay apparatuses 30 and the operational status detected by the status detection unit 32 of the relay apparatus 30 related to each of these relay apparatus IDs. Meanwhile, the present embodiment shows the case where the relay apparatuses 30a, 30b and 30d normal operational states indicate "online", whereas the operational state of the relay apparatus 30c indicates "offline", where the relay apparatus 30c operates but has a problem in the program for executing the relaying operation of the relay apparatus 30c.

Next, in the transmission management system 50, the transmission/reception unit 51 receives the status information sent from each of the relay apparatuses 30, and manages the status information by storing the status information for each of the relay apparatus IDs in the relay apparatus management table (See FIG. 8) in the storage unit 5000 via the storage/readout process unit 59 (step S3-1 to S3-4). Accordingly, in the relay apparatus management table as shown in FIG. 8, the operational status "online" or "offline" is stored and managed for each of the relay apparatus IDs. Moreover, on this occasion, for each of the relay apparatus IDs, the reception time when the transmission management system 50 receives the status information is also stored and managed. Meanwhile, in the case where status information is not sent from the relay apparatus 30, a field of the operational status and a field of the reception time in each record in the relay apparatus management table, shown in FIG. 8, will be blank, or indicate the operational status and the reception time of the status information received previously.

Next, with reference to FIG. 17, the processes in the preliminary stage before starting the communication between the transmission terminal 10aa and the transmission terminal 10db will be described in the following. At first, when the user turns on the power switch 109, shown in FIG. 3, the operation input reception unit 12, shown in FIG. 5, receives the user's operation, and the power is turned ON (step S21). Next, the login request unit 13, when receiving the above-described operation for turning on the power, automatically sends login request information, indicating a login required, to the transmission management system 50 from the transmission/reception unit 11 via the communication network 2 (step S22). The login request information includes the terminal ID for identifying the terminal 10aa as the request source terminal and the password. The terminal ID and the password have been read out from the storage unit 1000 via the storage/readout process unit 19 and have been transmitted to the transmission/reception unit 11. Moreover, when the login request information is sent from the transmission terminal 10aa to the transmission management system 50, the transmission management system 50 on the reception side can recognize the IP address of the transmission terminal 10aa on the transmission side.

Next, the terminal authentication unit 52 of the transmission management system 50 performs terminal authentication by searching the terminal authentication management table (See FIG. 9) with the terminal ID and the password as a search key included in the login request information received via the transmission/reception unit 51, and determining whether the same terminal ID and the password are managed in the terminal authentication management DB 5002 (step S23). In the case where the terminal authentication unit 52 determines that the login request information is from the terminal 10, which has authorization for use, since the terminal authentication unit 52 manages the same terminal ID and the same password, the status management unit 53 stores in the terminal management table (See FIG. 10) the terminal ID of the transmission terminal 10aa, an operational status, a reception time when the login request information is received, and the IP address of the transmission terminal 10aa, which are associated with each other (Step S24). Accordingly, the terminal management table, shown in FIG. 10, manages the operational status "online", the reception time "2009.11.10.13:40", and the IP address of the terminal 10aa "1.2.1.3", associated with the terminal ID "01aa".

Then, the transmission/reception unit 51 of the transmission management system 50 sends authentication result information, indicating a result of the authentication obtained by the above-described terminal authentication unit 52, via the communication network 2, to the request source terminal 10aa, which has required the login (step S25). Further, a process when the terminal authentication unit 52 determines that the request terminal has authorization for use will be explained as follows.

The terminal extraction unit 54 of the transmission management system 50 extracts the terminal ID of a candidate of a destination terminal 10B by searching the destination list management table (see FIG. 11) with the terminal ID "01aa" of the request source terminal 10aa, which has required the login, as a search key, and reading out the terminal ID of a candidate of a destination terminal 10B, which can communicate with the request source terminal 10aa, from the destination list management table (step S26). Here, the terminal IDs "01ab", "01ba" and "01db" of the destination terminals (10ab, 10ba and 10db), corresponding to the terminal ID "01aa" of the request source terminal 10aa, are extracted.

Next, the terminal status acquisition unit 55 acquires operational status of each of the destination terminals 10ab, 10ba and 10db by searching the terminal management table (see FIG. 10) with the terminal IDs of the candidates of the destination terminal 10B as a search key, extracted by the above-described terminal extraction unit 54 ("01ab", "01ba", "01db"), and reading out an operational status ("offline", "online", "online") for each terminal ID, extracted by the above-described terminal extraction unit 54 (step S27).

Next, the transmission/reception unit 51 sends destination status information including the terminal IDs used as the search key at step S27 ("01ab", "01ba" and "01db") and the operational statuses ("offline", "online" and "online") of the transmission terminals (10ab, 10ba, and 10db) corresponding to the terminal IDs, to the request source terminal 10aa via the communication network 2 (step S28). Accordingly, the request source terminal 10aa can recognize the operational status ("offline", "online" and "online") at present of each of transmission terminals (10ab, 10ba and 10db) as the candidates of the destination terminal 10B, which can communicate with the request source terminal 10aa.

Furthermore, the terminal extraction unit 54 of the transmission management system 50 searches the destination list management table (see FIG. 11) with the terminal ID "01aa" of the request source terminal 10aa, which has required the login, as a search key, and extracts terminal IDs of other request source terminals 10A, for each of which the terminal ID "01aa" of the above-described request source terminal 10aa is registered as a candidate of a destination terminal 10B (step S29). In the destination list management table, shown in FIG. 11, the terminal IDs of the other request source terminals 10A extracted as above, are "01ab", "01ba" and "01db".

Next, the terminal status acquisition unit 55 of the transmission management system 50, searches the terminal management table (see FIG. 10) with the terminal ID "01aa" of the request source terminal 10aa, which required the login, as a search key, and acquires an operational status of the request source terminal 10aa (step S30).

Then, the transmission/reception unit 51 sends, to the transmission terminals (10ba and 10db) with the operational status of "online", in the terminal management table (see FIG. 10), out of the transmission terminals (10ab, 10ba and 10db) corresponding to the terminal IDs ("01ab", "01ba" and "01db"), extracted at step S29, destination status information including the terminal ID "01aa" of the request source terminal 10aa acquired at step S30 and the operational status of "online" (steps S31-1 and S31-2). Meanwhile, upon the transmission/reception unit 51 sending the destination status information to the transmission terminals 10ba and 10db, based on the terminal IDs ("01ba" and "01db"), the transmission/reception unit 51 refers to the IP addresses of the transmission terminals managed in the terminal management table (see FIG. 10). Accordingly, the transmission/reception unit 51 can transfer to each of the other destination terminals 10ba and 10db, which can communicate with the request source terminal 10aa having required the login, as a destination, the terminal ID "01aa" of the request source terminal 10aa, which required the login, and the operational status of "online".

On the other hand, also in the other transmission terminals 10, when the user turns on the power switch 109, shown in FIG. 4, in the same way as step S21, the operation input reception unit 12, shown in FIG. 5, receives the operation for the power to be ON. Since the same processes as in steps S22 to S31-1 and S31-2 are performed, an explanation will be omitted.

Next, with reference to FIG. 18, the process of narrowing the relay apparatus 30 will be explained. Meanwhile, the request source terminal 10aa can communicate with at least one of the transmission terminal (10ba, 10db) having the operational status of "online" among the transmission terminals 10 as candidates of a destination, according to the destination status information received at step S28. Then, in the following, the case where the user of the request source terminal 10aa selects starting communication with the destination terminal 10db will be explained.

First, when the user holds the operation button 108, shown in FIG. 3, down to select the transmission terminal 10db, the operation input reception unit 12, shown in FIG. 5, receives a request to start communication with the transmission terminal 10db (step S41). Then, the transmission/reception unit 11 of the transmission terminal 10aa sends start request information, which includes the terminal ID "01aa" of the request source terminal 10aa, the terminal ID "01db" of the destination terminal 10db and intention to start communication, to the transmission management system (step S42), Accordingly, the transmission/reception unit 51 of the transmission management system 50 receives the above-described start request information and recognizes the IP address "1.2.1.3" of the request source terminal 10aa, which is a transmission source. Then, the status management unit 53, based on the terminal ID "01aa" of the request source terminal 10aa and the terminal ID "01db" of the destination terminal 10db, included in the start request information, in the terminal management table (See FIG. 10), changes both fields of the operational status in records including the above-described terminal ID "01aa" and the terminal ID "01db", respectively, to "busy" (step S43). Meanwhile, in this state, although the request source terminal 10aa and the destination terminal 10db have not yet started communication (call), they are in the busy state. When other transmission terminal 10 intends to communicate with the transmission source terminal 10aa or the destination terminal 10db, a voice or a display indicating so-called a busy state is output.

Next, the process of executing a session for selecting a relay apparatus 30 will be explained with reference to steps S44 to S48 and steps S61-1 to S66. First, the selection session ID generation unit 56a generates selection session ID used for execution of the session for selecting a relay apparatus 30 (step S44). Then, the session management unit 57 manages the selection session ID "se1", the terminal ID "01aa" of the request source terminal 10aa and the terminal ID "01db" of the destination terminal 10db, by storing them in the session management table (See FIG. 12) in the storage unit 5000, associated with each other (step S45).

Next, the narrowing unit 56 of the transmission management system 50 performs a primary narrowing process for the relay apparatus 30 for relaying communication between the request source terminal 10aa and the destination terminal 10db based on the relay apparatus management DB 5001, the terminal management DB 5003 and the priority management DB 5006 (step S46).

Here, with reference to FIG. 19, the process at step S46 will be explained in more detail. First, the terminal IP address extraction unit 56b, by searching the terminal management table (See FIG. 10) based on the terminal ID "01aa" of the request source terminal 10aa and the terminal ID "01db" of the destination terminal 10db, included in the start communication information sent from the request source terminal 10aa, extracts IP addresses ("1.2.1.3" and "1.3.2.4") of the corresponding transmission terminals (10aa and 10db) (step S46-1). Next, the primary selection unit 56c selects each of relay apparatus IDs (111a, 111b, 111d) of the relay apparatuses (30a, 30b, 30d) with an operational status of "online" among operational statuses of the relay apparatuses 30 managed by the relay apparatus management table (See FIG. 8) (step S46-2). Moreover, the primary selection unit 56c, by searching the relay apparatus management table (See FIG. 8) based on the IP address "1.2.1.3" of the request source terminal 10aa and the IP address "1.3.2.4" of the destination terminal 10db, extracted at step S46-1, investigates whether each of the dot addresses of the IP addresses ("1.2.1.2", "1.2.2.2" and "1.3.2.2") of the relay apparatuses (30a, 30b, 30d) selected at step S46-2 is the same as the dot address in the respective IP addresses of the above-described request source terminal 10aa and the destination terminal 10db (step S46-3).

Next, the priority determination unit 57c determines a point of address priority for each of the relay apparatuses (30a, 30b and 30d) investigated at step S46-3 referring to the priority management table (See FIG. 13) (Step S46-4). FIG. 20 illustrates a result of the determination. FIG. 20 shows a point of address priority, a point of transmission rate priority and an integrated point, for each of the relay apparatus IDs. Moreover, the point of address priority includes a point to the request source terminal 10aa from each of the relay apparatuses 30 and a point to the destination terminal 10db. The integrated point is a sum of a point, which is higher of the two points of address priority, and the point of transmission rate priority.

Since the IP address of the relay apparatus 30a "1.2.1.2" is "same. same. same. not same" as the IP address of the request source terminal 10aa "1.2.1.3", the point of address priority is "5", as shown in FIG. 20. Moreover, since the IP address of the relay apparatus 30a "1.2.1.2" is "same. not same. not same. not same" as the IP address of the request source terminal 10db "1.3.2.4", the point of address priority is "1". Moreover, since the IP address of the relay apparatus 30b "1.2.2.2" is "same. same. not same. not same" as the IP address of the request source terminal 10aa "1.2.1.3", the point of address priority is "3". Moreover, since the IP address of the relay apparatus 30b "1.2.2.2" is "same. not same. same. not same" as the IP address of the request source terminal 10db "1.3.2.4", the point of address priority is "1". Furthermore, since the IP address of the relay apparatus 30d "1.3.2.2" is "same. not same. not same. not same" as the IP address of the request source terminal 10aa "1.2.1.3", the point of address priority is "1". Moreover, since the IP address of the relay apparatus 30d "1.3.2.2" is "same. same. same. not same" as the IP address of the request source terminal 10db "1.3.2.4", the point of address priority is "5".

Next, returning FIG. 19, the priority determination unit 57d, based on the maximum data transmission rate of each of the relay apparatuses 30 managed by the relay apparatus management table (See FIG. 8), by searching the priority management table (See FIG. 14), determines a point of transmission rate priority (See FIG. 14) for each of the relay apparatuses (30a, 30b and 30d) narrowed by the primary narrowing process at step S46-2 (step S46-5). As shown in FIG. 8, since the maximum data transmission rate of the relay apparatus 30a is 100 Mbps, the point of transmission rate priority is 3, referring to the transmission rate priorities shown in FIG. 14. Moreover, in the same way, since the calculated maximum data transmission rate of the relay apparatus 30b is 1000 Mbps, the point of transmission rate priority is 5. Moreover, in the same way, since the calculated maximum data transmission rate of the relay apparatus 30d is 10 Mbps, the point of transmission rate priority is 1.

Next, the primary selection unit 56c, among integrated points, each of which is a sum of a point, higher of the points of address priority for the transmission terminals (10aa and 10db), and a point of transmission rate priority, selects two relay apparatuses 30 having the two highest points, for each of the relay apparatuses (30a, 30b and 30d) (step S46-6). As shown in FIG. 20, the integrated points for the relay apparatus IDs (111a, 111b and 111d) are "8", "8" and "6", respectively, the relay apparatus 30a for the relay apparatus ID "111a" and the relay apparatus 30b for the relay apparatus ID "111b" are selected.

When the above-described narrowing process at step S46 ends, the transmission/reception unit 51, shown in FIG. 5, sends relay apparatus narrowing information for transmitting a number of the relay apparatuses 30, narrowed as above, to the destination terminal 10db via the communication network 2 (step S47). The relay apparatus narrowing information includes the number of the relay apparatuses 30 narrowed at step S46 "2", the terminal ID "01aa" of the request source terminal 10aa and the above-described selection session ID "se1". Accordingly, the transmission terminal 10db recognizes the number of the relay apparatuses 30 and the transmission terminal 10 which requires a start of a video conference, upon executing a session under the selection session ID "se1". Furthermore, the transmission terminal 10db recognizes the IP address "1.1.1.2" of the transmission management system 50, which is a transmission source of the relay apparatus narrowing information.

Then, the transmission terminal 10db sends reception completion information indicating that the reception of the above-described relay apparatus narrowing information is completed to the transmission management system 50 from the transmission/reception unit 11 via the communication network 2 (step S48). The reception completion information includes the session ID "se1". Accordingly, the transmission management system 50 recognizes that the transmission of the number of relay apparatuses executed under the session ID "se1", and the IP address "1.3.2.4" of the destination terminal 10db which is a transmission source.

Next, a process of the destination terminal 10aa selecting a relay apparatus 30 will be explained with reference to FIG. 21. First, the transmission management system 50, before starting a video conference, sends preliminary relay request information for requiring a relay in advance to each of the relay apparatuses (30a and 30b) narrowed at step S46 (step S61-1 and S61-2). The preliminary relay request information includes the session ID "se1", the IP address "01aa" of the request source terminal 10aa, and the destination terminal 10db. Accordingly, the relay apparatuses (30a and 30b) recognizes the selection session, the request source terminal 10A and the destination terminal 10B, and also recognizes the IP address "1.1.1.2" of the transmission management system 50 which is a transmission source of the preliminary relay request information.

Next, each of the relay apparatuses (30a and 30b) sends preliminary transmission request information to the request source terminal 10aa recognized at steps S61-1 and S61-2 from the transmission/reception unit 31 via the communication network 2 (steps S62-1, S62-2). The preliminary transmission request information indicates causing the request source terminal 10aa to send preliminary transmission information including ping (Packet Internet Groper), which will be described later, to each of the relay apparatuses (30a and 30b) as an own apparatus before the start of the video conference. The preliminary transmission information further includes the session ID "se1". Accordingly, the request source terminal 10aa, during the process of selecting relay apparatuses 30 executed under the session ID "se1", recognizes sending the preliminary transmission information to each of the relay apparatuses (30a and 30b) and the IP addresses ("1.2.1.2" and "1.2.2.2") of the relay apparatuses (30a and 30b) which is a transmission source of the preliminary transmission request information, Meanwhile, in the present embodiment, the IP address of the destination terminal 10db is not sent directly to the request source terminal 10ba from the transmission management system 50. The IP address of the destination terminal 10db is sent to the relay apparatus 10aa, as step S61-1, and the relay apparatus 10aa requires the request source terminal 10ba to send the preliminary transmission request information to the own apparatus (relay apparatus 10aa). The reason of the above-described process is to ensure security by not notifying each of the transmission terminals 10 of IP addresses of other transmission terminals.

Next, the request source terminal 10aa sends the preliminary transmission information to the relay apparatuses (30a and 30b) from the transmission/reception unit 11 via the communication network 2. This preliminary transmission information is used for measure a required time from a transmission at the request source terminal 10aa to a reception at the destination terminal 10db, by sending to the destination terminal 10db via each of the relay apparatuses (30a and 30b) instead of image data and voice data, prior to sending the image data and the voice data. Moreover, the preliminary transmission information includes ping for verifying that the request source terminal 10aa, the relay apparatuses (30a and 30b) and the destination terminal 10db are connected for a communications connection, a time and data when the preliminary transmission information is transmitted from the request source terminal 10aa and the session ID "se1". Accordingly, each of the relay apparatuses (30a and 30b) recognizes that the preliminary transmission information is sent, in the execution of the session under the selection session ID "se1", and also recognizes the IP address "1.2.1.3" of the request source terminal 10aa which is a transmission source of the preliminary transmission information.

Next, each of the relay apparatuses (30a and 30b) relays the above-described preliminary transmission information to the IP address "1.3.2.4" of the destination terminal 10db included in the preliminary relay request information received at steps S61-1 and S61-2 (steps S64-1 and S64-2). Accordingly, the destination terminal 10db recognizes that the preliminary transmission information is sent, in the execution of the session under the session ID "se1", and also recognizes the IP address ("1.2.1.2" and "1.2.2.2") of the relay apparatuses (30a and 30b) which are transmission sources (relay sources) of the preliminary transmission information.

Next, the selection process unit 16 of the destination terminal 10db, based on the preliminary transmission information, finally narrows to a relay apparatus 30 that relays image data and voice data in a video conference (step S65).

Here, the process at step S65 will be explained in more detail with reference to FIGS. 5 and 22. First, the measurement unit 16a of the selection process unit 16, shown in FIG. 5, measures a reception time upon receiving by the transmission/reception unit 11 of the transmission terminal 10db for each preliminary transmission information relayed by each of the relay apparatuses (30a and 30b) (step S65-1). Next, the calculation unit 16b, for each preliminary transmission information, reception time of which is measured, based on a difference between the above-described reception time and a transmission time included in the preliminary transmission information, calculates a required time from transmission to reception of each preliminary transmission information (step S65-2). Next, the selection unit 16c, in the execution of the session under the session ID "se1", determines whether all pieces of preliminary transmission information, a number of which corresponds to the number "2" of relay apparatuses 30 which will relay, are received (step S65-3). Then, in the case where all pieces of preliminary transmission information are not received (S65-3: NO), the selection unit 16c determines whether a predetermined time (here, a minute) elapses since the transmission terminal 10db receives the preliminary transmission information (step S65-4). Furthermore, in the case where the predetermined time does not elapse (step S65-4: NO), the process returns to step S65-1. On the other hand, in the case where all pieces of preliminary transmission information are received (step S65-3: YES) or the predetermined time elapses (step S65-4: YES), the selection unit 16c selects one relay apparatus 30 that relays preliminary transmission information which requires the shortest required time among the required times calculated by the calculation unit 16b (step S65-5). In the embodiment, the case where the required time from transmission to reception for the preliminary transmission information relayed by the relay apparatus 30a is shorter than the required time for the preliminary transmission information relayed by the relay apparatus 30b, and the relay apparatus 30a is selected, is illustrated.

Meanwhile, in the above-described example, the relay apparatus 30a is narrowed on the side of the destination terminal 10db. The present embodiment is not limited to this, but by the destination terminal 10db sending all pieces of required time information, indicating required times for preliminary transmission information from transmission to reception, to the request source terminal 10aa or the transmission management system 50, one relay apparatus 30a may be finally narrowed on the side of the request source terminal 10aa or on the side of the transmission management system 50.

Next, the destination terminal 10db sends selection information indicating that the relay apparatus 30a is selected to the transmission management system 50 from the transmission/reception unit 11 via the communication network 2 (step S66). The selection information includes the session ID "se1" and relay apparatus ID "111a" of the selected relay apparatus 30a. Accordingly, the transmission management system 50, in the execution of the session under the session ID "se1", recognizes that the relay apparatus 30a is selected, and also recognizes the IP address "1.3.2.4" of the transmission terminal 10db, which is a transmission source of the selection information.

Next, the session management unit 57 of the transmission management system 50 manages the relay apparatus ID "111a" of the relay apparatus 30a, which is finally selected, by storing the relay apparatus ID "111a" in a field of a relay apparatus ID in a record including the selection session ID "se1" (step S67-1). The transmission/reception unit 51 sends the relay apparatus ID "111a" and the IP address "1.3.2.4" of the destination terminal 10db to the request source terminal 10aa (step S67-21). Then, the transmission/reception unit 51 of the transmission management system 50 sends relay start request information, in which a request to start the relay is indicated, to the relay apparatus 30a via the communication network 2 (step S68). The relay start request information includes the respective IP addresses ("1.2.1.3" and "1.3.2.4") of the request source terminal 10aa and the destination terminal 10db which are relayed. Accordingly, the relay apparatus 30a establishes a session for communicating three kinds of image data of low resolution, intermediate resolution and high resolution and voice data between the transmission terminals (10aa and 10db) (step S69). Accordingly, the transmission terminals (10aa and 10db) can start a video conference.

Meanwhile, at step S47, with the transmission of the relay apparatus narrowing information to the destination terminal 10db by the transmission management system 50, through steps S48 to S64-1, S64-2, the selection process (step S65) of a relay apparatus on the side of the destination terminal 10db is performed. The present embodiment is not limited to this. By the transmission management system 50 sending the relay apparatus narrowing information to the request source terminal 10aa, at step S47, until steps S64-1, S64-2, a transmission source and a reception source of each information may be exchanged between the request source terminal 10aa and the destination terminal 10db. Accordingly, the request source terminal 10aa can perform a selection process of a relay apparatus instead of step S65, and can send selection information instead of step S66.

Next, a process of sending/receiving image data and voice data between the request source terminal 10aa and the destination terminal 10db in order to conduct a video conference will be explained with reference to FIGS. 5 and 23. First, the request source terminal 10aa sends image data of a photographic subject imaged by the image unit 14a and voice data of a voice input by the voice input unit 15a to the relay apparatus 30a from the transmission/reception unit 11 via the communication network 2 (step S81). Meanwhile, in the above-described example, image data of high image quality including a low resolution part, an intermediate resolution part and a high resolution part, as shown in FIGS. 6A to 6C, and a voice data are sent. Accordingly, the relay apparatus 30a receives the image data having the above-described three kinds of resolutions and the voice data at the transmission/reception unit 31. Then, the data quality verification unit 33, by searching the change quality management table (See FIG. 7) with the IP address "1.3.2.4" of the destination terminal 10db as a search key, and by extracting image quality of corresponding image data to be relayed, verifies image quality of an image of the image data to be relayed (step S82). In the present embodiment, since the verified image quality of the image of the image data, as above, is "high resolution" and is the same as the image quality of the image data received by the transmission/reception unit 31, the image data and the voice data are forwarded to the destination terminal 10db without changing the image quality and the sound quality (step S83). Accordingly, in the destination terminal 10db, the transmission/reception unit 11 receives image data and voice data, the image display control unit 14b displays an image based on the above-described image data on the display unit 120 and the voice output unit 15b outputs a voice based on the voice data.

Next, the delay detection unit 17 of the transmission terminal 10db detects a delay time of detection of an image data received by the transmission/reception unit 11 at each fixed time (for example, at every second) (step S84). Meanwhile, in the following, the case where the delay time is 200 ms will be explained.

The transmission/reception unit 11 of the destination terminal 10db sends delay information indicating the delay time "200 ms" to the transmission management system 50 via the communication network 2 (step S85). Accordingly, the transmission management system 50 recognizes the delay time and the IP address "1.3.2.4" of the transmission terminal 10db which is a transmission source of the delay information.

Next, the delay time management unit 60, by searching the terminal management table (See FIG. 10) with the IP address "1.3.2.4" of the above-described destination terminal 10db as a search key, extracts corresponding terminal ID "01db", and manages the delay time "200 ms" indicated in the above-described delay information by storing the delay time "200 ms" in a field of a delay time in a record of the above-described terminal ID "01db" in the session management table (See FIG. 12) in the session management DB 5005 (step S86).

Next the quality determination unit 58, by searching the quality management table (See FIG. 15) with the above-described delay time "200 ms" as a search key and by extracting corresponding image quality of image data "intermediate image quality", determines the image quality to "intermediate image quality" (step S87).

Next, the transmission/reception unit 51, by searching the relay apparatus management DB table (See FIG. 8) with the relay apparatus ID "111a", which is associated with the above-described terminal ID "01db" in the session management table (See FIG. 12), as a search key, extracts the IP address "1.2.1.2" of the corresponding relay apparatus 30a (step S88). Then, the transmission/reception unit 51 sends the quality information indicating the image quality of image data "intermediate image quality" determined at step S87 to the relay apparatus 30a via the communication network 2 (step S89). The quality information includes the IP address "1.3.2.4" of the destination terminal 10db used as a search key at step S86. Accordingly, in the relay apparatus 30a, the change quality management unit 34 manages the IP address "1.3.2.4" of the transmission terminal 10 of the transmission destination (in the present embodiment, the destination terminal 10db) and the image quality of image data to be relayed "intermediate image quality" by storing the IP address and the image quality in the change quality management table (See FIG. 7) associated with each other (step S90).

Next, the transmission terminal 10aa, in the same way as step S81, sends image data of high image quality including three image qualities, i.e. low image quality, intermediate image quality and high image quality and voice data to the relay apparatus 30a (step S91). Accordingly, in the relay apparatus 30a, in the same way as step S82, the data quality verification unit 33, by searching the change quality management table (See FIG. 7) with the IP address "1.3.2.4" of the destination terminal 10db as a search key, and by extracting the corresponding image quality of image data to be relayed "intermediate image quality", verifies quality of an image of the image data to be relayed (step S92). Here, since the verified image quality of image data is "intermediate image quality", which is lower than the image quality of image data "high image quality", received by the transmission/reception unit 31, the data quality change unit 35 changes the quality of an image of the image data by suppressing the image quality of the image data from "high image quality" to "intermediate image quality" (step S93). Then, the transmission/reception unit 31 sends the image data, image quality of which is changed to "intermediate image quality" and the voice data, voice quality of which is unchanged, to the transmission terminal 10db via the communication network 2 (step S94). In this way, in the case where a reception delay occurs in the destination terminal 10db, which receives image data, the relay apparatus 30a changes image quality so as not to give uncomfortable feeling to participants in a video conference.

Next, a process of sharing a whole screen on which document data, stored in the storage unit 4000 of the external input device 40, are displayed, after the relay apparatus 30 is determined, will be explained with reference to FIG. 25. Here, the case where information displayed on the external input device 40aa connected to the transmission terminal 10aa is displayed on the transmission terminal 10db, which is a destination terminal will be explained.

As described above, when the relay apparatus 30 is determined, the transmission/reception unit 11 of the transmission terminal 10aa receives the relay apparatus ID "111a" and the IP address "1.3.2.4" of the destination terminal 10db, which are sent from the transmission management system 50 at step S67-21, and the storage/readout process unit 19 stores the relay apparatus ID "111a" and the IP address "1.3.2.4", received as above, in the storage unit 1000 (step S67-22).

Moreover, when the external input device 40*aa* and the transmission terminal 10*aa* are connected with each other, the connection detection unit 42 of the external input device 40*aa* detects the connection (step S70). When the connection detection unit 42 detects that the external input device 40*aa* and the transmission terminal 10*aa* are connected with each other, as shown in FIG. 28, the install determination unit 43 determines whether the display data transmission unit 452 has already been installed (step S71). In the case where the display data transmission unit 452 is not determined to be installed (step S71: NO), the program acquisition unit 44 acquires the display data transmission unit 452 stored in the transmission terminal 10*aa*, and installs it (step S72). When the display data transmission unit 452 is installed at step S72, the external input device 40*aa* requires the transmission terminal 10*aa* to permit to execute a process of the display data acquisition unit 451 (step S73). When the transmission terminal 10*aa* permits the external input device 40*aa* to execute the process of the display data acquisition unit 451, the display data acquisition unit 451 acquires display data (step S74). Next, the display data transmission unit 452 sends the display data acquired by the display data acquisition unit 451 to the transmission terminal 10*aa* (step S75).

In the case where the display data transmission unit 452 is determined to be installed at step S71, the process proceeds to step S73.

When the external information transmission/reception unit 18 of the transmission terminal 10*aa*, which is a transmission destination, receives the display data, the storage/readout process unit 19 acquires the relay apparatus ID "111a" stored in the storage unit 1000 and the IP address "1.3.2.4" of the transmission terminal 10*db*, which is a destination (step S77). Then, the transmission/reception unit 11 sends the display data and the IP address "1.3.2.4" of the transmission terminal 10*db*, which is a destination, to a relay apparatus 30 indicated by the relay apparatus ID "111a" acquired at step S77 (step S78). Upon receiving the display data sent from the transmission terminal 10*aa* at step S78, the relay apparatus 30 changes a quality of the display data based on the IP address "1.3.2.4" of the transmission terminal 10*db* (step S79), and sends the display data to the transmission terminal 10*db* (step S80). Details of the process at step S77 are the same as the above-described processes of changing quality of voice data and image data (steps S81 to S94), and an explanation will be omitted. When the transmission/reception unit 11 of the transmission terminal 10*db* receives the display data sent from the relay apparatus 30, the image display control unit 14*b* displays the display data. FIG. 27 illustrates an example, in which in a left part of a screen an image displayed on the external input device 40*aa* is displayed based on the display data, and in an upper right part of the screen an image captured by the image unit 14*a* of the transmission terminal 10*aa* and sent by the transmission/reception unit 11 is displayed. Moreover, in a lower right part of the screen, an image captured by the image unit 14*a* of the transmission terminal 10*db* is displayed.

<<Main Effect>>

As described above, by storing the relay apparatus ID of the relay apparatus 30 which relays voice data and image data in the storage unit 1000 of the transmission terminal 10*aa*, display data of document data stored in the storage unit 4000 of the external input device 40, which is not managed by the transmission management system 50, can be sent to the transmission terminal 10*db*, which is an other party of the conference. Accordingly, the transmission management system 50 needs not authenticate the external input device 40, and a management load is reduced.

Moreover, also in the case of sharing a screen displayed on an external input device 40, which is provided with neither a display data acquisition unit 451 nor a display data transmission unit 452, upon connecting with a transmission terminal 40, the display data acquisition unit 451 or the display data transmission unit 452 is provided so that the screen can be shared.

Even if an environment of the LAN 2*a* to 2*d*, such as the IP address of the relay apparatus 30 can be acquired among the communication network 2, it is difficult to acquire an environment of the internet 2*i*. Therefore, at first, based on information on an environment that can be acquired, plural relay apparatuses 30 relaying image data and voice data are narrowed to two or more relay apparatuses. Then, before actually sending/receiving image data and voice data between the plural transmission terminals 10, instead of the image data or the voice data, preliminary transmission information is transmitted or received, and a relay apparatus 30 that can actually relay the preliminary transmission information the fastest is selected.

That is, by selecting two or more relay apparatuses 30, to which IP addresses closest to either of the IP addresses of the transmission terminals 10 are allocated, two or more candidates of a relay apparatus 30 that is finally used are left. Accordingly, afterwards, by actually transmitting/receiving the preliminary transmission information between the request source terminal 10A and the destination terminal 10B via each of the candidates of the relay apparatus 30, a relay apparatus 30 that relays the preliminary transmission information with a required time for transmitting/receiving which is the shortest is selected Therefore, under the present environment of the communication network 2, transmission/reception of image data or voice data of the highest quality can be realized.

Moreover, upon narrowing the relay apparatuses 30, not only relay apparatuses 30 having IP addresses which are close to IP addresses of transmission terminals 10 used for a video conference are preferentially selected, but also two or more relay apparatuses are selected taking account of maximum data transmission rates of the respective relay apparatuses 30. Accordingly, relay apparatus 30 are narrowed based on an actual environment of the communication network 2.

Furthermore, upon narrowing the relay apparatuses 30, the relay apparatuses 30, operation statuses of which are "online", are narrowed. Accordingly, relay apparatus 30 are narrowed based on an actual environment of the communication network 1.

<<Explanation of Transmission System According to the Present Embodiment>>

As described above, the basic configuration of the transmission system used in the present embodiment is explained with reference to FIGS. 1 to 28. In the following, a specific configuration of the transmission system 1 according to the present embodiment will be explained with reference to FIGS. 29 to 45.

Figure 29:
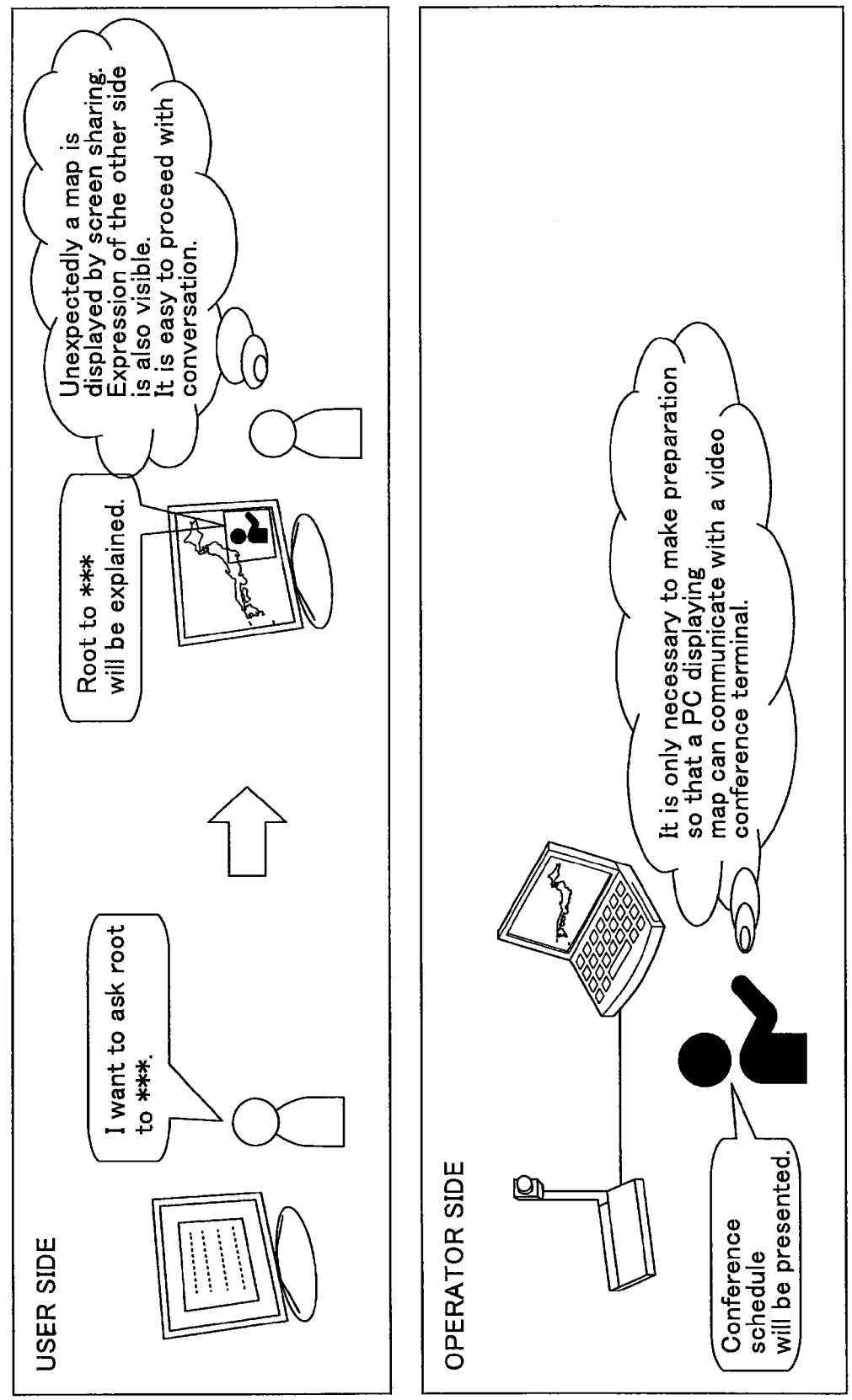
FIG. 29 is a diagram for explaining an example of an outline of the transmission system 1 according to the present embodiment.

FIG. 29 illustrates a schematic configuration of the transmission system 1 according to the present embodiment. The transmission system 1 is used, for example, for a call center or a help desk. A user starts a call with an operator of the call center or the help desk, using a transmission terminal 10*aa* of the transmission system 1, and makes an inquiry. In FIG. 29, a user, who wants root guidance, using the transmission terminal 10*aa*, for example, makes an inquiry by selecting a desired operator from a destination list, shown in FIG. 30, and sending a message. Meanwhile, the destination list includes destination candidate terminals which are registered in advance. The transmission terminal 10*aa*, following the operations shown in FIG. 17, after connecting to the transmission management system 50, acquires operational statuses of the respective destination candidate terminals and updates content of the destination list.

Figure 33:
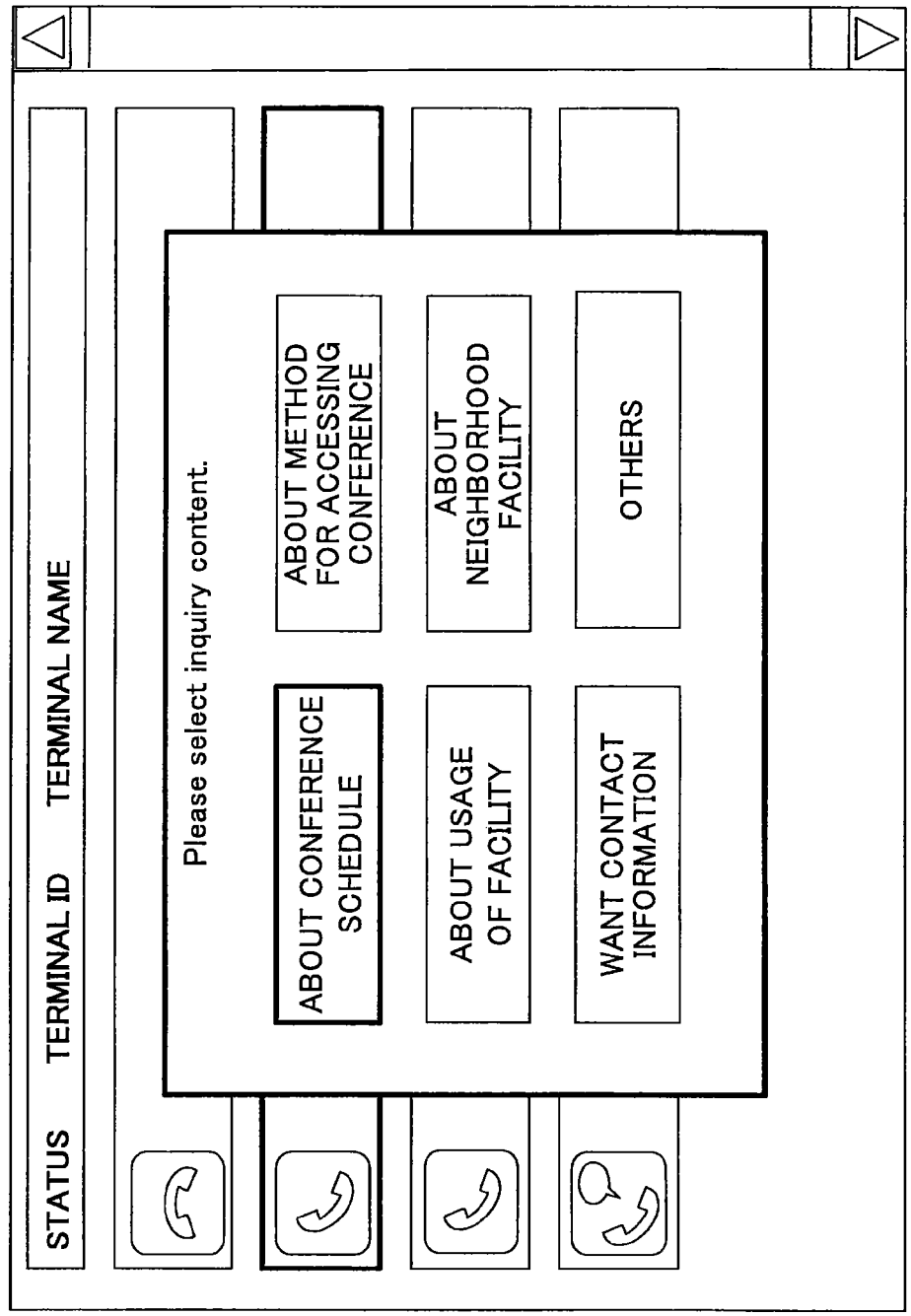
FIG. 33 is a diagram illustrating an example of a screen for selecting the content of an inquiry according to the present embodiment.
Figure 34:
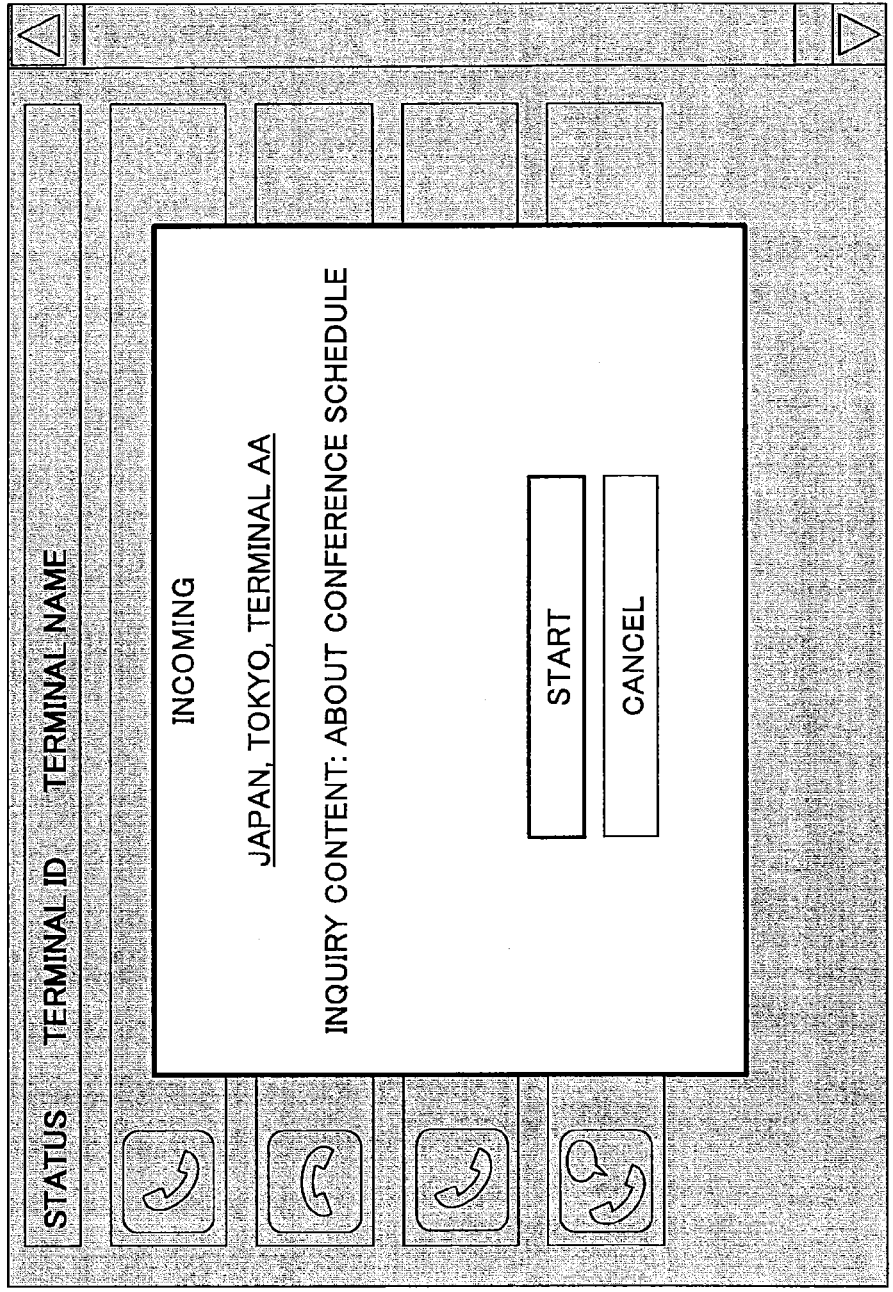
FIG. 34 is a diagram illustrating an example of a screen for displaying the content of an inquiry according to the present embodiment.

The transmission terminal 10aa according to the present embodiment displays a list of contents of inquiries (kinds of inquiries, categories of inquiries or the like) on the display 120, as shown in FIG. 29 or 33. The user can select the content of the inquiry from the list upon making a call with an operator. The operator can confirm the selected content through a display 120 of a transmission terminal 10ad used by the operator, as shown in FIG. 34, for example. Accordingly, the operator can recognize the content of the inquiry without a conversation with the user. Especially, by selecting the content of the inquiry and transmitting the content to the operator upon making a call with the operator, the user can receive an answer in response to the inquiry just after starting the call.

Moreover, the transmission management system, which manages sessions on the transmission terminals of the user and the operator, manages the list of contents of inquiries, and outputs the content of the inquiry selected by the transmission terminal 10aa of the user to the transmission terminal 10ad of the operator.

Furthermore, the transmission management system 50 is provided with a function of controlling an operation of the transmission terminal 10da of the operator in response to the content of the inquiry. For example, in the case where the content of the inquiry is a root guidance, the transmission management system 50 instructs the transmission terminal 10da of the operator to start sharing a screen. The transmission terminal 10da, receiving the instruction, starts a screen sharing by an external input device 40 connected with the transmission terminal 10da. Then, the operator operates the external input device 40 in order to perform the root guidance, which is the content of the inquiry, and displays a map by using, for example, a Web browser.

Accordingly, the transmission terminal 10aa on the user's side displays simultaneously a shared screen of the map output by the external input device 40 and an image of the operator. Therefore, the user can obtain an answer to the inquiry quickly and effectively. For example, the transmission management system 50, by sending an instruction to the transmission terminal of the operator upon the user making a call with the operator, just after the start of the call the operator can provide an answer using the shared screen, and it is especially beneficial.

Moreover, the function of the transmission terminal 10aa of the user is not limited to displaying the screen of map and the image of the operator simultaneously, as shown in FIG. 29. The transmission terminal 10aa may display either one of the screen map and the operator's image in response to the user's operation. Furthermore, the transmission terminal 10aa of the user may display an enlarged image of the operator and a reduced image of the screen of map in response to the user's operation, and may display both images of the same size.

(Functional Configuration)

Figure 31:
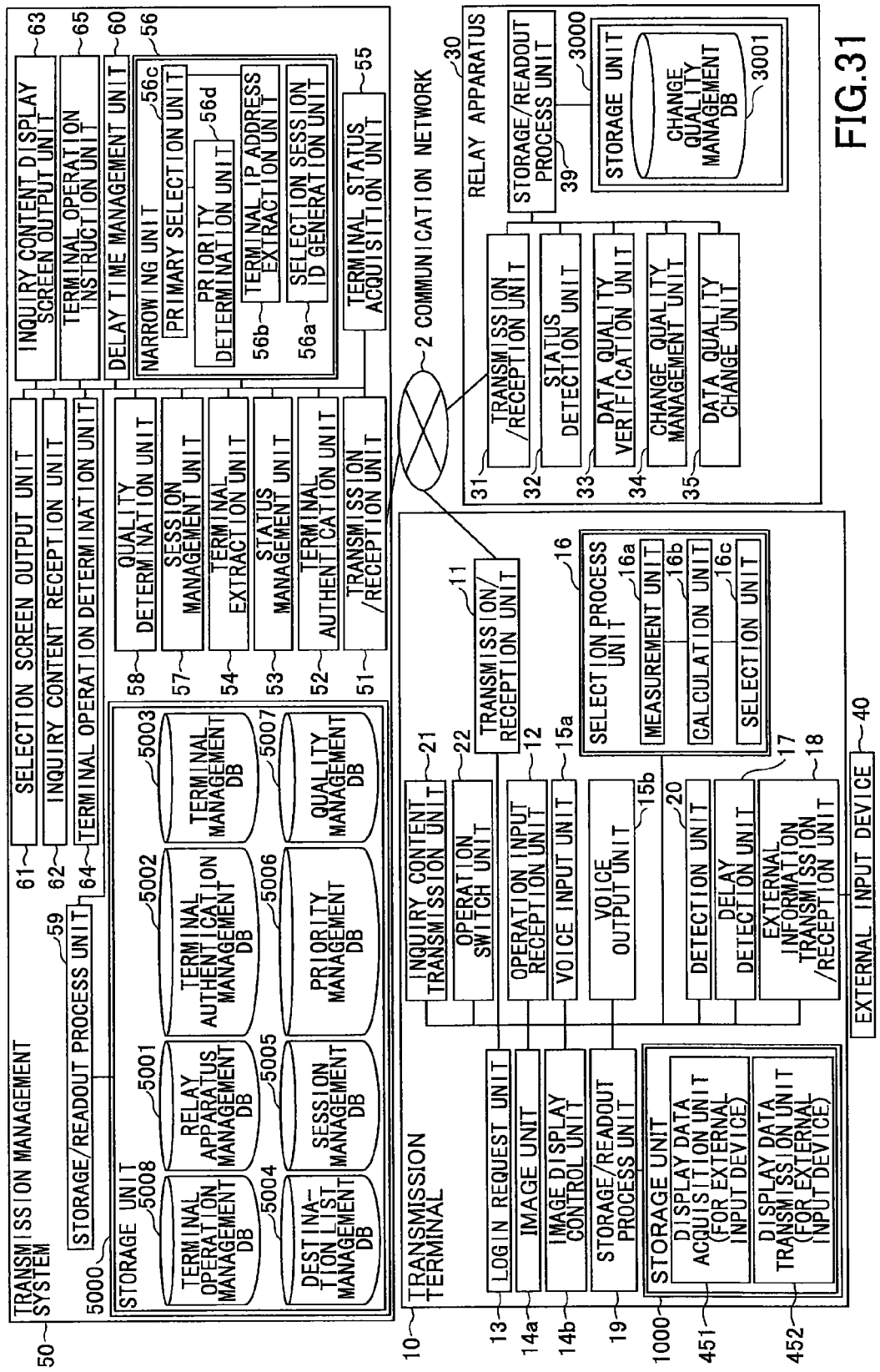
FIG. 31 is a functional block diagram illustrating an example of a terminal, an apparatus and a system in the transmission system according to the present embodiment.

FIG. 31 illustrates a functional block diagram of the transmission management system 50, the transmission terminal 10 and the relay apparatus 30 according to the present embodiment. In the following, the functional block diagram will be explained focusing on differences from the above-described functional block diagram shown in FIG. 5. Moreover, in the following, among the transmission terminals 10, the transmission terminal used by the user may be especially denoted "transmission terminal 10aa" and the transmission terminal used by the operator may be denoted "transmission terminal 10ad".

(Functional Configuration of Transmission Management System)

In the functional block diagram shown in FIG. 31, the transmission management system 50 further includes a selection screen output unit 61, an inquiry content reception unit 62, an inquiry content display screen output unit 63, a terminal operation determination unit 64a and a terminal operation instruction unit 65. Moreover, the storage unit 5000 further includes a terminal operation management DB 5008.

(Terminal Operation Management Table)

In the storage unit 5000, the terminal operation management DB 5008 including a terminal operation management table as illustrated in FIG. 32 is configured. In the terminal operation management table, for each number, "inquiry content" representing the content of inquiry by a character string and "operation mode" corresponding to the answer thereto are associated with each other and stored. The number is an identifier attached in order to manage a pair of the "inquiry content" and the "operation mode". The "inquiry content" is displayed on the transmission terminal 10aa of the user and is an option of the inquiry content by the user. The "operation mode" is used for controlling an operation of the transmission terminal 10ad of the operator in response to the content of inquiry. Details will be described later. For example, in the case of the "operation mode" of "1", the transmission management system 50 instructs the transmission terminal 10ad of the operator to send only the operator's image to the transmission terminal 10aa of the user. Moreover, in the case of the "operation mode" of "2", the transmission management system 50 instructs the transmission terminal 10ad of the operator to start sharing the screen by the external input device 40.

The selection screen output unit 61 reads the terminal operation management table shown in FIG. 32, and outputs a selection screen for inquiry content including a list of contents of inquiries to the transmission terminal 10aa of the user. The selection screen output unit 61 may output the selection screen in response to the transmission terminal 10aa of the user receiving a notice indicating that a destination candidate terminal of a help desk or a call center is selected from the destination list. Moreover, the selection screen output unit 61 may output at an arbitrary timing the selection screen in response to a request from the transmission terminal 10aa of the user.

The inquiry content reception unit 62 receives "number" corresponding to "inquiry content" selected on the selection screen for inquiry content in the transmission terminal 10aa of the user, from the transmission terminal 10aa.

The inquiry content display screen output unit 63 outputs the inquiry content display screen (See FIG. 34) for displaying the "inquiry content" corresponding to "number" received from the transmission terminal 10aa of the user to the transmission terminal 10ad of the operator.

The terminal operation determination unit 64 determines an operation mode corresponding to the "number" (i.e. "inquiry content") received from the transmission terminal 10aa of the user, with reference to the terminal operation management table shown in FIG. 32.

The terminal operation instruction unit 65 sends an operation instruction to the transmission terminal 10ad of the operator in response to the operation mode determined by the terminal operation determination unit 64. Specifically, in the case of the "operation mode" of "1", the terminal operation instruction unit 65 instructs the transmission terminal 10ad of the operator to perform, as normal, a video call of one to one by the user and the operator. On the other hand, in the case of the "operation mode" of "2", the terminal operation instruction unit 65 instructs the transmission terminal 10*ad* of the operator to start sharing a screen by the external input device 40. At this time, the terminal operation instruction unit 65 may instruct the transmission terminal 10*ad* of the operator to send the image of the operator as well as the screen sharing. Meanwhile, the terminal operation instruction unit 65 may perform the operation instruction by sending the above-described "operation mode" to the transmission terminal 10*ad*.

The operation modes corresponding to the inquiry contents are preliminarily defined by the operator or the like. For example, in the case of the content of the inquiry, to which the operator answers more effectively by using the screen sharing by the external input device 40, to the operation mode "2" is assigned. On the other hand, in the case of the content of the inquiry to be handled as normal by the video call, "1" is assigned to the operation mode.

(Functional Configuration of Transmission Terminal)

In the functional block diagram shown in FIG. 31, the transmission terminal 10 further includes an inquiry content transmission unit 21 and an operation switch unit 22. Moreover, the image display control unit 14*b* displays a selection screen for inquiry content (See FIG. 33) and an inquiry content display screen (See FIG. 34) on the display 120 in response to outputs by the selection screen output unit 61 and the inquiry content display screen output unit 63 of the transmission management system 50. Moreover, the operation input reception unit 12 of the transmission terminal 10 according to the present embodiment receives a selection input for inquiry content by the user on the displayed selection screen for inquiry content.

The inquiry content transmission unit 21 sends inquiry content selected by the user on the selection screen for inquiry content to the transmission management system 50 via the communication network 2. The inquiry content transmission unit 21 may send only a number corresponding to the selected inquiry content to the transmission management system 50.

The operation switch unit 22 switches an operation of the transmission terminal 10 in response to the operation instruction from the terminal operation instruction unit 65 of the transmission management system 50. Specifically, upon receiving an instruction to perform the video call of one to one by the user and the operator (operation mode "1"), the operation switch unit 22 switches the operation so as to send an image captured by the image unit 14*a* and a voice input from the voice input unit 15*a* to the relay apparatus 30.

On the other hand, upon receiving an instruction to start sharing a screen by the external input device 40 (operation mode "2"), the operation switch unit 22 switches the operation so as to send display data input by the external information transmission/reception unit 18 to the relay apparatus 30. That is, the operation switch unit 22 switches an operation of the transmission terminal 10 so as to start sharing a screen by the external input device 40. At this time, the operation switch unit 22 may switch an operation so as to send the image and voice of the operator and the display data to the relay apparatus 30.

Meanwhile, the above-described transmission terminal 10 has a configuration that can be used as the transmission terminal on any of the side of the user and the side of the operator. However, the transmission terminal on the user's side may have a different configuration from the transmission terminal on the operator's side. For example, the transmission terminal on the user's side may not include the operation switch unit 22, the external information transmission/reception unit 18, the display data acquisition unit 451 or the display data transmission unit 452. Moreover, the transmission terminal on the operator's side may not include the inquiry content transmission unit 21.

<<Process and Operation>>

Next, with reference to FIGS. 35 to 38, examples of process and operation in the transmission system 1 according to the present embodiment will be explained.

Figure 35:
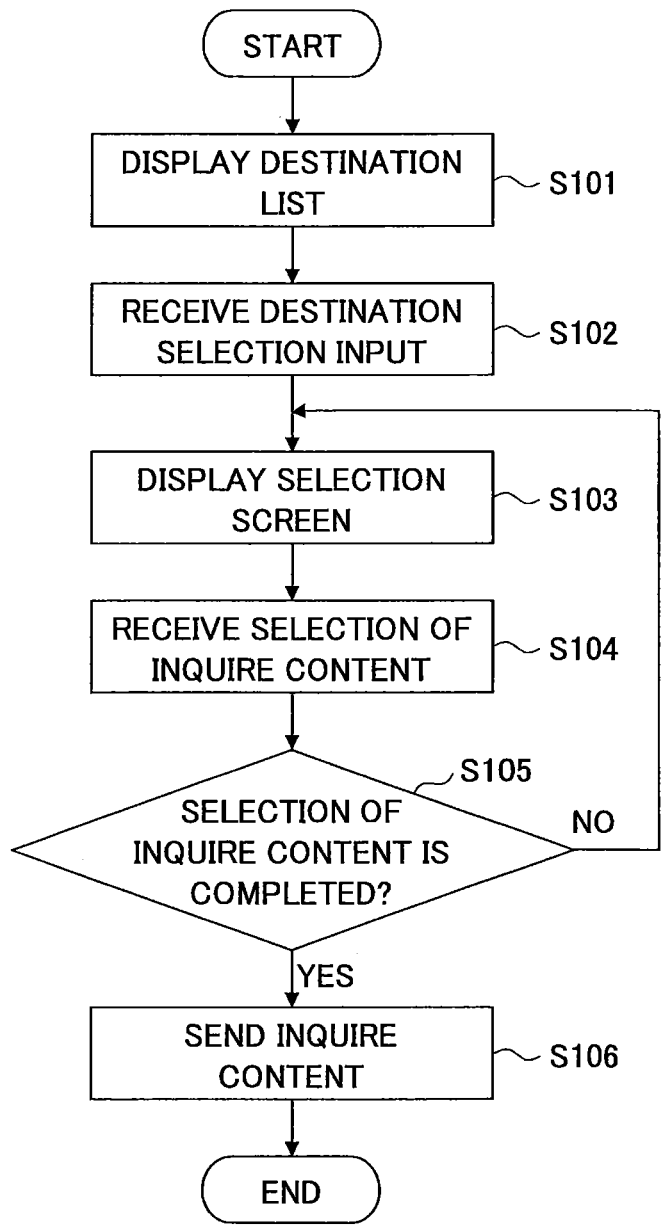
FIG. 35 is a processing flowchart illustrating an example of a process for sending the content of an inquiry according to the present embodiment.

FIG. 35 illustrates a flow of a process of the transmission terminal 10*aa* of the user sending inquiry content selected by the user to the transmission management system 50 according to the present embodiment.

At first, the image display control unit 14*b* displays the destination list (See FIG. 30) on the display 120 (step S101). Then, the operation input reception unit 12 receives a destination selection input from the user (step S102). At this time, the transmission/reception unit 11 may give notice that one destination is selected to the transmission management system 50. Then, the image display control unit 14*b* displays the selection screen for inquiry content (See FIG. 33) output from the transmission management system 50 on the display 120 (step S103).

Next, the operation input reception unit 12 receives a selection input for inquiry content by the user on the displayed selection screen for inquiry content (step S104). Then, the inquiry content transmission unit 21 determines whether the selection for inquiry content by the user is completed (step S105). In the case where the selection is completed (step S105: YES), a number corresponding to the selected inquiry content is sent to the transmission management system 50 (step S106).

On the other hand, in the case where the selection for inquiry content by the user has not been completed (step S105: NO), the process returns to step S103, and the inquiry content transmission unit 21 displays the selection screen again. The above process is performed in the case where, for example, plural inquiry content can be selected, the plural inquiry content are provided in a hierarchical structure, or the like. Afterwards, the inquiry content transmission unit 21 sends all the numbers corresponding to the selected plural inquiry content to the transmission management system 50. Meanwhile, the transmission of inquiry content at step S106 may be performed along with the transmission process from the transmission terminal 10*aa* to the transmission terminal, which is selected at step S102.

Figure 36:
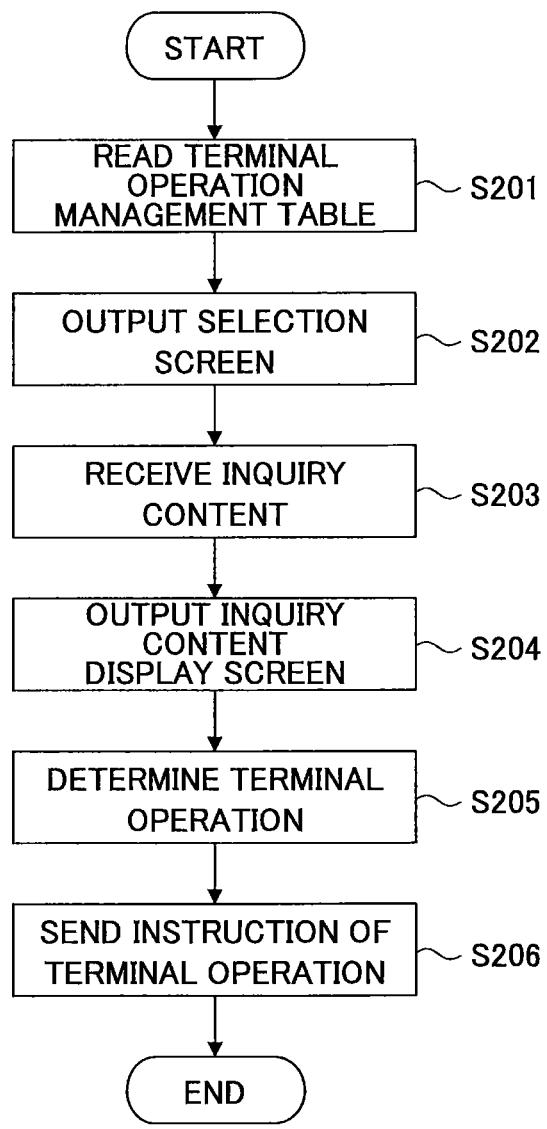
FIG. 36 is a processing flowchart illustrating an example of a process of determining operation in response to the content of an inquiry according to the present embodiment.

FIG. 36 illustrates a flow of a process of the transmission management system 50 sending an operation instruction to the transmission terminal 10*ad* of the operator in response to an inquiry content received from the transmission terminal 10*aa* of the user according to the present embodiment.

At first, the selection screen output unit 61 reads the terminal operation management table shown in FIG. 32 (step S201). Then, the selection screen output unit 61 outputs a selection screen (See FIG. 33) for inquiry content including a list of inquiry content to the transmission terminal 10*aa* of the user (step S202).

Afterwards, the inquiry content reception unit 62 receives "number" corresponding to "inquiry content" selected on the selection screen for inquiry content in the transmission terminal 10*aa* of the user, from the transmission terminal 10*aa* (step S203). At this time, from the transmission terminal 10*aa* of the user to the transmission terminal 10*ad* of the operator a transmission process may be performed.

Next, the inquiry content display screen output unit 63 outputs the inquiry content display screen (See FIG. 34) for displaying the "inquiry content" corresponding to "number" received from the transmission terminal 10*aa* of the user to the transmission terminal 10*ad* of the operator (step S204).

Moreover, the terminal operation determination unit 64 determines an operation mode corresponding to the "number" (i.e. "inquiry content") received from the transmission terminal 10aa of the user, with reference to the terminal operation management table shown in FIG. 32 (step S205). Then, the terminal operation instruction unit 65 sends an operation instruction (operation mode) to the transmission terminal 10ad of the operator in response to the operation mode determined by the terminal operation determination unit 64 (step S206).

Meanwhile, the above-described process at step S204 may be performed in parallel with the processes at steps S205, S206, and may be performed after the processes at steps S205, S206.

Figure 37:
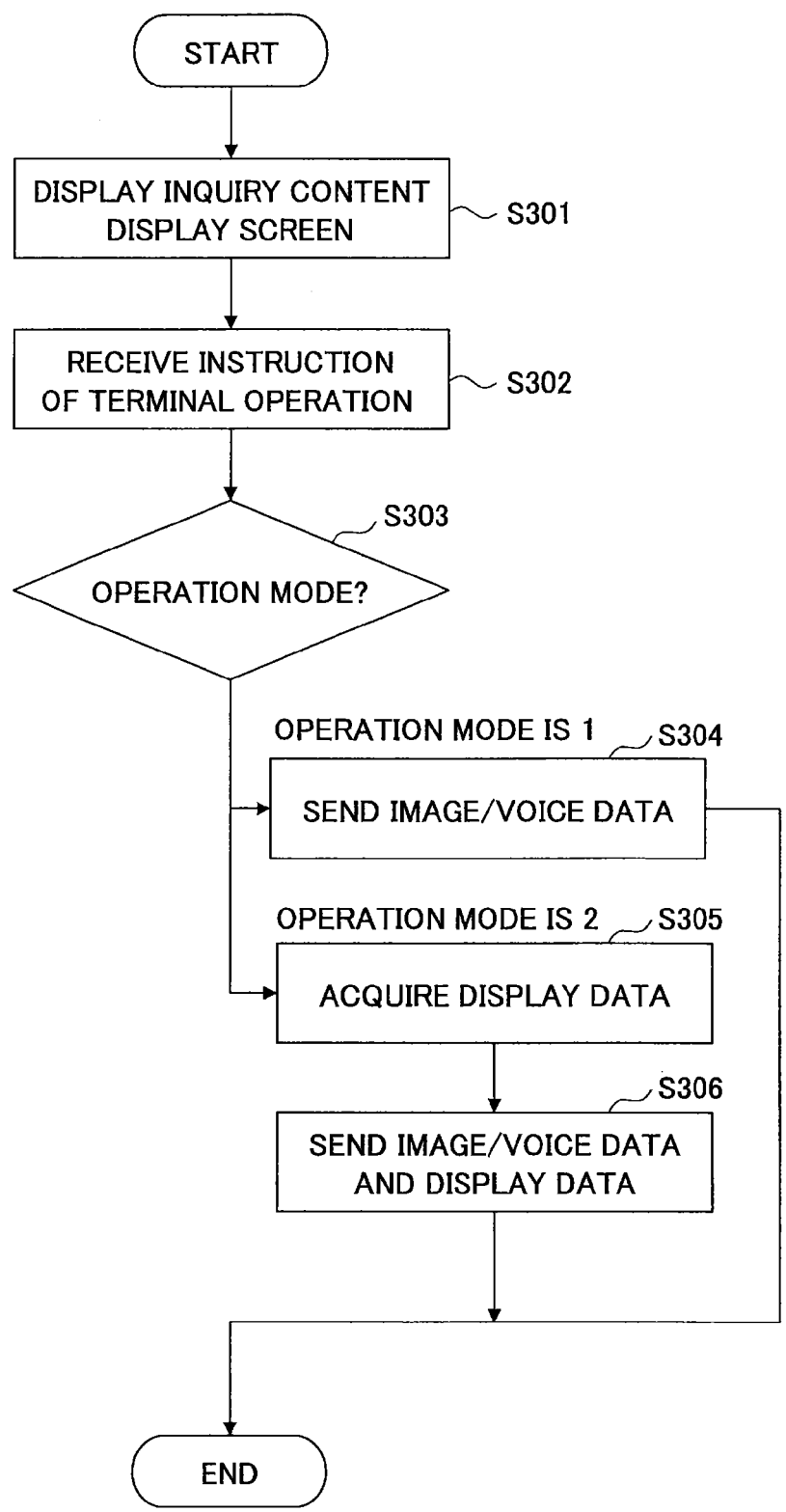
FIG. 37 is a processing flowchart illustrating an example of a process of sending data in response to an operation instruction according to the present embodiment.

FIG. 37 illustrates a flow of a process of the transmission terminal 10ad of the operator sending data in response to an operation instruction according to the present embodiment.

At first, the image display control unit 14b displays the inquiry content display screen (See FIG. 34) on the display 120 in response to an output by the inquiry content display screen output unit 63 of the transmission management system 50 (step S301). Here, in the case where a session is not established between the transmission terminals 10aa and 10ad, a session may be established in response to an operation of the operator holding a "start" button down.

Next, the operation switch unit 22 receives a terminal operation instruction from the terminal operation instruction unit 65 of the transmission management system 50 (step S302). Then, the operation switch unit 22 determines content of the operation instruction (operation mode) (step S303). Here, in the case of the operation mode of "1", the transmission/reception unit 11 sends an image captured by the image unit 14a and a voice input from the voice input unit 15a to the relay apparatus 30 (step S304).

On the other hand, in the case of the operation mode of "2", the external information transmission/reception unit 18 acquires display data related to the screen sharing from the external input device 40 (step S305). Then, the transmission/reception unit 11 sends the image captured by the image unit 14a and the voice input from the voice input unit 15a along with the display data acquired from the external input device 40 to the relay apparatus 30 (step S306).

FIG. 38 is a sequence diagram illustrating a whole operation of the transmission system 1. Here, a case where the user selects "about conference schedule" of the inquiry contents shown in FIG. 33 will be explained. Meanwhile, in the present embodiment, it will be explained assuming that after selection of the inquiry content the call process to the operator is performed. Moreover, the operator operates the transmission terminal 10ad, which is in the state of connecting to the external input device 40, and presents an answer to the inquiry content using the external input device 40.

First, the image display control unit 14b of the transmission terminal 10aa of the user displays the destination list (See FIG. 30) on the display 120 (step S401). Then, the operation input reception unit 12 receives a destination selection input from the user (step S402). Next, the transmission/reception unit 11 gives notice that one destination is selected to the transmission management system 50 (step S403).

In response to the notice received at step S403, the selection screen output unit 61 of the transmission management system 50 reads the terminal operation management table shown in FIG. 32 (step S404). Then, the selection screen output unit 61 reads the terminal operation management table shown in FIG. 32, and outputs an inquiry content selection screen (See FIG. 33) including the list of inquiry contents to the transmission terminal 10aa of the user (step S405).

Here, the image display control unit 14b of the transmission terminal 10aa of the user displays the inquiry content selection screen (See FIG. 33) output from the transmission management system 50 on the display 120 (step S406). Then, the operation input reception unit 12 receives an inquiry content selection input by the user on the displayed inquiry content selection screen (step S407). In the present embodiment, assume that the operation input reception unit 12 receives a selection of "about conference schedule" of the inquiry contents shown in FIG. 33. Then, the inquiry content transmission unit 21 sends a number "1" corresponding to the selected inquiry content to the transmission management system 50 (step S408). At this time, a call process from the transmission terminal 10aa of the user to the transmission terminal 10ad of the operator is executed.

At this time, the operator recognizes that the user inquires about the "conference schedule". Then, the operator operates the external input device 40 to display, for example, a screen of the conference schedule of the day in preparation for the answer.

The inquiry content display screen output unit 63 of the transmission management system 50 outputs an inquiry content display screen (See FIG. 34) including the inquiry content specified by the number "1" and the terminal ID of the transmission terminal 10aa, which is the source terminal, to the transmission terminal 10ad (step S409). The image display control unit 14b of the transmission terminal 10ad of the operator displays the inquiry content display screen (FIG. 34) on the display 120 (step S410). Here, by the operator holding a "start" button down, a connection process of a session between the transmission terminals 10aa and 10ad is executed (step S411). Meanwhile, the connection process of the session is executed according to the sequence explained with reference to FIG. 18.

Next, the terminal operation determination unit 64 of the transmission management system 50, with reference to the terminal operation management table, shown in FIG. 32, determines an operation mode, corresponding to the number "1" received from the transmission terminal 10aa of the user, is "2" (step S412). Then, the terminal operation instruction unit 65 sends an operation instruction to the transmission terminal 10ad of the operator so as to operate in the operation mode "2" (step S413).

Next, the operation switch unit 22 of the transmission terminal 10ad, in response to the reception of the operation instruction (operation mode is "2"), acquires display data from the external input device 40 (step S414). Here, the acquired display data are the screen data of the "conference schedule" that the operator preliminarily displays. Then, the transmission/reception unit 11 sends the image captured by the image unit 14a and the voice input from the voice input unit 15a along with the display data acquired from the external input device 40 to the relay apparatus 30 (step S415).

Afterwards, the relay apparatus 30 sends the image/voice data sent from the transmission terminal 10ad of the operator and the display data to the transmission terminal 10aa (step S416). The image display control unit 14b and the voice output unit 15b of the transmission terminal 10aa of the user display and reproduce these data, respectively (step S417).

According to the operations described as above, the user can inquire, viewing the conference schedule screen shared with the operator, promptly after establishing the session with the operator. Accordingly, the user can promptly obtain an answer to the inquiry content. Moreover, the operator can share a map screen in the case of the inquiry content of "method for accessing conference" or of "neighborhood facility". Furthermore, the operator can share a screen for explaining usage of the facility in the case of the inquiry content of "usage of facility". According to these operations, the transmission system 1 according to the present embodiment, the operator can answer to an inquiry promptly and precisely.

<<First Variation>>

Next, a variation of the above-described transmission system 1 will be described.

FIGS. 39A and 39B are diagrams illustrating an outline of the transmission system 1 according to the first variation. In the transmission system 1 shown in FIG. 29, the transmission terminal 10ad of the operator acquires a display screen on the connected external input device 40 as display data, and sends the screen to the transmission terminal 10aa of the user. In the first variation, the transmission terminal 10ad of the operator, instead of using the display screen of the external input device 40, uses a file stored in advance in the transmission terminal 10ad or at a predetermined site as display data. Then, the transmission terminal 10ad of the operator sends the display data to the transmission terminal 10aa of the user.

In the example illustrated in FIG. 39A, in the case where the user selects the inquiry of "conference schedule", the transmission terminal 10ad of the operator sends content of the file of conference schedule preliminarily stored in the transmission terminal 10ad to the transmission terminal 10aa of the user as display data. The user can obtain an answer to the inquiry by confirming the content. Moreover, as shown in FIG. 39B, the file may be stored in an external server.

(Functional Configuration)

Figure 40:
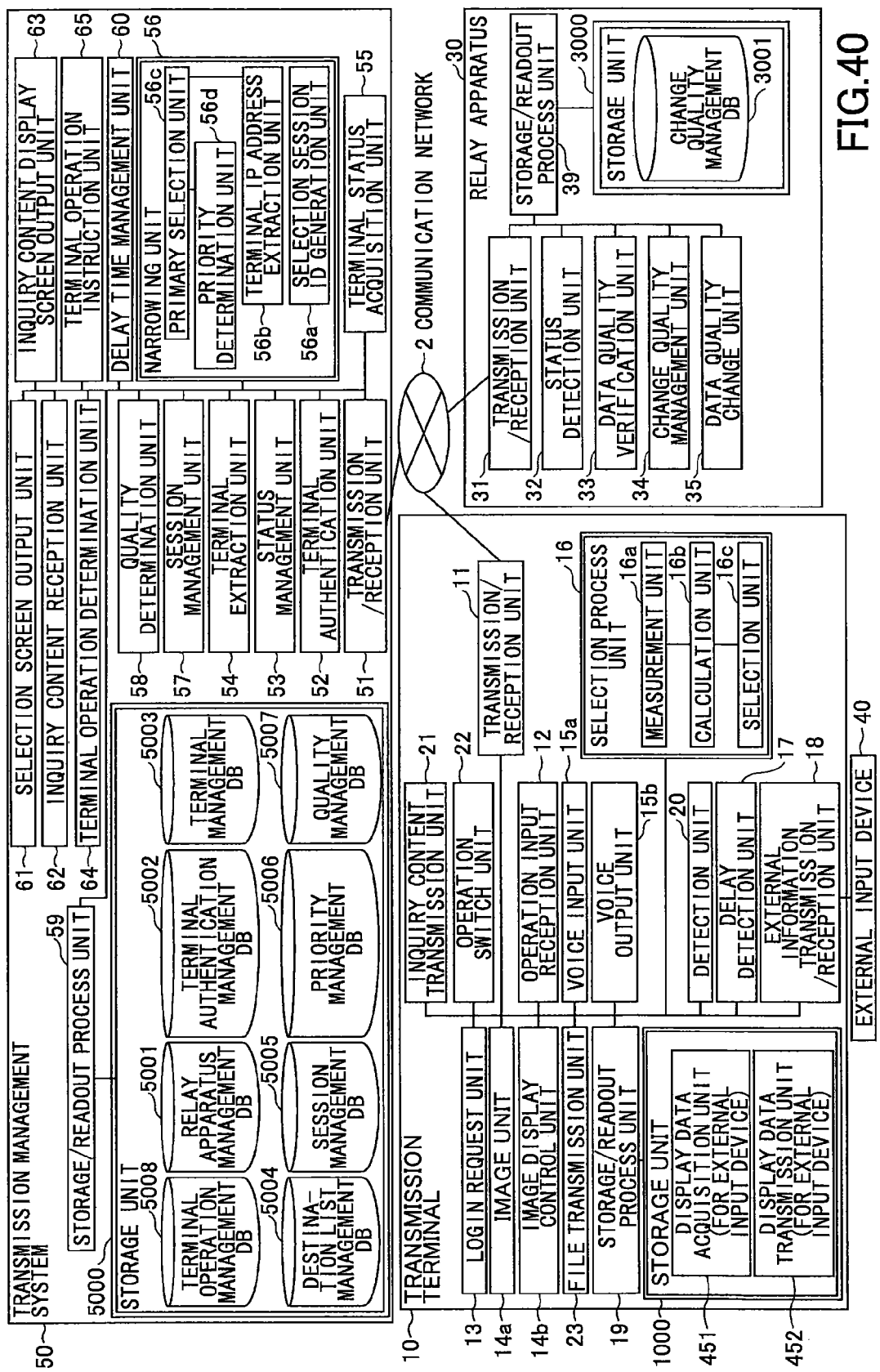
FIG. 40 is a functional block diagram illustrating an example of a terminal, an apparatus and a system in the transmission system according to the present embodiment.

FIG. 40 is a functional block diagram illustrating the transmission management system 50, the transmission terminal 10 and the relay apparatus 30 according to the first variation. In the following, main differences from the functional block diagram shown in FIG. 31 will be explained.

First, FIG. 41 illustrates an example of the terminal operation management table of the transmission management system 50 according to the first variation. The terminal operation management table shown in FIG. 41 manages the "inquiry content" and "display data" associated with each other for each number. The "display data" is indicated by, for example, a name of file for identifying the data.

The terminal operation determination unit 64 of the transmission management system 50 according to the present embodiment determines whether "display data" corresponding to "number" sent from the transmission terminal 10aa of the user are specified.

The terminal operation instruction unit 65 of the transmission management system 50 according to the present embodiment instructs the transmission terminal 10ad of the operator to send content of the "display data", in the case where the "display data" corresponding to the "number" sent from the transmission terminal 10aa of the user are specified. On the other hand, in the case where the "display data" corresponding to the "number" sent from the transmission terminal 10aa of the user are not specified, the terminal operation instruction unit 65 instructs the transmission terminal 10ad of the operator to perform a video call of one to one by the user and the operator.

Moreover, compared with the functional block diagram illustrated in FIG. 31, the transmission terminal 10 further includes a file transmission unit 23.

The operation switch unit 22 of the transmission terminal 10 according to the present embodiment, upon receiving the instruction to perform the video call of one to one by the user and the operator, switches the operation so as to send an image captured by the image unit 14a and a voice input from the voice input unit 15a to the relay apparatus 30.

On the other hand, the operation switch unit 22, upon receiving an instruction to send the content of the "display data", switches the operation so as to send the content of the "display data" to the relay apparatus 30. At this time, the operation switch unit 22 may switch the operation so as to send the image and the voice of the operator and the display data to the relay apparatus 30.

The file transmission unit 23 acquires the "display data" having a specified file name from the storage unit 1000 or an external server connected via the communication network 2, and sends content thereof to the relay apparatus 30 via the transmission/reception unit 11.

<<Process and Operation>>

Figure 42:
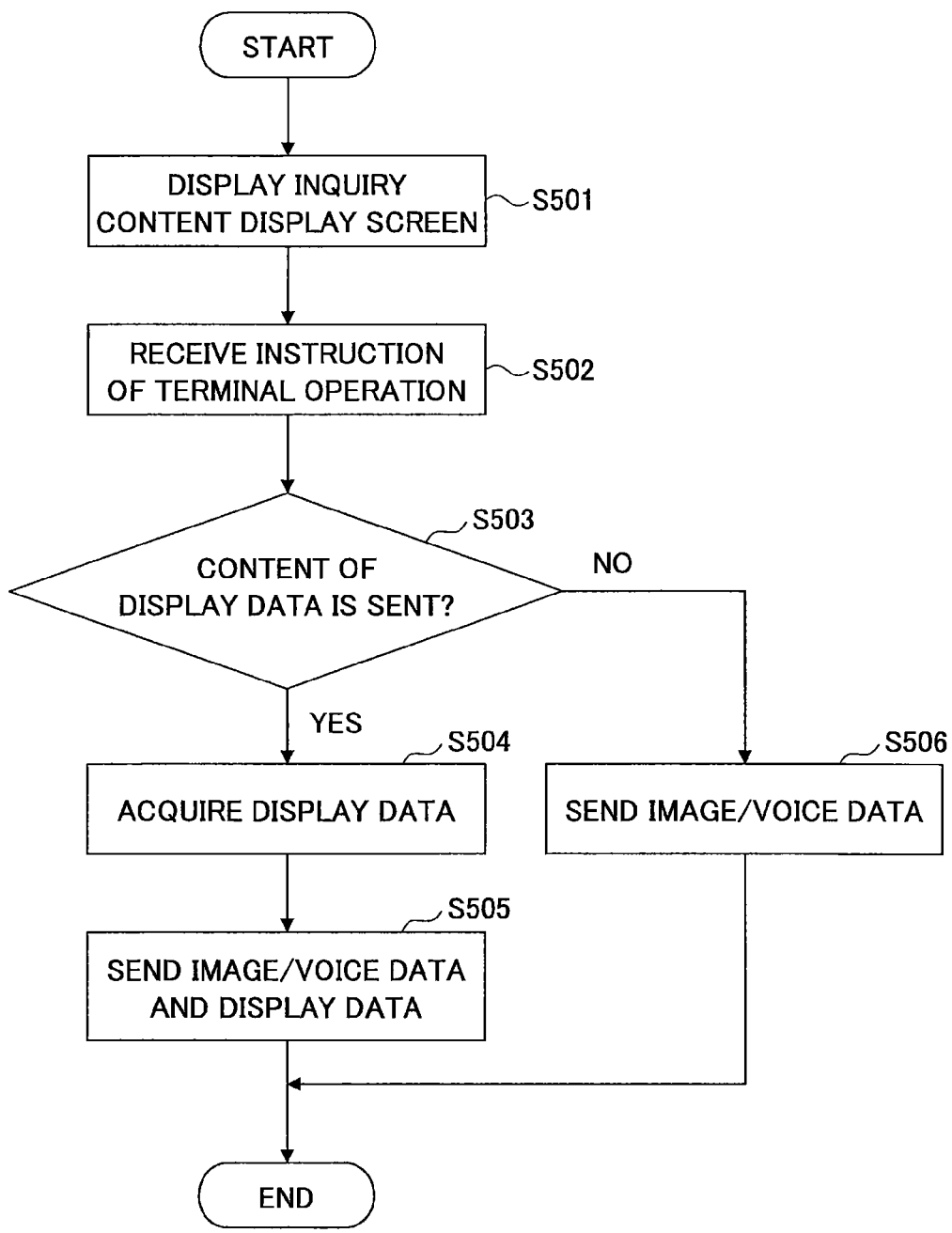
FIG. 42 is a processing flowchart illustrating an example of a process of sending data in response to an operation instruction according to the present embodiment.

FIG. 42 illustrates a process of the transmission terminal 10ad of the operator according to the present embodiment sending data in response to an operation instruction.

First, processes of displaying the inquiry content display screen in response to an instruction from the transmission management system 50 and receiving a terminal operation instruction at steps S501 and S502 are the same as those at steps S301 and S302.

Next, the operation switch unit 22, determines whether it is necessary to send the content of the file specified by "display data" (step S503). When it is determined that it is necessary to send the content of the "display data" (step S503: YES), the file transmission unit 23 acquires a file having the file name specified as the "display data" (step S504). Then, the transmission/reception unit 11 sends the image captured by the image unit 14a and the voice input from the voice input unit 15a along with the display data to the relay apparatus 30 (step S505).

On the other hand, in the case where it is not necessary to send the content of the "display data" (step S503: NO), the transmission/reception unit 11 sends the image captured by the image unit 14a and the voice input from the voice input unit 15a to the relay apparatus 30 (step S506).

Figure 43:
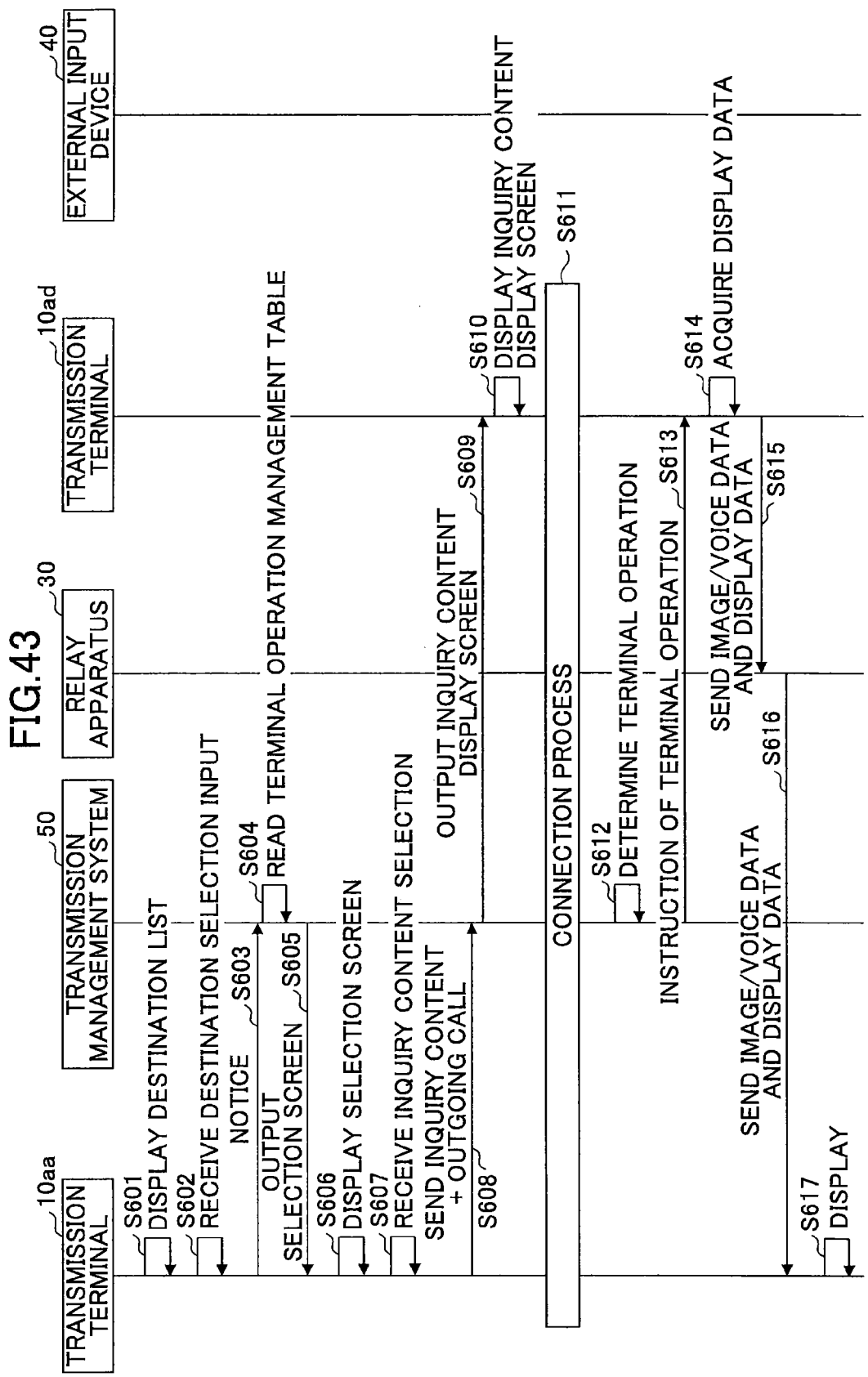
FIG. 43 is a sequence diagram illustrating an example of a process of communicating between transmission terminals according to the present embodiment.

FIG. 43 is a sequence diagram illustrating a whole operation of the transmission system 1 according to the present embodiment. In the following, differences from FIG. 38 will be mainly explained. Here, as in the example of FIG. 38, the operation of the case where the user selects "about conference schedule" of the inquiry contents shown in FIG. 33 will be explained.

First, the processes at steps S601 to S611, in which the transmission terminal 10aa of the user selects inquiry content, and the transmission terminal 10ad of the operator establishes a session after displaying the inquiry content, are the same as the processes at steps S401 to S411 in FIG. 38.

Next, the terminal operation determination unit 64 of the transmission management system 50 refers to a terminal operation management table, shown in FIG. 41, and determines that display data corresponding to the number "1" received from the transmission terminal 10aa of the user is "schedule.pdf" (step S612). Then, the terminal operation instruction unit 65 sends an operation instruction to the transmission terminal 10ad of the operator to send the display data "schedule.pdf" (step S613).

Next, the file transmission unit 23 of the transmission terminal 10 acquires the file in response to receiving the operation instruction (display data "schedule.pdf") (step S614). Here, assume that the file "schedule.pdf" has been preliminarily stored in the storage unit 1000 of the transmission terminal 10ad. Then, the transmission/reception unit 11 sends the image captured by the image unit 14a and the voice input from the voice input unit 15a along with content of the acquired display data to the relay apparatus 30 (step S615).

Afterwards, the relay apparatus 30 sends the image/voice data and the display data sent from the transmission terminal 10ad of the operator to the transmission terminal 10aa (step S616). The image display control unit 14b and the voice output unit 15b of the transmission terminal 10aa of the user display and reproduce these data, respectively (step S617).

According to the operations described as above, the user can confirm the content of the displayed file, promptly after establishing the session with the operator. Moreover, the operator can present the content of the file in response to the inquiry content to the user without a particular operation during the session.

<<Second Variation>>

Moreover, as a further variation, the method of switching existence/absence of the screen sharing according to the operation mode, in response to inquiry content (illustrated in the table shown in FIG. 32), and the method of specifying a file prepared in advance (illustrated in the table shown in FIG. 41) may be combined and used. In such as case, an operation management table, as shown in FIG. 44, may be used. Here, the operation mode used in the example of the operation management table shown in FIG. 32 will be extended as follows:

Operation mode 1: performing a video call of one to one by the user and the operator;

Operation mode 2: sending display data input from the external information transmission/reception unit 18 as the display data; and Operation mode 3: sending content of a specified file as the display data.

That is, the terminal operation instruction unit 65 of the transmission management system 50 instructs the transmission terminal 10ad of the operator to operate according to any one of the operation modes 1 to 3 corresponding to the inquiry content. Meanwhile, in the case of instruction for the operation mode 3, the terminal operation instruction unit 65 sends the filename of the display data and information indicating a storage destination thereof to the transmission terminal 10ad, as shown in FIG. 44.

Figure 45:
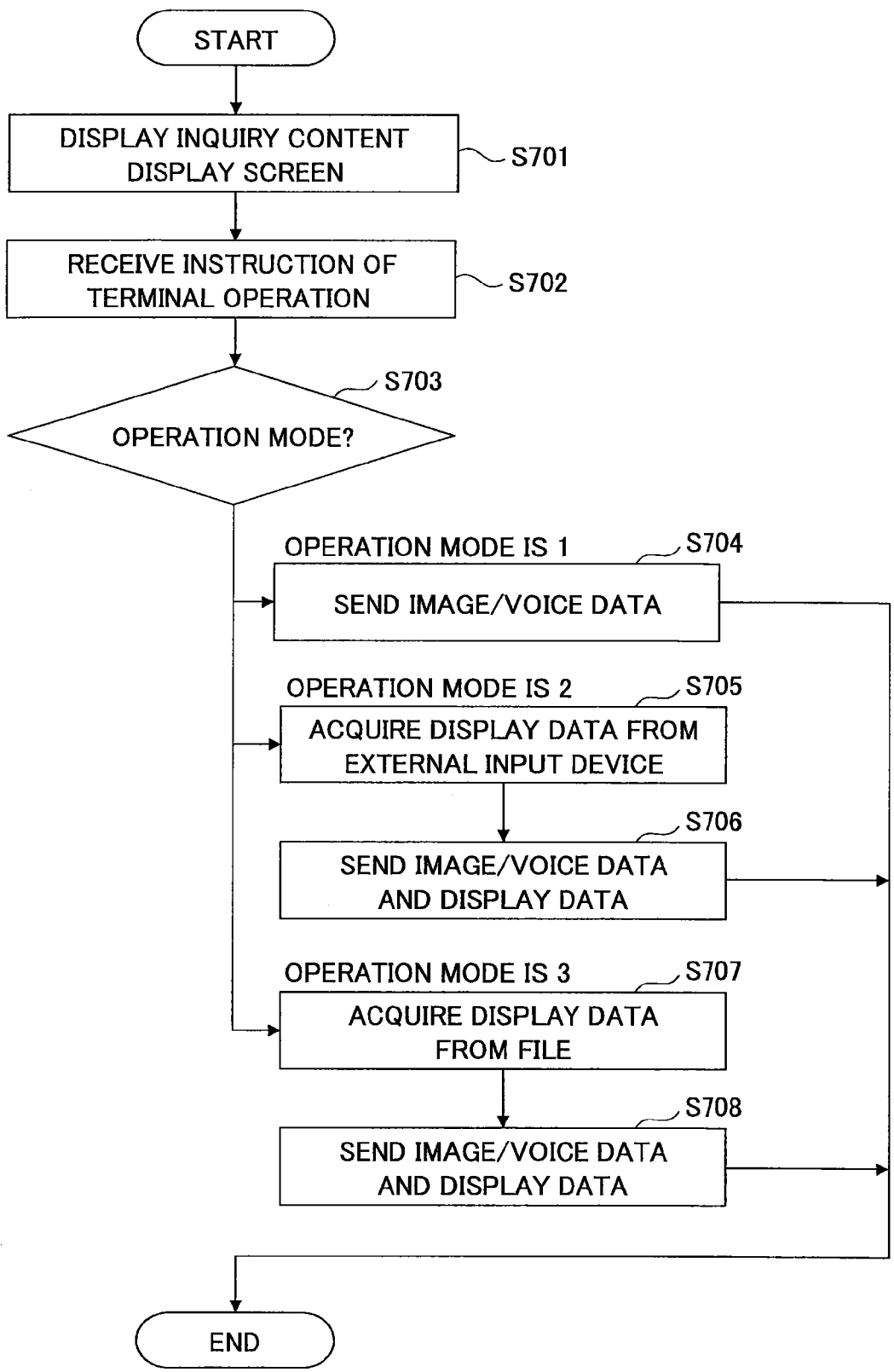
FIG. 45 is a processing flowchart illustrating an example of a process of sending data in response to an operation instruction according to the present embodiment.

FIG. 45 illustrates a flow of a process of the transmission terminal 10ad of the operator in the case where the terminal operation instruction unit 65 of the transmission management system 50 sends an operation instruction based on the operation management table shown in FIG. 44.

First, processes at steps S701 and S702 of displaying the inquiry content display screen in response to the instruction from the transmission management system 50 and receiving the terminal operation instruction are the same as those at steps S301 and S302 shown in FIG. 37.

Next, the operation switch unit 22 determines content of the operation instruction (operation mode) (step S703). Here, in the case of the operation mode of "1", the transmission/reception unit 11 sends the image captured by the image unit 14a and the voice input from the voice input unit 15a to the relay apparatus 30 (step S704).

On the other hand, in the case of the operation mode of "2", the external information transmission/reception unit 18 acquires display data related to the screen sharing from the external input device 40 (step S705). Then, the transmission/reception unit 11 sends the image captured by the image unit 14a and the voice input from the voice input unit 15a along with the display data acquired from the external input device 40 to the relay apparatus 30 (step S706).

Moreover, in the case of the operation mode of "3", the file transmission unit 23 acquires a file having the filename specified as the "display data" (step S707). Then, the transmission/reception unit 11 sends the image capture by the image unit 14a and the voice input from the voice input unit 15a along with the display data to the relay apparatus 30 (step S708).

According to the procedure described as above, the image/voice data and the display data sent from the transmission terminal 10ad of the operator are displayed on the transmission terminal 10aa of the user. Accordingly, not only the user can receive an answer in response to the inquiry content promptly, but also the operator can respond to the user with small labor.

<<Supplement to Embodiment>>

Meanwhile, a mirror driver may be used for acquiring display data. The mirror driver is a driver that sends generated display data directly to a USB driver without passing through a program. In this case, the mirror driver generates display data, and the USB driver sends the generated display data to the transmission terminal 10 via the external device I/F 118. In this case, since the program needs not acquire display data, resource for executing the program can be reduced.

The external input device may be connected to the transmission terminal via the Internet or a dedicated line. The external input device sends generated display data to the transmission terminal after establishing a connection specifying an IP address of the transmission terminal. Compared with the case of the connection via USB, though an operation of specifying the IP address is added, the external device connection I/F of the transmission terminal becomes unnecessary, and the cost can be reduced.

Moreover, in the above-described embodiments, a program acquires image data generated by a display driver and sends the data to the transmission terminal 10. However, the present invention is not limited to this. The program may acquire a drawing command generated by the GDI and send the command to the transmission terminal 10aa. The external information transmission/reception unit of the transmission terminal generates drawing data according to the received drawing command of the GDI and stores the data in the display data acquisition unit for the external input device. Since a size of the drawing command is smaller than a size of the image data, a network load can be reduced.

Moreover, the display data acquisition unit 451 may acquire only display data displayed on a predetermined screen among plural screens on a virtual display, and the acquired data are sent by the display data transmission unit 452. Accordingly, since image data displayed on screens other than the predetermined screen are not shared with the other party of the conference, security can be enhanced so as not to present a document with high confidentiality or the like.

In the first variation shown in FIG. 39A, the transmission terminal 10ad of the operator uses the file preliminarily stored in the transmission terminal 10ad or in a predetermined site as the display data instead of using the display data on the external input device 40. However, the file may be stored in a general-purpose PC as a program. In this case, under the presumption that the operator has knowledge for operating a PC, display data can be handled without the external input device.

Moreover, the transmission management system 50, the program provisioning system 90 and the maintenance system 100 according to the above-described embodiments may be configured by a computer or may be configured by plural computers to which arbitrarily divided parts (functions or means) are assigned, respectively. Moreover, in the case where the program provisioning system 90 is configured by a single computer, a program sent by the program provisioning system 90 may be divided into plural modules and sent, or may be sent without division. Furthermore, the in the case where the program provisioning system 90 is configured by plural computers, the program may be sent from the respective computers in a state that plural modules are separated.

Moreover, a recording medium storing a program for transmission terminal, a program for relay apparatus and a program for transmission management according to the above-described embodiment, a HD 204 storing these programs and a program provisioning system 90 provided with the above-described HD are used as program products in the case where the above-described program for transmission terminal, the program for relay apparatus and the program for transmission management are provided to a domestic or overseas user or the like.

Furthermore, in the above-described embodiment, quality is managed focusing on a resolution of an image of image data, as an example of the quality of an image of image data relayed by the relay apparatus 30 by the change quality management table shown in FIG. 7 and the quality management table shown in FIG. 15. However, the present invention is not limited to this. The quality may be managed focusing on a depth of image quality of image data, a sampling frequency of a voice of voice data, a bit length of a voice of voice data, or the like, as an other example of the quality.

Moreover, in FIGS. 8, 10 and 12, reception date and time are managed. However, the present invention is not limited to this. At least the reception time from the reception date and time has only to be managed.

Furthermore, in the above-described embodiments, the IP address of the relay apparatus is managed in FIG. 8 and the IP address of the transmission terminal is managed in FIG. 10. However, the present invention is not limited to this. An FQDN (Fully Qualified Domain Name) of relay apparatus specification information for specifying the relay apparatus 30 on the communication network 2 or an FQDN of terminal specification information for specifying the transmission terminal 10 on the communication network 2 may be managed. In this case, an IP address corresponding to the FQDN is obtained by a well-known DNS (Domain Name System) server. Meanwhile, the "relay apparatus specification information for specifying the relay apparatus 30 on the communication network 2" may include "relay apparatus connection destination information indicating a connection destination to the relay apparatus 30 on the communication network 2" or "relay apparatus destination information indicating a destination to the relay apparatus 30 on the communication network 2". Similarly, the "terminal specification information for specifying the transmission terminal 10 on the communication network 2" may include "terminal connection destination information indicating a connection destination to the transmission terminal 10 on the communication network 2" or "terminal destination information indicating a destination to the transmission terminal 10 on the communication network 2".

Moreover, in the above-described embodiments, a case of a video conference system is explained as an example of the transmission system 1. However, the present invention is not limited to this. The transmission system 1 may be a telephone system including IP (Internet Protocol) telephones, internet telephones or the like. Furthermore, the transmission system 1 can be applied to a message board system, in which character strings or the like input from the respective terminals are displayed on a shared screen. Moreover, the transmission system 1 may be a car navigation system. In this case, for example, one of the transmission terminals 10 corresponds to a car navigation apparatus installed on a vehicle, and other transmission terminal corresponds to a management terminal or a management server in a management center for managing car navigation or to a car navigation apparatus installed on an other vehicle.

Furthermore, in the process of acquiring display data, not an entire screen, but only a part of the screen, i.e. displayed in a region (window) in the screen, may be acquired, which will be explained as follows. FIG. 26 illustrates an example of the screen displayed by the external input device 40aa. In this example, a region (window) (a) and a region (b) are displayed in the screen. A region which is desired to be shared with the transmission terminal 10db is indicated by a pointer shown by (c) in FIG. 27 operated by a mouse 212. Then, display data in the region (a) indicated by the pointer are acquired by the display data acquisition unit 451.

Furthermore, the display data acquisition unit 451 and the display data transmission unit 452, which are stored in the storage unit 1000 of the transmission terminal 10 and are to be used in the external input device, may be provided in the external input device in advance. Accordingly, the process of sending/receiving the display data acquisition unit 451 and the display data transmission unit 452 may be omitted, and the loads of the transmission terminal 10 and of the external input device 40 can be reduced.

Furthermore, a case where the external input device 40 displays data on the display device 400 is described. However, the display device 400 may be a different apparatus from the external input device 40 or may be provided in the external input device 40.

Moreover, in the above-described process at step S71, the install determination unit 43 may determine whether the display data acquisition unit 451 and the display data transmission unit 452 have already been installed. In this case, in the case where the display data transmission unit 452 is not determined to be installed at step S71, the program acquisition unit 44 acquires the display data acquisition unit 451 and the display data transmission unit 452 stored in the transmission terminal 10aa and installs them (step S73).

Moreover, by the external input device 40aa being provided with the display data acquisition unit 451 in advance, the process by the install determination unit 43 may be omitted. By writing the display data acquired by the display data acquisition unit 451 in the storage unit 1000 of the transmission terminal 10aa, which is mounted, the display data transmission unit 452 may be omitted.

Further, the present invention is not limited to these embodiments, but various variations and modifications may be made without departing from the scope of the present invention.

The present application is based on and claims the benefit of priority of Japanese Priority Applications No. 2014-029579 filed on Feb. 19, 2014 and No. 2015-007451 filed on Jan. 19, 2015, the entire contents of which are hereby incorporated by reference.

What is claimed is:

1. A transmission system for managing video communication between a first terminal and a second terminal, comprising:
    circuitry configured to
        receive request information from the first terminal before the video communication between the first terminal and the second terminal is established, the request information simultaneously requesting video communication with the second terminal and indicating a category of a request of a first user of the first terminal based on a single input from the first user of a selection of the category of the request;

transmit an output request to the second terminal that includes the category of the request of the first user, and control establishment of the video communication between the first terminal and the second terminal after transmitting the output request to the second terminal, wherein, after the video communication between the first terminal and the second terminal is established, the second terminal outputs image data to be displayed on the first terminal according to the category of the request of the first user of the first terminal upon receiving the output request, the image data being associated with the category of the request of the first user in advance of the video communication between the first terminal and the second terminal being established.

2. The transmission system as claimed in claim 1, wherein the second terminal is configured to output the category of the request of the first user of the first terminal indicated by the request information.

3. The transmission system as claimed in claim 2, the first terminal is configured to control display of a list of categories of requests, wherein the first user of the first terminal selects the category of the request indicated by the request information which the circuitry receives.

4. The transmission system as claimed in claim 1, wherein the second terminal, in response to the output request, outputs at least one of image data of an image obtained by imaging a second user of the second terminal, image data of an image of a screen displayed on an external input device connected to the second terminal, and image data based on the content of a file associated with the category of the request of the first user in advance.

5. The transmission system as claimed in claim 1, wherein the request of the first user includes a telephonic inquiry from the first user of the first terminal to a second user of the second terminal.

6. The transmission system as claimed in claim 1, wherein the second terminal is placed in a help desk or a call center.

7. A method for managing communication between a first terminal and a second terminal, implemented by circuitry of a transmission system, comprising:

receiving request information from the first terminal before the video communication between the first terminal and the second terminal is established, the request information simultaneously requesting video communication with the second terminal and indicating a category of a request of a first user of the first terminal based on a single input from the first user of a selection of the category of the request;

transmitting an output request to the second terminal that includes the category of the request of the first user; and controlling establishment of the video communication between the first terminal and the second terminal after transmitting the output request to the second terminal, wherein, after the video communication between the first terminal and the second terminal is established, the second terminal outputs image data to be displayed on the first terminal according to the category of the request of the first user of the first terminal upon receiving the output request, the image data being associated with the category of the request of the first user in advance of the video communication between the first terminal and the second terminal being established.

8. A non-transitory computer-readable storage medium storing a program for causing a transmission system, to which a first terminal and a second terminal are connected, to execute a process of managing communication between the first terminal and the second terminal, the process comprising:

receiving request information from the first terminal before the video communication between the first terminal and the second terminal is established, the request information simultaneously requesting video communication with the second terminal and indicating a category of a request of a first user of the first terminal based on a single input from the first user of a selection of the category of the request;

transmitting an output request to the second terminal that includes the category of the request of the first user; and controlling establishment of the video communication between the first terminal and the second terminal after transmitting the output request to the second terminal, wherein, after the video communication between the first terminal and the second terminal is established, the second terminal outputs image data to be displayed on the first terminal according to the category of the request of the first user of the first terminal upon receiving the output request, the image data being associated with the category of the request of the first user in advance of the video communication between the first terminal and the second terminal being established.

* * * * *